United States Patent
Seekup et al.

(10) Patent No.: US 12,555,679 B2
(45) Date of Patent: Feb. 17, 2026

(54) HUMIDIFICATION DEVICE COMMUNICATIONS

(71) Applicant: Fisher & Paykel Healthcare Limited, Auckland (NZ)

(72) Inventors: Peter Alan Seekup, Auckland (NZ); Salman Mansoor Javed, Auckland (NZ); Po-Yen Liu, Auckland (NZ); Ho Shing Lo, Auckland (NZ); Dennis Sin Hin Cheung, Auckland (NZ); Karan Deva, Auckland (NZ)

(73) Assignee: Fisher & Paykel Healthcare Limited, Auckland (NZ)

( * ) Notice: Subject to any disclaimer, the term of this patent is extended or adjusted under 35 U.S.C. 154(b) by 252 days.

(21) Appl. No.: 18/563,198

(22) PCT Filed: Jun. 1, 2022

(86) PCT No.: PCT/IB2022/055101
§ 371 (c)(1),
(2) Date: Nov. 21, 2023

(87) PCT Pub. No.: WO2022/254344
PCT Pub. Date: Dec. 8, 2022

(65) Prior Publication Data
US 2024/0379221 A1    Nov. 14, 2024

Related U.S. Application Data

(60) Provisional application No. 63/202,232, filed on Jun. 2, 2021.

(30) Foreign Application Priority Data

Aug. 19, 2021   (AU) ................................ 2021218111

(51) Int. Cl.
*G16H 40/63*   (2018.01)
*A61M 16/00*   (2006.01)
(Continued)

(52) U.S. Cl.
CPC ........ *G16H 40/63* (2018.01); *A61M 16/0003* (2014.02); *A61M 16/0051* (2013.01);
(Continued)

(58) Field of Classification Search
None
See application file for complete search history.

(56) References Cited

U.S. PATENT DOCUMENTS

| | | | |
|---|---|---|---|
| 3,076,451 | A | 2/1963 | Stoner |
| 4,328,793 | A | 5/1982 | Martin |

(Continued)

FOREIGN PATENT DOCUMENTS

| | | |
|---|---|---|
| CN | 115025344 | 9/2002 |
| CN | 101225986 | 7/2008 |

(Continued)

OTHER PUBLICATIONS

Ashry et al. Humidification during Mechanical Ventilation in the Adult Patient, BioMed Research International vol. 2014, Article ID 715434, 12 pages http://dx.doi.org/10.1155/2014/715434.*

(Continued)

*Primary Examiner* — David J Stoltenberg
(74) *Attorney, Agent, or Firm* — Knobbe Martens Olson & Bear LLP

(57) ABSTRACT

A respiratory or surgical humidifier having communication capabilities for communicating with other medical devices. The humidifier can obtain updates from the other medical devices and transmit and receive other data using the communication capabilities. The humidifier's operational state can be logged and its health can be assessed by another (Continued)

device. The humidifier's operation can be controlled based on data communicated from other medical devices. Also disclosed are other medical devices for communicating with the humidifier. Also disclosed are methods by which devices of a humidification and ventilation system can authenticate each other.

20 Claims, 13 Drawing Sheets

(51) Int. Cl.
A61M 16/06 (2006.01)
A61M 16/10 (2006.01)
(52) U.S. Cl.
CPC ...... *A61M 16/0066* (2013.01); *A61M 16/024* (2017.08); *A61M 16/06* (2013.01); *A61M 16/109* (2014.02); *A61M 16/1095* (2014.02); A61M 2016/0033 (2013.01); A61M 2202/0007 (2013.01); A61M 2202/0208 (2013.01); A61M 2202/025 (2013.01); A61M 2205/103 (2013.01); A61M 2205/18 (2013.01); A61M 2205/3327 (2013.01); A61M 2205/3334 (2013.01); A61M 2205/3368 (2013.01); A61M 2205/3386 (2013.01); A61M 2205/3561 (2013.01); A61M 2205/3653 (2013.01); A61M 2205/50 (2013.01); A61M 2205/60 (2013.01)

(56) References Cited

U.S. PATENT DOCUMENTS

| | | | |
|---|---|---|---|
| 4,430,994 | A | 2/1984 | Clawson et al. |
| 4,796,605 | A | 1/1989 | Sasaki et al. |
| 4,967,744 | A | 11/1990 | Chua |
| 5,242,375 | A | 9/1993 | McDonough |
| 5,365,922 | A | 11/1994 | Raemer |
| 5,759,149 | A | 6/1998 | Goldberg et al. |
| 6,349,722 | B1 | 2/2002 | Gradon et al. |
| 7,681,571 | B2 | 3/2010 | Makinson et al. |
| 8,006,691 | B2 | 8/2011 | Kenyon et al. |
| 8,100,124 | B2 | 1/2012 | Becker et al. |
| 8,251,055 | B2 | 8/2012 | Srinivasan et al. |
| 8,371,299 | B2 | 2/2013 | Denyer et al. |
| 8,439,031 | B1 | 5/2013 | Rothermel et al. |
| 8,511,306 | B2 | 8/2013 | Sanchez et al. |
| 8,800,970 | B2 | 8/2014 | Heine et al. |
| 8,939,147 | B2 | 1/2015 | Henry et al. |
| 9,016,276 | B2 | 4/2015 | Bowman et al. |
| 9,067,036 | B2 | 6/2015 | Korneff et al. |
| 9,440,040 | B2 | 9/2016 | Klasek et al. |
| 9,656,034 | B2 | 5/2017 | Kepler et al. |
| 9,987,454 | B2 | 6/2018 | Winski et al. |
| 9,993,608 | B2 | 6/2018 | Cheung et al. |
| 10,046,136 | B2 | 8/2018 | Pujol |
| 10,279,140 | B2 | 5/2019 | Winski |
| 10,426,914 | B2 | 10/2019 | Giovannelli et al. |
| 10,500,359 | B2 | 12/2019 | Schwaibold et al. |
| 11,229,764 | B2 | 1/2022 | Cheung et al. |
| 11,298,482 | B2 | 4/2022 | Tang et al. |
| 11,298,483 | B2 | 4/2022 | Hill et al. |
| 2004/0016430 | A1 | 1/2004 | Makinson et al. |
| 2004/0210151 | A1 | 10/2004 | Tsukashima et al. |
| 2005/0124866 | A1 | 6/2005 | Elaz et al. |
| 2005/0284469 | A1 | 12/2005 | Tobia et al. |
| 2006/0113690 | A1 | 6/2006 | Huddart et al. |
| 2007/0079982 | A1 | 4/2007 | Laurent et al. |
| 2007/0137646 | A1 | 6/2007 | Weinstein et al. |
| 2007/0299358 | A1 | 12/2007 | Bertinetti et al. |
| 2008/0142019 | A1 | 6/2008 | Lewis et al. |
| 2009/0159079 | A1 | 6/2009 | Meier |
| 2009/0223514 | A1 | 9/2009 | Smith et al. |
| 2009/0229606 | A1 | 9/2009 | Tang et al. |
| 2009/0241948 | A1 | 10/2009 | Clancy et al. |
| 2010/0206308 | A1 | 8/2010 | Klasek et al. |
| 2011/0023874 | A1 | 2/2011 | Bath et al. |
| 2011/0088693 | A1 | 4/2011 | Somervell et al. |
| 2011/0120462 | A1 | 5/2011 | Tatkov et al. |
| 2011/0259333 | A1 | 10/2011 | Sanchez et al. |
| 2012/0060838 | A1 | 3/2012 | Laura Lapoint et al. |
| 2012/0080032 | A1 | 4/2012 | Bordewick et al. |
| 2016/0193437 | A1 | 7/2016 | Bao et al. |
| 2019/0134330 | A1* | 5/2019 | Germinario ............ G16H 20/13 |
| 2019/0314598 | A1 | 10/2019 | Koerber et al. |
| 2020/0013501 | A1* | 1/2020 | Page ...................... G08B 21/24 |
| 2020/0113484 | A1* | 4/2020 | Schindhelm ........... G16H 40/63 |
| 2020/0306492 | A1 | 10/2020 | Hete |
| 2020/0360636 | A1 | 11/2020 | Peake et al. |
| 2021/0228833 | A1 | 7/2021 | Alshut et al. |
| 2021/0322717 | A1 | 10/2021 | Zhan et al. |
| 2021/0393914 | A1 | 12/2021 | Tsuj |
| 2022/0016370 | A1* | 1/2022 | Burgess ................. G16H 20/40 |
| 2022/0020488 | A1* | 1/2022 | Kennedy ............... G16H 20/40 |
| 2022/0249798 | A1 | 8/2022 | Doudkine et al. |
| 2023/0190140 | A1* | 6/2023 | Tiron ..................... A61B 5/746 |
| | | | 600/534 |
| 2023/0377738 | A1 | 11/2023 | Shouldice et al. |

FOREIGN PATENT DOCUMENTS

| | | |
|---|---|---|
| EP | 1 457 223 | 9/2004 |
| EP | 1 491 226 | 1/2006 |
| EP | 2 260 895 | 12/2010 |
| EP | 2 098 260 | 4/2012 |
| EP | 2 307 082 | 4/2018 |
| EP | 2 195 061 | 8/2018 |
| EP | 2 667 919 | 5/2021 |
| WO | WO 2008/091164 | 7/2008 |
| WO | WO 2009/107070 | 9/2009 |
| WO | WO 2009/145646 | 12/2009 |
| WO | WO 2010/016838 | 2/2010 |
| WO | WO 2011/086436 | 7/2011 |
| WO | WO 2011/136665 | 11/2011 |
| WO | WO 2013/165263 | 11/2013 |
| WO | WO 2017/032873 A2 | 3/2017 |
| WO | WO 2018/070883 | 4/2018 |
| WO | WO 2020/032808 | 2/2020 |
| WO | WO 2020/201946 A1 | 10/2020 |
| WO | WO 2022/254344 A1 | 12/2022 |

OTHER PUBLICATIONS

International Search Report and Written Opinion; PCT/IB2022/055101; dated Aug. 31, 2022.

* cited by examiner

HUMIDIFICATION DEVICE COMMUNICATIONS

FIELD OF THE DISCLOSURE

The present disclosure relates to respiratory and/or surgical humidifiers, respiratory and/or surgical humidification and/or ventilation/flow generation systems, devices for use with respiratory and/or surgical humidifiers, systems including respiratory and/or surgical humidifiers, and associated methods.

BACKGROUND

Respiratory apparatuses are used in various environments, such as hospital, medical facilities, residential care, palliative care or home environments. For a range of respiratory applications, it is beneficial to humidify gases being supplied to a patient or user. These applications include where the gases are for breathing by the patient or user and/or where the gas is being supplied during surgery to the patient or user. In the case of breathing gases in a non-invasive mode when the inspired gas passes through the upper airway, such as when gas is delivered to the patient or user via a face or nasal mask, the humidity increases patient or user comfort, improves the patient's or user's tolerance to the non-invasive ventilation (NIV), and the humidified gases are less prone to drying out the tissues (for example, the nasal mucosa) of the airway of the patient or user. In the case of surgical gases when the gases are delivered to a surgical site of the patient or an invasive mode when the gases delivered to the patient bypass the upper airway, humidification of the gases has been found to improve patient comfort and provide physiological benefits, such as improved mucus transport, can be necessary for patient or user safety, such as for preventing airway obstruction due to inspissation of airway secretion, disruption of the airway epithelium (or mesothelium in surgical applications), and/or for improving post-operative outcomes. In the case of high flow therapy, humidified gases are delivered to the patient or user at high flows through an unsealed interface. The patient or user may be spontaneously breathing or may be apneic, such as under anesthesia. A flow therapy apparatus with a humidifier can be used to deliver high flow gases and the therapy apparatus may control characteristics such as for example gases flow, including flow rate, temperature, pressure, humidity, supplementary gases concentration, and the like. In the case of positive airway pressure therapy (PAP) therapy, a PAP therapy apparatus that includes a blower and a humidifier can be used to provide pressure therapy, for example, continuous positive airway pressure therapy (CPAP), to the user.

SUMMARY

Humidifiers can operate in system with other devices including, for example, medical devices such as flow generators. Communication of data between the devices may be useful for ensuring compatibility of the devices, for assessing the performance or functioning of the devices, and for controlling the devices in a coordinated manner, among other things.

The present disclosure includes examples of humidifiers, other medical devices, systems and methods that make use of communications between devices. The communications are used to provide updates to the humidifier from another medical device, to authenticate devices, to assess the health of a humidifier, to suppress alarms in some situations, to control operation of the humidifier based on the operation of another device, to control the humidifier based on temperature data provided from another device, to log humidifier data at another device, to control heating elements of the humidifier based on information about a power source external to the humidifier, and to resume operation of the humidifier after a temporary interruption based on stored humidifier state data.

In some configurations a method for facilitating configuration of a device comprises: a. obtaining, by a medical device, configuration information for a respiratory or surgical humidifier external to the medical device; and b. providing, by the medical device, the obtained configuration information to the respiratory or surgical humidifier.

In some configurations obtaining the configuration information for the respiratory or surgical humidifier comprises obtaining a configuration file that includes the configuration information for the respiratory or surgical humidifier and configuration information for the medical device.

In some configurations the configuration information is encrypted.

In some configurations the configuration information for the respiratory or surgical humidifier is encrypted separately from the configuration information for the medical device.

In some configurations the medical device is a flow generator.

In some configurations the medical device is a gases source.

In some configurations the medical device is another respiratory or surgical humidifier.

In some configurations the medical device is an incubator.

In some configurations the medical device is a patient monitoring device.

In some configurations obtaining the configuration information comprises obtaining the configuration information from a third device using a communication interface.

In some configurations the method comprises, before providing the obtained configuration information to the respiratory or surgical humidifier, authenticating the medical device.

In some configurations the method comprises comparing a version identifier of the obtained configuration information for the respiratory or surgical humidifier to a version identifier of a current configuration of the respiratory or surgical humidifier, wherein the obtained configuration information is provided to the respiratory or surgical humidifier at least partly based on the comparison showing that the version identifiers are different.

In some configurations the method comprises, before providing the obtained configuration information to the respiratory or surgical humidifier, determining that the respiratory or surgical humidifier is communicatively connected to the medical device, and wherein the obtained configuration information is provided to the respiratory or surgical humidifier at least in part based on the determination.

In some configurations the obtained configuration information is provided to the medical device also based on receipt of a user input.

In some configurations the method comprises configuring the respiratory or surgical humidifier using the obtained configuration information.

In some configurations the method comprises: c. providing, by the medical device, further device configuration information to the respiratory or surgical humidifier; and d. providing, by the respiratory or surgical humidifier, the further device configuration information to a further device.

In some configurations providing the obtained configuration information to the respiratory or surgical humidifier; and providing the further device configuration information to the respiratory or surgical humidifier; is performed by providing a configuration file that includes the obtained configuration information and the further device configuration information.

In some configurations configuring the further device using the further device configuration information.

In some configurations a medical device includes: a. one or more communication interfaces; b. one or more processors; and c. one or more memory devices, one or more of the memory device(s) having stored thereon instructions for causing one or more of the processor(s) to: i. obtain, using one or more of the communication interface(s), configuration information for a respiratory or surgical humidifier; and ii. provide, using one or more of the communication interface(s), the configuration information to the respiratory or surgical humidifier.

In some configurations the configuration information for the respiratory or surgical humidifier is comprised in a configuration file that also comprises configuration information for the medical device.

In some configurations the configuration information is encrypted.

In some configurations the configuration information for the respiratory or surgical humidifier is encrypted separately from the configuration information for the medical device.

In some configurations the medical device is a flow generator.

In some configurations the medical device is a gases source.

In some configurations the medical device is another respiratory or surgical humidifier.

In some configurations the medical device is an incubator.

In some configurations the medical device is a patient monitoring device.

In some configurations the communication interface is a serial communication interface.

In some configurations the communication interface is an RS-232 interface.

In some configurations the communication interface is a USB interface.

In some configurations the communication interface is an Ethernet interface.

In some configurations the communication interface is a wireless communication interface.

In some configurations the system further comprises a further device, the further device comprising one or more communication interfaces, and wherein the respiratory or surgical humidifier further comprises: a. one or more processors; and b. one or more memory devices, the memory device(s) having stored thereon instructions for causing one or more of the processor(s) to: i. obtain, using one or more of the communication interface(s) of the respiratory or surgical humidifier, configuration information for the respiratory or surgical humidifier and configuration information for the further device; and a. configure the respiratory or surgical humidifier according to the obtained configuration information for the respiratory or surgical humidifier; and/or b. provide, using one or more of the communication interface(s) of the respiratory or surgical humidifier, the configuration information for the further device to the further device.

In some configurations a method of configuring a device comprises: a. obtaining, by a medical device external to a respiratory or surgical humidifier, configuration information for the medical device and configuration information for the respiratory or surgical humidifier; and i. configuring the medical device according to the obtained configuration information for the medical device; and/or ii. configuring the respiratory or surgical humidifier according to the obtained configuration information for the respiratory or surgical humidifier.

In some configurations obtaining the configuration information includes obtaining a configuration file that includes the configuration information for the respiratory or surgical humidifier and configuration information for the medical device.

In some configurations the configuration information is encrypted.

In some configurations the configuration information for the respiratory or surgical humidifier is encrypted separately from the configuration information for the medical device.

In some configurations the medical device is a flow generator.

In some configurations the medical device is a gases source.

In some configurations the medical device is another respiratory or surgical humidifier.

In some configurations the medical device is an incubator.

In some configurations the medical device is a patient monitoring device.

In some configurations obtaining the configuration information comprises obtaining the configuration information from a third device using a communication interface.

In some configurations the third device is a patient monitoring device.

In some configurations the third device is a central monitoring device.

In some configurations the third device is a personal computing device.

In some configurations the method comprises, before configuring the respiratory or surgical humidifier and/or the medical device, authenticating the respiratory or surgical humidifier and/or the medical device.

In some configurations the method comprises: a. initiating a configuration process, the configuration process including: i. determining whether to configure the respiratory or surgical humidifier according to the obtained configuration information for the respiratory or surgical humidifier; and ii. determining whether to configure the medical device according to the obtained configuration information for the medical device.

In some configurations: a. determining whether to configure the respiratory or surgical humidifier includes comparing a version identifier of the obtained configuration information for the respiratory or surgical humidifier to a version identifier of a current configuration of the respiratory or surgical humidifier; and b. determining whether to configure the medical device includes comparing a version identifier of the obtained configuration information for the medical device to a version identifier of a current configuration of the medical device.

In some configurations the method comprises: a. determining that the respiratory or surgical humidifier is communicatively connected to the medical device, and wherein the configuration process is initiated at least in part based on the determination. In some configurations the method comprises: a. determining whether to configure the medical device according to the obtained configuration information for the medical device; b. determining that the respiratory or surgical humidifier is communicatively connected to the medical device; and c. based at least in part on the determination that the respiratory or surgical humidifier is communicatively connected to the medical device, determining whether to configure the respiratory or surgical humidifier according to the configuration information for the respiratory or surgical humidifier.

In some configurations the method comprises determining whether current configuration of the respiratory or surgical humidifier is compatible with a current configuration of the medical device.

In some configurations the method comprises, if the current configuration of the respiratory or surgical humidifier is not compatible with the current configuration of the medical device, entering an error state.

In some configurations the method comprises, if the current configuration of the respiratory or surgical humidifier is not compatible with the current configuration of the medical device, providing, to the respiratory or surgical humidifier, configuration information that is compatible with the current configuration of the medical device.

In some configurations the method comprises determining that the third device is communicatively connected to the medical device, wherein the third device provides the configuration information to the medical device at least partly based on the determination.

In some configurations the method comprises configuring the medical device according to the obtained configuration information for the medical device.

In some configurations the method comprises configuring the respiratory or surgical humidifier according to the obtained configuration information for the respiratory or surgical humidifier.

In some configurations a respiratory or surgical humidification system comprises: a. a respiratory or surgical humidifier comprising one or more communication interfaces; and b. a medical device external to the respiratory or surgical humidifier, the medical device including: i. one or more communication interfaces; ii. one or more processors; and iii. one or more memory devices, the memory device(s) having stored thereon instructions for causing one or more of the processor(s) to: obtain, using one or more of the communication interface(s) of the medical device, configuration information for the respiratory or surgical humidifier and configuration information for the medical device; and a. configure the medical device according to the obtained configuration information for the medical device; and/or b. provide, using one or more of the communication interface(s) of the medical device, the configuration information for the respiratory or surgical humidifier to the respiratory or surgical humidifier.

In some configurations the configuration information for the respiratory or surgical humidifier and the configuration information for the medical device is comprised in the same configuration file.

In some configurations the configuration information is encrypted.

In some configurations the configuration information for the respiratory or surgical humidifier is encrypted separately from the configuration information for the medical device.

In some configurations the medical device is a flow generator.

In some configurations the medical device is a gases source.

In some configurations the medical device is another respiratory or surgical humidifier.

In some configurations the medical device is an incubator.

In some configurations the medical device is a patient monitoring device.

In some configurations the system further comprises a third device including a communication interface.

In some configurations the third device is configured to provide the configuration information to the medical device.

In some configurations the third device is a patient monitoring device.

In some configurations the third device is a central monitoring device.

In some configurations the third device is a personal computing device.

In some configurations the third device is another respiratory or surgical humidifier.

In some configurations one or more of the communication interfaces of each of the respiratory or surgical humidifier and the medical device is a serial communication interface.

In some configurations the serial communication interface of each of the respiratory or surgical humidifier and the medical device is an RS-232 interface.

In some configurations the serial communication interface of each of the respiratory or surgical humidifier and the medical device is a USB interface.

In some configurations one or more of the communication interfaces of each of the respiratory or surgical humidifier and the medical device is an Ethernet interface.

In some configurations one or more of the communication interfaces of each of the respiratory or surgical humidifier and the medical device is a wireless communication interface.

In some configurations method of updating a device comprises: a. obtaining an update file comprising an update for a respiratory or surgical humidifier and an update for a device external to the respiratory or surgical humidifier; and b. using the external device: i. providing the update for the respiratory or surgical humidifier to the respiratory or surgical humidifier; and ii. confirming an update of the respiratory or surgical humidifier.

In some configurations the update file is encrypted.

In some configurations the update for the respiratory or surgical humidifier is encrypted separately from the update for the external device.

In some configurations the external device is a medical device.

In some configurations the external device is a flow generator.

In some configurations the external device is a gases source.

In some configurations the external device is another humidifier.

In some configurations the external device is an incubator.

In some configurations the external device is a patient monitoring device.

In some configurations the method comprises: a. providing the update for the respiratory or surgical humidifier to a second respiratory or surgical humidifier; and b. confirming an update of the second respiratory or surgical humidifier.

In some configurations a method of updating a respiratory or surgical humidifier and a device external to the respiratory or surgical humidifier comprises: a. transferring, to the external device, an update file comprising an update for the respiratory or surgical humidifier and an update for the external device; and b. initiating an update process for updating the external device and the respiratory or surgical humidifier.

In some configurations the update file is transferred to the external device from a third device at least partly based on a determination that the external device is communicatively connected to the third device.

In some configurations the update file is transferred to the external device from the third device also based on a user input.

In some configurations the update process is initiated at least partly based on a determination that the respiratory or surgical humidifier is communicatively connected to the external device.

In some configurations the update process is initiated also based on a user input.

In some configurations a method of updating a device comprises: a. obtaining an update file comprising an update for a respiratory or surgical humidifier and an update for a device external to the respiratory or surgical humidifier; and i. updating the external device using at least part of the update for the external device; and/or ii. updating the respiratory or surgical humidifier using at least part of the update for the respiratory or surgical humidifier.

In some configurations the method comprises comparing a version identifier of the update for the respiratory or surgical humidifier to a version identifier of a most recently applied update of the respiratory or surgical humidifier and updating the respiratory or surgical humidifier using at least part of the update for the respiratory or surgical humidifier if the versions are different.

In some configurations the respiratory or surgical humidifier is updated if the obtained update is a later version than the most recently applied update.

In some configurations the method comprises comparing a version identifier of the update for the external device to a version identifier of a most recently applied update of the external device and updating the external device using at least part of the update for external device if the versions are different.

In some configurations the external device is updated if the obtained update is a later version than the most recently applied update.

In some configurations the respiratory or surgical humidifier and the external device are both updated and wherein the updating of the respiratory or surgical humidifier is at least partly overlapping in time with the updating of the external device.

In some configurations the respiratory or surgical humidifier and the external device are both updated and wherein the updating of the respiratory or surgical humidifier occurs later in time than the updating of the external device.

In some configurations a system comprises: a. a respiratory or surgical humidifier; b. a device external to the respiratory or surgical humidifier; and c. an update file, the update file comprising an update for the respiratory or surgical humidifier and an update for the external device.

In some configurations the update file is encrypted.

In some configurations the update for the respiratory or surgical humidifier is encrypted separately from the update for the external device.

In some configurations the external device is a medical device.

In some configurations the external device is a flow generator.

In some configurations the external device is a gases source.

In some configurations the external device is another humidifier.

In some configurations the external device is an incubator.

In some configurations the external device is a patient monitoring device.

In some configurations the system comprises a third device communicatively connected to the respiratory or surgical humidifier.

In some configurations the third device is communicatively connected to the respiratory or surgical humidifier via the external device.

In some configurations the third device is a patient monitoring device.

In some configurations the third device is a central monitoring device.

In some configurations the third device is a personal computing device.

In some configurations the third device is another humidifier.

In some configurations the respiratory or surgical humidifier and the external device are communicatively connected via serial communication interfaces.

In some configurations the serial communication interfaces are RS-232 interfaces, RS-422 interfaces, and/or RS-485 interfaces.

In some configurations the serial communication interfaces are USB interfaces.

In some configurations the respiratory or surgical humidifier and the external device are communicatively connected via Ethernet interfaces.

In some configurations the respiratory or surgical humidifier and the external device are communicatively connected via wireless interfaces.

In some configurations the third device and the external device are communicatively connected via serial communication interfaces.

In some configurations the serial communication interfaces are RS-232, RS-422, RS-485 and/or USB interfaces.

In some configurations the third device and the external device are communicatively connected via Ethernet interfaces.

In some configurations the third device and the external device are communicatively connected via wireless interfaces.

In some configurations the system comprises a further device, wherein the update file further comprises an update for the further device.

In some configurations a method for authenticating devices of a respiratory or surgical humidification and/or ventilation system comprises: a. providing, from a first device of the respiratory or surgical humidification and/or ventilation system, first authentication information; b. performing, by a second device of the respiratory or surgical humidification and/or ventilation system, a first authenticity check of the first authentication information; and c. depending on the result of the first authenticity check, either: i. approving the first device for further communications with the second device; not approving the first device for further communications with the second or ii. device.

In some configurations the method comprises: a providing, from the second device, second authentication information; b. performing, by the first device, a second authenticity check of the second authentication information; and c. depending on the result of the second authenticity check, either: i. approving the second device for further communications with the first device; or ii. not approving the second device for further communications with the first device.

In some configurations the first authentication information comprises a first digital certificate signed by a private key of the first device and wherein the first authenticity check includes verifying the first digital certificate using a public key of the first device.

In some configurations the second authentication information comprises a second digital certificate signed by a private key of the second device and wherein the second authenticity check includes verifying the second digital certificate using a public key of the second device.

In some configurations the first device is a respiratory or surgical humidifier.

In some configurations the second device is a flow generator.

In some configurations the method comprises performing the further communications between the first and second devices if the first device is approved for further communications with the second device.

In some configurations a method for authenticating devices of a respiratory or surgical humidification and/or ventilation system comprises: a. providing, from a first device of the respiratory or surgical humidification and/or ventilation system, first authentication information; b. performing, by a second device of the respiratory or surgical humidification and/or ventilation system, an authenticity check of the authentication information; and c. depending on the result of the authenticity check, either: i. approving the first device for operation in the respiratory or surgical humidification and/or ventilation system; or ii. not approving the first device for operation in the respiratory or surgical humidification and/or ventilation system.

In some configurations the method comprises: a. providing, from the second device, second authentication information; b. performing, by the first device, a second authenticity check of the second authentication information; and c. depending on the result of the second authenticity check, either: i. approving the second device for operation in the respiratory or surgical humidification and/or ventilation system; or ii. not approving the second device for operation in the respiratory or surgical humidification and/or ventilation system.

In some configurations the first authentication information comprises a first digital certificate signed by a private key of the first device and wherein the first authenticity check includes verifying the first digital certificate using a public key of the first device.

In some configurations the second authentication information comprises a second digital certificate signed by a private key of the second device and wherein the second authenticity check includes verifying the second digital certificate using a public key of the second device.

In some configurations the first device is a respiratory or surgical humidifier.

In some configurations the second device is a flow generator.

In some configurations the method comprises performing respiratory or surgical humidification and/or ventilation using the first device if the first device is approved for operation in the respiratory or surgical humidification and/or ventilation system.

In some configurations a method of assessing the health of a respiratory or surgical humidifier comprises: a. receiving, at a device external to the respiratory or surgical humidifier, sensor output data indicative of the performance of or resources available to the respiratory or surgical humidifier; b. applying one or more device health assessment rules to the sensor output data; and c. determining, based on the application of the device health assessment rule(s) to the sensor output data, a value of a device health parameter associated with the respiratory or surgical humidifier.

In some configurations the sensor output data includes data output by one or more sensors of the respiratory or surgical humidifier.

In some configurations the sensor output data includes data output by one or more sensors of the external device.

In some configurations the method comprises selecting which sensor to use for providing the sensor output data by selecting between a sensor of the respiratory or surgical humidifier and a sensor of the external device.

In some configurations the selection is based on an attribute of each sensor.

In some configurations the attribute is accuracy.

In some configurations the selection includes selecting the sensor of the external device if the respiratory or surgical humidifier and the external device are communicatively connected.

In some configurations the health parameter is humidifier chamber water level.

In some configurations the humidifier chamber water level is determined from a temperature and/or power draw of a water-heating element of the humidifier.

In some configurations the humidifier chamber water level is determined from fluid flow rate measurements.

In some configurations the humidifier chamber water level is determined from the difference between a flow rate measurement of fluid upstream of the humidifier chamber and a flow rate measurement of fluid downstream of the humidifier chamber.

In some configurations applying the one or more device health assessment rules includes comparing the difference between flow rate measurements to a threshold and wherein determining the value of the health parameter includes determining a water out condition if the difference is less than a threshold.

In some configurations the humidifier chamber water level is determined from a measured humidity of fluid downstream of the humidifier.

In some configurations applying the one or more device health assessment rules includes comparing the measured humidity to a threshold and wherein determining the value of the health parameter includes determining a water out condition if the measured humidity is less than a threshold.

In some configurations the sensor output data includes data output by one or more sensors selected from the group consisting of: pressure sensors; voltage sensors; electrical current sensors; temperature sensors; weight sensors; conductivity sensors; and float sensors.

In some configurations the method comprises altering a flow of gases supplied to the respiratory or surgical humidifier.

In some configurations altering the flow of gases includes increasing the volume flow rate.

In some configurations increasing the volume flow rate includes increasing the volume flow rate from about 3 liters per minute or less to more than 3 liters per minute.

In some configurations altering the flow of gases include pulsing the flow of gases.

In some configurations the health parameter is a direction of fluid flow through the humidifier.

In some configurations the external device is a flow generator.

In some configurations the measured humidity is determined from sensor output data of a humidity sensor in an expiratory block of the flow generator.

In some configurations the measured humidity is used to control the power supplied to a heating element in the expiratory block.

In some configurations the method comprises: a. blocking an expiratory block of the flow generator; b. providing a flow of gas from an inspiratory block of the flow generator; and c. determining a resulting fluid flow rate through the humidifier.

In some configurations applying the one or more device health assessment rules includes comparing the resulting fluid flow rate to a threshold and wherein determining the value of the device health parameter includes determining a reverse flow condition if the resulting flow rate is less than the threshold.

In some configurations the method comprises: a. blocking an outlet that is configured to provide gas from a breathing circuit associated with the humidifier towards a patient interface and blocking an expiratory block of the flow generator; b. providing a flow of gas from an inspiratory block of the flow generator; c. blocking the inspiratory block and opening the expiratory block; and d. determining a resulting fluid flow rate through the humidifier.

In some configurations applying the one or more device health assessment rules comprises comparing the resulting fluid flow rate to a threshold and determining the value of the device health parameter includes determining a reverse flow condition if the resulting fluid flow rate is greater than the threshold.

In some configurations determining the flow rate through the humidifier comprises determining an amount of electrical power delivered to a water-heating element to maintain the temperature of water in a chamber of the humidifier at or near a setpoint.

In some configurations the method comprises increasing a flow of gas from the inspiratory block of the flow generator.

In some configurations the device health parameter is a quality of a source of electrical power for the respiratory or surgical humidifier.

In some configurations the health parameter is a level of charge of one or more batteries that provide electrical power for the respiratory or surgical humidifier.

In some configurations the one or more batteries are located in the external device.

In some configurations the health parameter is a voltage of a mains power supply.

In some configurations the mains power supply is connected to the external device, which uses electrical power received from the mains power supply to provide electrical power to the respiratory or surgical humidifier.

In some configurations the device health parameter is an amount of liquid in a breathing circuit associated with the respiratory or surgical humidifier.

In some configurations the method further comprises the external device instructing the respiratory or surgical humidifier to enter a dry-our mode if the amount of liquid is above a threshold.

In some configurations the external device is a flow generator.

In some configurations a method of operating a respiratory or surgical humidifier comprises: a. providing electrical power to a heating element of the respiratory or surgical humidifier; b. receiving an indication that a flow generator is providing to the respiratory or surgical humidifier a flow of breathable gas at a first flow level after a period of providing substantially no flow to the respiratory or surgical humidifier; and c. in response to the indication, suppressing the triggering of one or more alarms.

In some configurations the heating element is in a breathing tube of the respiratory or surgical humidifier.

In some configurations the alarms include a delivered flow temperature alarm.

In some configurations the first flow level is about 3 liters per minute or more.

In some configurations a method of controlling operation of a respiratory or surgical humidifier comprises: a. determining an operational mode of a medical device that is connected to the respiratory or surgical humidifier; and b. based on the determined operational mode, controlling one or more operating parameters of the respiratory or surgical humidifier.

In some configurations the operational mode is a standby mode.

In some configurations controlling the one or more operating parameters includes reducing power provided to a heating element of the respiratory or surgical humidifier.

In some configurations the medical device is a flow generator.

In some configurations the operational mode is a silent ward mode.

In some configurations controlling the one or more operating parameters includes operating the respiratory or surgical humidifier in a dim mode, wherein in the dim mode one or more light-emitting devices of the respiratory or surgical humidifier is dimmed or turned off.

In some configurations controlling the one or more operating parameters includes operating the respiratory or surgical humidifier in a quiet mode, wherein in the quiet mode the volume and/or number of audio alerts issued from the respiratory or surgical humidifier is partly or completely reduced.

In some configurations the medical device is a flow generator, a patient monitor or a central monitoring device.

In some configurations a method of operating a respiratory or surgical humidifier comprises: a. receiving, from a patient skin sensor, data indicative of ambient temperature; and b. controlling electrical power to a heating element of the respiratory or surgical humidifier based on the data indicative of ambient temperature.

In some configurations receiving the data from the patient skin sensor includes receiving the data via a third device.

In some configurations the third device is an incubator.

In some configurations the third device is an infant warmer.

In some configurations the heating element is in a breathing tube of the respiratory or surgical humidifier.

In some configurations a system comprises: a. a respiratory or surgical humidifier including a heating element; b. a patient skin sensor configured to sense a temperature of a patient's skin, the patient skin sensor being communicatively connected to the respiratory or surgical humidifier.

In some configurations the system comprises a third device, wherein the respiratory or surgical humidifier is communicatively connected to the patient skin sensor via the third device.

In some configurations the third device is an incubator.

In some configurations the third device is an infant warmer.

In some configurations the heating element is in a breathing tube of the respiratory or surgical humidifier.

In some configurations a method of operating a respiratory or surgical ventilation and humidification system comprises: a. logging, at a respiratory or surgical humidifier, operational data of the respiratory or surgical humidifier and operational data of a flow generator connected to the respiratory or surgical humidifier; and/or b. logging, at a flow generator, operational data of the flow generator and operational data of a respiratory or surgical humidifier.

In some configurations the method comprises reconstructing, from the data logged by the respiratory or surgical humidifier or the data logged by the flow generator, behavior of the system during a period of interest.

In some configurations the period of interest includes a period leading up to an alarm or reported fault.

In some configurations a system comprises: a. a respiratory or surgical humidifier; and b. a flow generator configured to be operatively connected to the respiratory or surgical humidifier; wherein: i. the respiratory or surgical humidifier is configured to log operational data of the respiratory or surgical humidifier and operational data of the flow generator; and/or ii. the flow generator is configured to log operational data of the flow generator and operational data of the respiratory or surgical humidifier.

In some configurations the system comprises a third device configured to receive the data logged by the respiratory or surgical humidifier and/or the data logged by the flow generator.

In some configurations a method of operating a respiratory or surgical humidifier comprises: a. while the respiratory or surgical humidifier is receiving electrical power from an external power source and in response to an indication that the respiratory or surgical humidifier is going to stop receiving electrical power from the external source, powering a heating element of the respiratory or surgical humidifier for a period of time to heat water in the humidifier to a raised temperature above a normal operating temperature; and b. stopping the powering of the heating element after the period of time.

In some configurations the external power source is a power output of a medical device.

In some configurations the medical device is a flow generator.

In some configurations the indication that the respiratory or surgical humidifier is going to stop receiving electrical power is based on a user input.

In some configurations the user input is input to a user interface of the medical device.

In some configurations the water is heated to the raised temperature before the receiving of electrical power form the external source is stopped.

In some configurations the method comprises providing, from an internal power source, electrical power to components of the respiratory or surgical humidifier other than the heating element after stopping the powering of the heating element.

In some configurations a respiratory or surgical humidification system comprises: a. a respiratory or surgical humidifier including a water-heating chamber and heating element; and b. an electrical power source external to the respiratory or surgical humidifier, the electrical power source being configured to provide electrical power to the respiratory or surgical humidifier; wherein the respiratory or surgical humidifier is configured to: i. receive an indication that the respiratory or surgical humidifier is going to stop receiving electrical power from the external electrical power source; ii. in response to the indication, power the heating element for a period of time to heat water in the water-heating chamber to a raised temperature above a normal operating temperature; and iii. stop powering of the heating element after the period of time.

In some configurations the external power source is a power output of a medical device.

In some configurations the medical device is a flow generator.

In some configurations the medical device includes a user interface for receiving a user input and wherein the indication that the respiratory or surgical humidifier is going to stop receiving electrical power is based on the user input.

In some configurations the external electrical power source is an AC power source.

In some configurations the external electrical power source is a DC power source.

In some configurations the respiratory or surgical humidifier further includes a battery to provide electrical power to components of the respiratory or surgical humidifier when electrical power is not received from the external electrical power source.

In some configurations a method of operating a system including a respiratory or surgical humidifier comprises: a. outputting, from the respiratory or surgical humidifier, state data indicative of the current state of the respiratory or surgical humidifier during normal operation; b. storing, at a device external to the respiratory or surgical humidifier, the state data; and c. after a temporary interruption to normal operation of the respiratory or surgical humidifier, resuming normal operation of the respiratory or surgical humidifier in a state that is based on the stored state data.

In some configurations the temporary interruption is due to a transient condition of a mains power supply.

In some configurations the transient condition is a decrease in voltage.

In some configurations the state data includes a setpoint value associated with a heating element of the respiratory or surgical humidifier.

In some configurations the setpoint is a temperature setpoint.

In some configurations the state data includes a sensed operating temperature associated with the heating element.

In some configurations the state data includes a difference between the sensed operating temperature and the temperature setpoint.

In some configurations the state data includes a value that is proportional to the difference.

In some configurations the state data includes a value that is an integral of a series of differences.

In some configurations the state data includes a value that is a derivative of a series of differences.

In some configurations the state data includes a sensed indication of a water level in the respiratory or surgical humidifier.

In some configurations the state data includes one or more values selected from the set consisting of: a value that is proportional to the sensed indication of water level; an integral of a series of sensed indications of water level; a derivative of a series of sensed indications of water level.

In some configurations normal operation is resumed in a state based on the stored state data only if the temporary interruption is shorter than a threshold time.

In some configurations a method of operating a respiratory or surgical humidification and ventilation system comprises: a. providing electrical power from a battery-powered flow generator to a respiratory or surgical humidifier that is external to the battery-powered flow generator; b. determining that the state of charge of one or more batteries of the battery-powered flow generator is below a first threshold; and c. based on the determination: i. switch the respiratory or surgical humidifier into a low-power mode; or ii. switch the respiratory or surgical humidifier off.

In some configurations switching the respiratory or surgical humidifier into a low-power mode comprises stopping powering of one or more heating elements of the respiratory or surgical humidifier.

In some configurations the one or more heating elements includes a water-heating element.

In some configurations the one or more heating elements includes a heating element in a breathing tube.

In some configurations the method comprises operating a user interface as normal during the low-power mode.

In some configurations the method comprises displaying a low battery indication on the respiratory or surgical humidifier if the state of charge is below a second threshold, the second threshold being lower than the first threshold.

In some configurations a system comprises: a. a battery-powered flow generator having an electrical power output; and b. a respiratory or surgical humidifier external to the battery-powered flow generator and configured to receive electrical power from the electrical power output; wherein the respiratory or surgical humidifier is configured to, in response to a determination that the state of charge of one or more batteries of the battery-powered flow generator is below a first threshold: i. switch the respiratory or surgical humidifier into a low-power mode; or ii. switch the respiratory or surgical humidifier off.

In some configurations the electrical power output is an AC power output.

In some configurations the electrical power output is a DC power output.

In some configurations a method of operating a respiratory or surgical ventilation and humidification system including a respiratory or surgical humidifier and a flow generator comprises: a. determining the presence of a third device in the system; and b. providing an indication of the presence of the third device from the flow generator to the respiratory or surgical humidifier.

In some configurations the third device is a peripheral device.

In some configurations the method comprises confirming or controlling flow generator operating parameters based on the peripheral device.

In some configurations the peripheral device is a medication delivery device and the flow generator controls the timing of gas supply from the flow generator based on the timing of medication delivery by the medication delivery device.

In some configurations the peripheral device is a source of helium, the method comprising calibrating one or more sensors of the respiratory or surgical humidifier for sensing parameters of gases comprising helium.

In some configurations the peripheral device has stored thereon configuration and/or identification information and wherein the operation of the respiratory or surgical humidifier and/or the flow generator is controlled based on the configuration and/or identification information of the peripheral device.

In some configurations the third device is a patient monitoring device or a central monitoring device.

In some configurations the respiratory or surgical humidifier and/or the flow generator enter(s) a quiet alert mode based on the presence of the patient monitoring device or central monitoring device, wherein in the quiet mode the volume and/or number of audio alerts issued from the respective device is partly or completely reduced.

In some configurations, lights of the humidifier can be dimmed in the quiet mode.

In some configurations a method of controlling a respiratory or surgical humidifier comprises: i. receiving, via one or more communication interfaces of the respiratory or surgical humidifier, information regarding the composition of a supply of one or more gases for the respiratory or surgical humidifier; and ii. in response to the information, calibrating one or more sensors of the respiratory or surgical humidifier for use with the gas(es).

In some configurations the information comprises information indicating that the one or more gases include helium.

In some configurations the information comprises information indicating that the one or more gases include helium and oxygen.

In some configurations the information comprising information indicating that a flow generator is currently, or will be, operating in a Heliox mode.

In some configurations the sensor(s) comprise one or more sensors selected from the group consisting of temperature sensors, pressure sensors, flow sensors, volume sensors, moisture sensors, gas composition sensors, gas concentration sensors, and humidity sensors.

In some configurations a respiratory or surgical humidifier comprises: one or more gas inlets; one or more communication interfaces; one or more sensors; one or more processors; and one or more memory devices; one or more of the memory device(s) having stored thereon instructions for causing one or more of the processor(s) to: i. receive, via one or more of the communication interface(s), information regarding the composition of a supply of one or more gases for the respiratory or surgical humidifier; and ii. in response to the information, calibrate one or more of the sensor(s) for use with the gas(es).

In some configurations the information comprising information that the gas(es) include helium.

In some configurations the information comprises information indicating that the gases include helium and oxygen.

In some configurations the information comprising information indicating that a flow generator is currently, or will be, operating in a Heliox mode.

In some configurations the sensor(s) comprise one or more temperature sensors.

In some configurations a method of operating a respiratory or surgical ventilation and humidification system comprises: a. determining one or more characteristics of one or more gases to be supplied to a respiratory or surgical humidifier; and b. transmitting, from a flow generator and to the respiratory or surgical humidifier, information indicative of the determined characteristics.

In some configurations the flow generator is a ventilator.

In some configurations the characteristics comprise temperature.

In some configurations the method further comprises c. controlling an operational parameter of the respiratory or surgical humidifier using the information.

In some configurations a respiratory or surgical flow generator comprises: a gas outlet; a communication interface; one or more processors; and one or more memory devices; one or more of the memory devices having stored thereon instructions for causing one or more of the processor(s) to: i. determine one or more characteristics of one or more gases to be supplied from the gas outlet; and ii. transmit information indicative of the determined characteristics from the communication interface.

In some configurations the flow generator is a ventilator.

In some configurations the respiratory or surgical flow generator further comprises one or more sensors configured to determine the characteristics.

In some configurations the characteristic(s) comprise temperature.

In some configurations a respiratory or surgical ventilation and humidification system comprises the flow generator described in the preceding paragraphs and a respiratory or surgical humidifier; the respiratory or surgical humidifier comprising a communication interface configured to receive the information indicative of the characteristic(s).

In some configurations, the respiratory or surgical humidifier of the respiratory or surgical ventilation and humidification system further comprises: a gas inlet for receiving gases from the respiratory or surgical flow generator; a gas outlet for providing a flow of humidified breathing gases; a humidification chamber including a heating element; one or more processors; and one or more memory devices; one or more of the memory devices having stored thereon instructions for causing one or more of the processors to: i. control operation of the heating element using the information indicative of the characteristic(s).

In some configurations a method for facilitating configuration of a device comprises: a. obtaining, by a respiratory or surgical humidifier, configuration information for a medical device external to the respiratory or surgical humidifier; and b. providing, by the respiratory or surgical humidifier, the obtained configuration information to the medical device.

In some configurations a device or system is configured to perform any one of the methods summarized above.

In some configurations a flow generator can be an anesthesia machine.

In some configurations a flow generator can operate in a Heliox mode to provide a mixture of helium and oxygen to a humidifier.

In some configurations an adapter can allow communication between devices having different types of communication interfaces.

In some configurations the adapter can allow communication between devices using different communication standards.

In some configurations the adapter can form part of a respiratory or surgical humidifier.

In some configurations the adapter can be external to the respiratory or surgical humidifier.

In some configurations the adapter can allow communication between a respiratory or surgical humidifier and a flow generator.

In some configurations the respiratory or surgical humidifier can have a USB or RS-232 25-pin interface.

In some configurations devices in a respiratory or surgical humidification and/or ventilation system can be configuration to transmit and/or receive power over communication connections.

In some configurations the devices could transmit/receive power over USB or Ethernet connections.

In some configurations a set of adapters can be provided.

In some configurations the compatibility of devices in the system can be checked.

In some configurations the compatibility between a flow generator such as a ventilator and another device such as a respiratory or surgical humidifier can be checked.

In some configurations it can be checked whether flow parameters provided by the flow generator or the operating mode of the flow generator are compatible with breathing circuit components.

In some configurations, if the system includes breathing circuit components or other peripherals for use with neonates, it can be checked if the flow parameters or operating mode of the flow generator is suitable for use with neonates.

In some configurations, the humidifier can measure characteristics (e.g. resistance to flow, compliance, or volume) of connected peripherals/breathing circuit components (such as a breathing tube or patient interface) to determine their type and compatibility with the flow generators operation/mode.

In some configurations customizable scripts can be transferred between devices of a respiratory or surgical ventilation and/or humidification system.

In some configurations, one device (e.g. a flow generator such as a ventilator) can instruct another device (e.g. a respiratory or surgical humidifier) to perform a maintenance action such as a maintenance check or sterilization routine.

In some configurations, one or more devices of a respiratory or surgical ventilation and/or humidification system can track the service life and/or usage so far of a consumable.

In some configurations, one or more devices of a respiratory or surgical ventilation and/or humidification system can track the remaining service life and/or usage of a consumable.

In some configurations information about the consumables' service life can include how many days a consumable (e.g. a breathing tube) has been used for.

In some configurations information about the service life of the consumables can include how long a patient has been receiving therapy using the consumable.

In some configurations devices of a respiratory or surgical humidification and/or ventilation system can access or receive data from each other's logged data.

In some configurations the devices can compare, combine and/or reconcile the logs.

In some configurations two devices' logs may record information recording a single event but with different times.

In some configurations, the time discrepancy can be accounted for when comparing logs or used to adjust time data in one of the logs.

In some configurations, a respiratory or surgical humidifier can include a user interface that is integral with the rest of the humidifier.

In some configurations, a respiratory or surgical humidifier can be provided with a user interface that is removable from the rest of the humidifier or a remote device separate from the rest of the humidifier.

In some configurations, a respiratory or surgical humidifier comprises: a communication interface configured to communicate with another device using one of a plurality of communication protocols; one or more processors; and one or more memory devices, one or more or the memory devices having stored thereon instructions for causing one or more of the processor(s) to: i. select, from the plurality of communication protocols, a communication protocol suitable for communication with the other device; and ii. communicate with the other device using the selected communication protocol.

In some configurations, a system comprises the respiratory or surgical humidifier described above and a cable, wherein the cable includes: a first electrical connector at a first end of the cable, the first electrical connector being configured to electrically connect to an electrical connector of the communication interface of the humidifier; and a second electrical connector at a second end of the cable, the second electrical connector being configured to connect to an electrical connector of a communication interface of the other device.

In some configurations, the system further comprises one or more other cables, wherein: the first electrical connector of each cable is the same type of electrical connector as the first electrical connector of each other cable; and the second electrical connectors of the cables are not all the same type of electrical connector.

Where the construction "and/or" is used it refers to the inclusive form of "or" known as the Boolean OR operator, meaning "(and) or (or)". Unless the context implies otherwise, where the term "or" is used it refers to the inclusive form of "or".

BRIEF DESCRIPTION OF THE DRAWINGS

These and other features, aspects, and advantages of the present disclosure are described with reference to the drawings of certain embodiments, which are intended to schematically illustrate certain embodiments and not to limit the disclosure.

DETAILED DESCRIPTION

Figure 1:
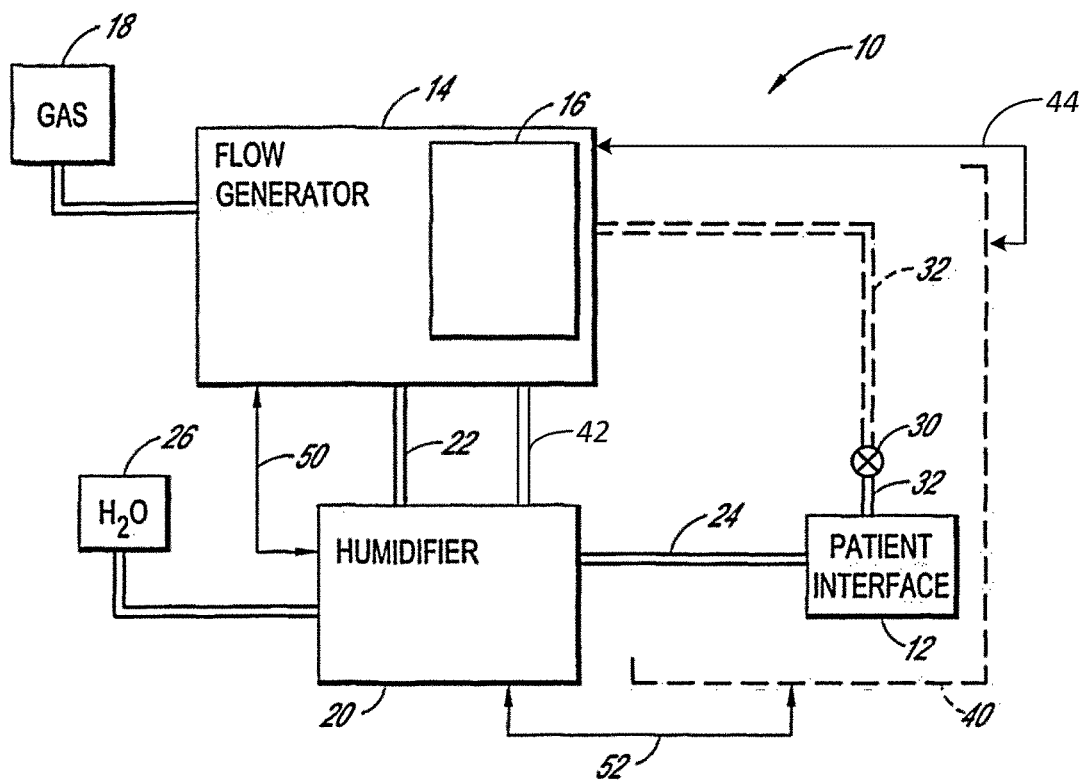
FIG. 1 illustrates an example respiratory or surgical humidification and ventilation system.

Although certain embodiments and examples are described below, those of skill in the art will appreciate that the disclosure extends beyond the specifically disclosed embodiments and/or uses and to obvious modifications and equivalents thereof. Thus, it is intended that the scope of the disclosure herein disclosed should not be limited by any particular embodiments described below. For example, component values and operating parameters are examples only and are not limiting.

Example Respiratory or Surgical Humidifier

The present disclosure provides examples of a respiratory or surgical humidifier configured to supply humidified and/or heated gas to a patient or user in multiple modes. The modes for the humidifier can include at least an invasive mode (for example, for patients with a bypassed airway) and a non-invasive mode (for example, for patients or users with breathing masks). Each mode can have a number of humidity settings, which can be expressed as a dew point or absolute humidity. The humidifier is controlled to deliver, at an outlet of the humidification chamber and/or the patient end of the gas supply tube, humidified gases having a dew point (or absolute humidity) at or near a predetermined humidity level. For example, a user can select a setting appropriate for the current mode of operation. A number of humidity settings may be provided, for example, the humidity settings may be equivalent to a dew point of about 37 degrees Celsius, about 31 degrees Celsius, about 29 degrees Celsius, about 27 degrees Celsius, or others. The humidity setting equivalent to a dew point of about 37 degrees Celsius may be suitable for invasive therapy (i.e., where the patient's upper airways are bypassed) whereas the other humidity settings may be suitable for non-invasive therapy, although the humidity settings may not be restricted to a particular type of therapy. Alternatively, each humidity setting may be continuously variable between upper and lower limits. A lower humidity setting may be selected by the user to reduce condensation or "rain-out" in the gas supply tube or to improve patient comfort, or a higher humidity setting may be selected to improve physiological benefits. Some humidifier systems disclosed herein can also include a high flow mode, unsealed mode, or any other modes known to those of skill in the art. The disclosed devices and components may be similarly applied in a surgical humidifier which may be used, for example, in laparoscopic or open surgery.

High flow therapy as discussed herein is intended to be given its typical ordinary meaning, as understood by a person of skill in the art, which generally refers to a respiratory assistance system delivering a targeted flow of humidified respiratory gases via an intentionally unsealed patient interface with flow rates generally intended to meet or exceed inspiratory flow of a patient. Typical patient interfaces include, but are not limited to, a nasal or tracheal patient interface. Typical flow rates for adults often range from, but are not limited to, about fifteen liters per minute to about sixty liters per minute or greater. Typical flow rates for pediatric patients (such as neonates, infants and children) often range from, but are not limited to, about one liter per minute per kilogram of patient weight to about three liters per minute per kilogram of patient weight or greater. High flow therapy can also optionally include gas mixture compositions including supplemental oxygen and/or administration of therapeutic medicaments. High flow therapy is often referred to as nasal high flow (NHF), humidified high flow nasal cannula (HHFNC), high flow nasal oxygen (HFNO), high flow therapy (HFT), or tracheal high flow (THF), among other common names. For example, in some configurations, for an adult patient 'high flow therapy' may refer to the delivery of gases to a patient at a flow rate of greater than or equal to about 10 liters per minute (10 LPM), such as between about 10 LPM and about 100 LPM, or between about 15 LPM and about 95 LPM, or between about 20 LPM and about 90 LPM, or between about 25 LPM and about 85 LPM, or between about 30 LPM and about 80 LPM, or between about 35 LPM and about 75 LPM, or between about 40 LPM and about 70 LPM, or between about 45 LPM and about 65 LPM, or between about 50 LPM and about 60 LPM. In some configurations, for a neonatal, infant, or child patient 'high flow therapy' may refer to the delivery of gases to a patient at a flow rate of greater than 1 LPM, such as between about 1 LPM and about 25 LPM, or between about 2 LPM and about 25 LPM, or between about 2 LPM and about 5 LPM, or between about 5 LPM and about 25 LPM, or between about 5 LPM and about 10 LPM, or between about 10 LPM and about 25 LPM, or between about 10 LPM and about 20 LPM, or between about 10 LPM and 15 LPM, or between about 20 LPM and about 25 LPM. A high flow therapy apparatus with an adult patient, a neonatal, infant, or child patient, may deliver gases to the patient at a flow rate of between about 1 LPM and about 100 LPM, or at a flow rate in any of the sub-ranges outlined above.

High flow therapy can be effective in meeting or exceeding the patient's inspiratory demand, increasing oxygenation of the patient and/or reducing the work of breathing. Additionally, high flow therapy may generate a flushing effect in the nasopharynx such that the anatomical dead space of the upper airways is flushed by the high incoming gases flow. The flushing effect can create a reservoir of fresh gas available for each and every breath, while minimizing re-breathing of carbon dioxide, nitrogen, etc.

The patient interface for use in a high flow therapy can be a non-sealing interface to prevent barotrauma, which can include tissue damage to the lungs or other organs of the patient's respiratory system due to difference in pressure relative to the atmosphere. The patient interface can be a nasal cannula with a manifold and nasal prongs, and/or a face mask, and/or a nasal pillows mask, and/or a nasal mask, and/or a tracheostomy interface, or any other suitable type of patient interface.

FIG. 1 illustrates a respiratory humidification system, which is generally referred to by the reference number 10. The system 10 can provide a flow of humidified breathing gas to a user or patient (not shown) through an appropriate patient interface 12 and provides for communication of system data between two or more components of the system 10. The illustrated system 10 includes a flow generator 14 that can provide a flow of a suitable breathing gas. In some examples herein, the flow generator 14 can be a ventilator that can provide air, oxygen or an air/oxygen mixture to the patient interface 12 at a continuous or variable pressure above ambient pressure. In other examples, the flow generator can be a surgical flow generator or an insufflator to provide gas(es) for surgical insufflation. In other examples, the flow generator can be an anesthesia machine. In one example, the flow generator 14 is an electronic flow generator that includes electronic or computer control of certain functions, such as the timing, pressure, volume or flow rate of the breathing gas supplied by the flow generator 14. The flow generator 14 also includes a memory for storing relevant flow generator data and operating protocols.

In one example, the flow generator 14 also includes a user interface 16 that displays flow generator operating data and information. In one example, the user interface 16 also permits a user to interact with the flow generator 14 by entering data or information, or setting or confirming various operating settings or modes of the flow generator 14. The user interface 16 can be of any suitable arrangement, including a display screen in combination with user inputs, such as buttons, knobs, keys, a navigation ring and the like. In one preferred arrangement, the user interface 16 can be a touch screen capable of displaying information and receiving user inputs. The touch screen can be the only user input, or can be used in combination with other user inputs, such as those previously described.

In the illustrated system 10, a source of breathing gas 18, which can be a gas cylinder, a wall supply or any other suitable source or combination of sources of breathing gas, is connected to the flow generator 14. The breathing gas can be air, oxygen, a blend of air and oxygen, or any other suitable gas for use in respiratory therapy, such as hydrogen, helium or nitrogen. In some examples, the flow generator 14 can provide Heliox, which is a mixture of helium and oxygen. Heliox would be provided at a suitable ratio of oxygen to helium, for example 20:80 oxygen:helium. The flow generator can operate to provide Heliox upon user input, for example when a Heliox button is pressed. In some examples, the flow generator 14 utilizes room air or ambient air alone or in combination with one or more gases from the source of breathing gas 18 to create a flow of breathing gas. The flow generator 14 can be capable of precisely blending the ambient air and the breathing gas from the source of breathing gas 18 and delivering the blended air and gas (collectively referred to as "breathing gas") in accordance with a desired value or range of one or more parameters, such as pressure, volume, flow rate or time. In other embodiments, the flow generator 14 does not utilize ambient or room air.

The flow of breathing gas output from the flow generator 14 can be delivered to a humidifier system, or humidifier 20, by a suitable conduit, such as an inspiratory tube or supply tube 22. Supply tube 22 is sometimes also referred to in the art as a dry line, as it generally supplies dry (or relatively dry) gases to the humidification chamber. The humidifier 20 provides humidity or vaporized liquid, such as water, to the flow of breathing gas received from the flow generator to output a flow of humidified breathing gas to the patient interface 12 through a suitable conduit, such as a supply tube 24. In one example, the humidifier 20 can output a flow of humidified breathing gas at a set-point or desired temperature and absolute or relative humidity, such as an optimal temperature of about 37 degrees Celsius and absolute humidity of about 44 mg/L or relative humidity of 100%, or within a desirable or acceptable range of the optimal temperature and absolute or relative humidity. For example, an acceptable range of the absolute humidity may be any value at or above about 33 mg/L or a corresponding relative humidity of about 74.85% at 37 degrees Celsius.

The humidifier 20 can include a humidifier unit and a humidification chamber. The humidification chamber can hold a volume of liquid, such as water, which is heated by the humidifier unit to create a vapor within the humidification chamber that is transferred to the flow of breathing gas. The humidification chamber can be an auto-fill variety, in which a source of liquid 26 (e.g. a water bag) is connected to the humidification chamber to refill the volume of liquid, as appropriate. Examples of the basic construction and operation principles of the humidifier unit are the MR850 and F&P 950 humidifiers sold by Fisher & Paykel Healthcare Ltd., the Assignee of the present application. A suitable humidification chamber is the MR225 or MR290 humidification chamber sold by the Assignee of the present application. However, as described herein, the present humidifier 20 is also configured for electronic communication with one or more of the other components of the system 10, for example including a ventilator or other flow generator 14.

The supply tube 24 can be a heated supply tube such that a temperature of the flow of breathing gas is maintained at an elevated level within the supply tube 24 and to avoid or limit condensation within the supply tube 24 or patient interface 12. The supply tube 24 can be considered part of the humidifier 20. The supply tube 24 can also be known as a breathing tube and is also referred to as a breathing tube herein. The supply tube 24 can include a heating element that is connected to a power or heat source. In one example, the humidifier 20 is configured to power the heating element. A sensor or probe (not shown in FIG. 1) can be coupled to the humidifier 20, for example at supply tube 24 or outlet of the humidification chamber, to detect a parameter of the flow of humidified breathing gas, such as the temperature and/or flow rate of the flow of breathing gas through the supply tube 24. In one example, the sensor is spaced from the inlet end of the supply tube 24 and, in some arrangements, can be located at the outlet end of the supply tube 24. In some examples, the sensor can be provided in a sensor cartridge, optionally along with one or more other sensors. In some examples, the sensors can be external to the humidifier 20. The sensor can be coupled to the humidifier 20 to transmit sensor data (e.g., temperature and/or flow rate) to a control circuit of the humidifier 20. The humidifier 20 can utilize information from the sensor to control the operating parameters of the humidifier 20, such as a power level of a heating plate or element to, for example, maintain the temperature and/or humidity of the flow of breathing gas within the supply tube 24 at a desirable level or within a desirable or acceptable range.

From the humidifier 20, the flow of humidified breathing gas is supplied to the patient interface 12, which can be any suitable type of interface capable of supplying a breathing gas to the respiratory system of the patient. For example, the interface 12 can be a face mask that covers both the nose and mouth of the patient or a nasal mask that covers only the nose of the patient. Other suitable patient interfaces 12 can also be used, such as a nasal interface, which can include nasal cannula, nasal prongs or other structures that are inserted into the nares of the patient or an appropriate interface device, such as a catheter mount, in combination with an endotracheal tube, tracheostomy (trach) tube, or other invasive interface.

In some embodiments, the interfaces 12 provide a sealed or substantially sealed system that delivers the flow of breathing gas to the patient and receives expiratory gases from the patient. In one example, the system 10 is a biased flow system in which breathing gas is constantly flowing within the system 10 generally in a direction from the inlet of the patient interface 12 to the outlet of the patient interface 12. Thus, the patient can inhale a portion of the flow of breathing gas and the remainder is passed through the patient interface 12. Exhaled or expiratory gases can mix with the flow of breathing gas and exit the patent interface 12 along with the unused portion of the flow of breathing gas. For convenience, the gases exiting the patient interface 12 are referred to as expiratory gases or the flow of breathing gas, although it is understood that either or both of patient exhaled gases and unused breathing gases can be present at any particular point in time.

In some applications, such as neonatal applications, for example, expiratory gases flow from the patient interface 12 to an optional expiratory pressure device 30, which is configured to regulate the minimum pressure within the system 10, for example to a level above ambient or atmospheric pressure. In one example, the expiratory pressure device 30 is connected to the patient interface 12 by a suitable conduit, such as an expiratory tube 32. The expiratory pressure device 30 can be of any suitable arrangement depending on the particular system 10, type of flow generator 14 or therapy protocol. For example, the expiratory pressure device 30 can be an expiratory valve or exhalation port, which regulates the exit of expiratory gases from the system 10. The expiratory valve 30 can be located remotely from the flow generator 14 or can be located at or can be integral with the flow generator, in which case the expiratory tube 32 can extend to the flow generator 14 as illustrated by the dashed lines in FIG. 1 (and other figures herein). In an alternative arrangement, the expiratory pressure device 30 can be connected directly to or integrated with the patient interface 12.

In one example, the expiratory pressure device 30 is configured to provide a minimum pressure or minimum backpressure within the system 10 and, in particular, at the patient interface 12, which can be referred to as the positive end expiration pressure (PEEP). In some systems, the PEEP is generally equivalent or equivalent to the continuous positive airway pressure (CPAP). Accordingly, such a device 30 can be referred to as a CPAP generator. In some arrangements, the expiratory pressure device 30 can be an oscillatory valve capable of providing pressure oscillations relative to a mean PEEP pressure. One type of oscillating pressure expiratory pressure device 30 is a fluid resistance valve, in particular a liquid or water resistance valve, which is often referred to as a bubbler. In general, a water resistance valve delivers the expiratory gases to an outlet that is submerged in a water reservoir resulting in a resistance to the exit of the expiratory gases that is greater than that caused by ambient or atmospheric pressure and related to the depth of the outlet relative to a surface of the water within the water reservoir. In some arrangements, the depth of the outlet is adjustable to allow the PEEP to be adjusted to a desired level. One suitable bubbler is the Bubble CPAP generator sold by the Assignee of the present application. Additional details of a suitable bubbler device are described in U.S. Pat. No. 6,805,120, which is incorporated by reference herein in its entirety. In one example, the bubbler (or other oscillatory pressure device) is capable of producing vibrations in the patient's chest at a frequency of between about 5-30 Hz.

However, the expiratory pressure device 30 is not necessary and, in many applications, can be omitted. The expiration gases can be exhausted from the system 10 in any suitable manner by any suitable arrangement, such as a simple exhalation port that may, or may not, regulate or assist in regulating the pressure within the system 10. In some arrangements, the expiratory tube 32 can extend from the patient interface 12 to the flow generator 14 without incorporating the expiratory pressure device 30. An exhalation port or valve can be incorporated in the flow generator 14 to regulate the discharge of the expiration gases in any appropriate manner. For example, the exhalation port or valve can have a closed position in which expiration gases cannot be discharged and an open position in which expiration gases can be discharged, with or without substantial resistance.

The illustrated system 10 can be considered to have an inspiratory circuit and an expiratory circuit. In the illustrated arrangement, the inspiratory circuit can include all or portions of the flow generator 14 (and source of breathing gas 18), the supply tube 22, the humidifier 20, and the supply tube 34. The expiratory circuit can include all or portions of the expiratory tube 32 and the optional expiratory pressure device 30. A portion of the patient interface 12 can be predominantly occupied by a flow of inspiratory breathing gas prior to inspiration by the patient or prior to availability to the patient, while another portion of the patient interface 12 can be predominantly occupied by a flow of expiratory gas exhaled by the patient or that has bypassed the patient.

Accordingly, the patient interface 12 can be considered to form a part of each of the inspiratory circuit and the expiratory circuit. A portion of the patient interface 12 can also include a mixture of inspiratory gas and expiratory gas, at least for certain time durations, and may not be considered part of either of the inspiratory circuit or the expiratory circuit or may be considered as a part of each.

Certain portions of the system 10 can be referred to as a breathing circuit, which is generally indicated by the reference number 40. Typically, the breathing circuit 40 includes at least the conduit or tubing that transmits the flow of breathing gas between the components of the system 10. In some cases, the breathing circuit can also include the patient interface 12 and/or the humidifier 20 or portions thereof (e.g., the humidifier chamber). In the illustrated arrangement, the breathing circuit 40 can include one or more of the supply tube 22, the supply tube 24 and the expiratory tube 32. The tubes 22, 24, 32 of the breathing circuit 40 can be corrugated tubes, or tubes constructed from a flexible plastic material, which can be reinforced with a reinforcing structure, such as a spiral wound reinforcing member. The tubes 22, 24, 32 of the breathing circuit 40 can be somewhat resilient in nature, which can result in the tubes 22, 24, 32 flexing or deforming (e.g., expanding and contracting) in response to pressure changes within the system 10. This deformation of the tubes 22, 24, 32 causes the total volume of the breathing circuit 40 to vary in response to the system pressure, which is referred to as the "compliance" of the breathing circuit 40. The compliance of the particular breathing circuit 40 is useful information to assist the flow generator 14 in precisely controlling the delivery of the breathing gas because the change in volume of the system 10 could otherwise be interpreted as breathing gas that is being utilized by the patient.

Another characteristic of the system 10 that is useful information to assist the flow generator 14 in precisely controlling the delivery of the breathing gas is the leak rate of the system 10. The leak rate is the rate of loss of breathing gas from the system 10 as a result of leaks between components of the system 10, between the patient interface 12 and the patient, or other system losses. The total leak rate can be broken down into leak rate portions within various portions of system 10. In particular, a determination or estimation of the leak rate within the breathing circuit 40 can be useful information to assist the flow generator 14 in precisely controlling the delivery of the breathing gas. The leak rate for a particular breathing circuit 40 could be estimated, such as based on a theoretical calculation or actual measurement of a sample size of the breathing circuit model. The leak rate for a particular breathing circuit 40 could also be measured at the time of manufacture.

The breathing circuit 40 can also include a portion that handles both inspiratory flow and expiratory flow of breathing gas. The volume of such a portion defines a dead space of the breathing circuit 40, which is also useful information to assist the flow generator 14 in precisely controlling the delivery of the breathing gas by permitting the flow generator 14 to determine the actual volume of breathing gas utilized by the patient. Some or all of the information regarding the breathing circuit 40, such as the compliance, leak rate and dead space, can be provided with the breathing circuit 40, for example in electronic or electronically readable form, such as some type of non-volatile memory (EEPROM, RFID, barcode, etc.), for use by the system 10 as described below. Alternatively or additionally, some or all of the information regarding the breathing circuit 40 can be stored in one or more memory devices of the humidifier 20.

The humidifier 20 could receive this information over a communication interface of the humidifier 20, the information could be input by a user via user interface of the humidifier 20, or the humidifier 20 could determine properties of the breathing circuit. In some examples, the humidifier 20 could determine one or characteristics of the breathing circuit 40 and store these in its memory. The characteristics may be determined by taking measurements of the breathing circuit (such as resistance to gas flow, compliance or volume) and comparing these to entries in a look-up table, stored in humidifier memory, that relates measurement values to characteristics of the breathing circuit 40. In some examples, the humidifier can include a recognition system for recognizing identifying elements of, or associated with, the breathing circuit or components thereof. For example, the humidifier could have a physical recognition system that, for example receives a mechanical key associated with a breathing circuit or breathing circuit component to recognize the breathing circuit or component. Additionally or alternatively, the humidifier can include an electrical or electronic recognition system that recognizes the breathing circuit or breathing circuit component based on electrical or electronic characteristics or information, (for example an identification resistor, or a unique ID stored in a memory) of, or associated with, the breathing circuit or breathing circuit component. Based on recognizing the identifying element, the humidifier can determine the type of breathing circuit or breathing circuit component. The humidifier can compare the type of breathing circuit or component to entries in a look-up table, stored in humidifier memory, that relates the type of breathing circuit or component to characteristics (e.g. compliance, dead space etc.) to determine the characteristics of the breathing circuit or components thereof.

The system 10 is configured to permit electronic communication between two or more components of the system 10. In the illustrated arrangement, the humidifier 20 and the flow generator 14 are capable of electronic communication through a communication connection 50. In some examples, the humidifier 20 can also communicate directly or indirectly with other devices in the system such as components of the breathing circuit 40. For example, the humidifier 20 can be capable of electronic communication with components of the breathing circuit through a communication connection 52 between the humidifier 20 and the breathing circuit 40. Additionally or alternatively, a communication connection 44 can be provided between the flow generator 14 and the breathing circuit 40 and the humidifier 20 can communicate with one or more components of the breathing circuit 40 over the connections 44 and 50 via the flow generator 14. The communication connections 44, 50, 52 can be of any suitable arrangement, including a wired connection or wireless connection and utilizing any suitable communication protocol. The communication connections 44, 50, 52 can be direct between the system components or indirect (e.g., through other system components or over a network, such as a Wi-Fi network or the internet). In some examples, one or more of the communication connections 50, 52 can provide serial communications using serial communication interfaces of the humidifier 20 and another device with which it communicates, such as the flow generator 14. The serial communication interface could be an RS-232 interface or USB, for example. In some examples, the humidifier 20 includes an Ethernet interface for communicating with one or more other devices, such as the flow generator 14. In some examples, the humidifier 20 can include an interface that is compatible with a number of different communication protocols, e.g. a "universal" interface or multi-protocol interface. This can allow the humidifier to communicate with a number of different devices having different types of communication interfaces. The humidifier interface can have an electrical connector that can be connected to by a corresponding connector at one end (the "humidifier end") of a cable. The other end of the cable (the "other-device end") would have an electrical connector configured to connect to an electrical connector of a communication interface of another device, such as a flow generator, patient monitoring device, personal computing device etc. Because different devices can have different electrical connector types (e.g. USB-A, USB-B, USB-C, RJ45, 8P8C, connectors compliant with the RS-232, RS-422 or RS-485 standards, or a custom or proprietary connectors), the connector at the other-device end of the cable can be any type corresponding to the connector type of the other device. The cable has one or more wires electrically connecting the electrical connectors and providing a path for electrical communication between them. A range of cables could be constructed, the cables all having the same type of electrical connector at their humidifier ends but having different types of electrical connector at their other-device ends. The humidifier can be connected to any of a range of other devices having different connector types using a suitable cable. The humidifier can communicate using any of a number of different communication protocols for compatibility with different communication interfaces of the other devices. For example, the humidifier can communicate according to a USB, Ethernet, RS-232. RS-422 or RS-485 protocol or a custom or proprietary protocol. The humidifier could detect the type of communications interface/protocol being used by the other device. This could be detected automatically once the humidifier detects that another device has been connected to the humidifier communication interface, for example. Alternatively or additionally, the type of communication interface/protocol used by the other device can input by a user, for example by selecting it using the user interface. The humidifier can then communicate according the communication protocol used by the other device. Additionally or alternatively, the humidifier could have a power-line communication module for sending and receiving data signals modulated onto a power line. For example, the humidifier could receive power from the flow generator. In some cases, the humidifier and flow generator could each have a combined power and communication interface. The humidifier and flow generator could communicate using data modulated onto a power line or using separate power and data lines in a single physical connector. In other examples, one or more of the communication connections can be a wireless communication connection. For example, the humidifier could have a Wi-Fi, Bluetooth, Zigbee or cellular technology (e.g. 3G, 4G, 5G, LTE-Advanced) communication interface. Wireless communications between the humidifier and other device(s) can be within a local network such as a wireless local area network (WLAN) or mesh network or via the internet. The humidifier and other device(s) can be configured as "internet of things" (IOT) devices. The system 10 could also include an adapter to allow communication between devices having different interface types. For example, the humidifier 20 could communicate with the flow generator 14 over the communication connection 50 using an adapter. The adapter could form part of the humidifier 20 or could be external to the humidifier 20. The adapter could be or include a physical adapter to allow a connector (e.g. plug or socket) of one type to connect, via the adapter, to a connector (e.g. socket or plug) of another type. The adapter could be or include a "universal", "multiple" or "N-in-1" (where "N" is an integer greater than 1) adapter to allow communication between a range of different communication interfaces. Alternatively, a set of adapters may be provided to allow communication between a range of different communication interfaces. The adapter could be or include software or firmware elements to adapt transmissions from one communication standard to another. In some examples, the adapter(s) can be connected between an interface of one type (e.g. a USB or RS-232 25-pin plug or socket) on the humidifier and an interface of the same or a different type on the flow generator 14. The adapter can translate communications according to one standard (e.g. a USB or RS-232 standard) into communications according to another standard (e.g. a different version of a USB or RS-232 standard, an Ethernet standard, or a wireless communication standard) and (optionally) vice-versa. Devices in the system 10 can also be configured to transmit and/or receive power over communication connections such as communication connections 44, 50 and 52. In some examples, this could include receiving power over a USB connection (e.g. via a USB-C cable) or an Ethernet connection. For example, the flow generator 14 can be configured to provide power to the humidifier via the communication connection 50.

With such an arrangement, information can be transmitted between the humidifier 20 and the breathing circuit 40, between the humidifier 20 and the flow generator 14, and/or between the flow generator 14 and the breathing circuit 40. For example, information relating to the breathing circuit 40 can be transmitted to the humidifier 20, which can be used by the humidifier 20 to set or confirm one or more operating parameters or operating modes of the humidifier 20. Components of the breathing circuit 40 can have data storage devices that store information that could be used to set or confirm operating parameters of the humidifier. For example, a device for use in neonatal care could store information that identified it as a neonatal care device. The humidifier could use this information to confirm a neonatal operation mode. The breathing circuit device could directly specify humidifier operating parameters that it is suitable for use with, such as particular humidity ranges or breathing gas temperatures, which the humidifier could then use to set its operating parameters to comply with. The information about components in the breathing circuit 40 could be provided to the humidifier by the flow generator. The flow generator could obtain this information over the communication connection 44, via a user input to its user interface 16, or could infer it from its mode of operation. The information relating to the breathing circuit 40 could also be provided by the humidifier 20 to the flow generator 14, which can utilize the information to set or confirm one or more operating parameters or operating modes of the flow generator 14. Information relating to the humidifier 20 can also be communicated to the flow generator 14 for a similar purpose. The flow generator 14 can also communicate to the humidifier 20 characteristics of the gases provided to the humidifier via the supply tube ("dry line") 22. These characteristics can be determined at locations upstream of the inlet to a humidification chamber of the humidifier 20, for example in the dry line 22 or at an outlet of the flow generator 14. The operation of the humidifier 20 can then be controlled based on these characteristics, which may improve the humidifier's ability to respond to changes in the gas flow provided from the flow generator 14 (e.g. by shortening its response time to such changes). This may also improve the tuning of the humidifier's operating parameters (e.g. heating element temperature) to characteristics of the flow of gases from the flow generator 14. In one example, the flow generator 14 can transmit to the humidifier 20 information indicative of the temperature of gases that it provides to the humidifier 20 (upstream of the humidifier). The humidifier 20 can then take this information into account when controlling the temperature of at least one heating element, for example one or more of a heater plate, inspiratory heater wire, and expiratory heater wire. Additionally or alternatively, the flow generator 14 could transmit information regarding the humidity and/or gas composition of the gases to the humidifier 20, which can then control its operation taking this information into account. For example, the humidifier 20 could control power to a heating element of the humidification chamber or a heating element of one or more breathing tubes (e.g. an inspiratory tube 24 and/or an expiratory tube 32) based on sensed temperature upstream of the humidifier 20. Alternatively or additionally, the humidifier 20 could control the power provided to a heating element of the humidification chamber based on a sensed humidity of the gases upstream of the humidifier 20. Alternatively or additionally, the flow generator could provide to the humidifier 20 information indicative of the gas flow rate, gas pressure, or flow characteristics of gas flow supplied by the flow generator. The characteristics can include the maximum or minimum values (e.g. of flow rate or pressure), flow generator waveform (e.g. flow rate or pressure as a function of time), or amplitude or frequency of the flow generator waveform.

In some arrangements, the system 10 can be configured to check the compatibility of the flow generator or its operating mode with one or more other devices or their operating modes. For example, flow generators 14 can be configured to provide breathing gases to adults or to pediatric patients such as children, infants or neonates. Some flow generators 14 can have different operating modes that allow them to provide breathing gases to different patient types (e.g. adults, children, infants or neonates) depending on which mode is selected. It may be important to maintain compatibility of devices and modes in the system to ensure suitable treatment is provided to a patient. For example, gas flow parameters (such as flow rates) and breathing circuit components or other peripherals (such as breathing tube 24, patient interface 12 or other consumables) that are suitable for adults may not be suitable for pediatric patients (such as neonates) and vice-versa. Also, gas flow parameters that are suitable for adults may be incompatible with breathing circuit components/peripherals for pediatric patients as vice-versa. To ensure compatibility between the flow generator 14 and other components of the system 10, the humidifier 20 can transmit information to the flow generator regarding the other components, for example over the communication connection 50. For example, the humidifier 20 could transmit to the flow generator 14 information that indicates that the breathing tube 24 is a neonate breathing tube. The flow generator 14 could then compare this information to its current operating mode to determine if the operating mode is suitable for use with a neonate and only commence operation in this mode if it is suitable. In another example, the humidifier 20 could transmit to the flow generator 14 information that indicates that the breathing tube 24 is an adult breathing tube. The flow generator 14 could compare this information to its current mode and commence operation in this mode only if the mode is suitable for use with an adult. By enabling the flow generator 14 to determine the compatibility of other devices from received information about those devices, the set-up time of the system 10 may be reduced. For example, in other systems a flow generator may perform a start-up test to determine what type of breathing tube or other consumable (e.g. flow sensor or patient interface) is connected to it. The start-up test could be based on resistance to gas flow in the breathing circuit. The need for such tests may be completely or partly obviated by the described compatibility check, allowing some or all of the start-up test(s) to be eliminated. Alternatively, the start-up test(s) and compatibility check may both be used to provide greater assurance that the flow generator 14 and other system component(s) are suitable for use with each other. The humidifier 20 can obtain information about the other devices in the system 10 over one or more communication connections (e.g. communication connection 52) or it can perform one or more tests to determine this information. For example, the humidifier can measure one or more characteristics (e.g. resistance to gas flow, compliance or volume) of breathing circuit 40 components (e.g. breathing tube 24) and provide this information to the flow generator. In one example, the humidifier can measure the resistance to gas flow of the breathing circuit 40, which may be indicative of the type of breathing tube 24, and provide this information to the flow generator 14. In some examples, the humidifier 20 can receive information regarding the type or mode of flow generator 14 to determine compatibility with the flow generator 14. For example, the humidifier 20 can compare the flow generator 14 type or mode (e.g. adult, pediatric or neonate) to information regarding breathing circuit 40 components (e.g. adult breathing tube or pediatric breathing tube or neonatal breathing tube). The humidifier can then control its operation based on this comparison, for example by indicating on a user interface whether the flow generator type or mode is compatible or not. Alternatively or additionally, the humidifier 20 and/or the flow generator 14 could raise an alarm if an incompatible mode, device or component is detected. The alarm could be, for example, an audio or visual alarm emitted by the humidifier and/or flow generator. In some examples, the humidifier 20 and/or flow generator 14 could communicate an alarm to another device such as a patient monitor or central monitoring device.

In some arrangements, the communication connections 44, 50, 52 (or other communication connections) can allow control signals to be transmitted between various components of the system 10 to permit one component to control another component. For example, the flow generator 14 can set or confirm one or more operating parameters or operating modes of the humidifier 20. The flow generator 14 can control the humidifier 20 automatically or can allow a user of the system 10 to set or confirm one or more operating parameters or operating modes of the humidifier 20 utilizing the user interface 16. Customizable scripts can be transferred between devices of the system 10 to cause device-specific operations in the receiving device(s). In one example, the flow generator 14 can instruct the humidifier 20 to perform a maintenance action, for example a periodic (e.g. yearly) maintenance check or a sterilization routine. Information or data transmitted between the components of the system 10 can also include any type of information that is relevant to the operation or configuration of the system 10. For example, configuration information such as update files can be transferred between devices in the system, as well as information about a current configuration of a device such as a current software version. Devices can also transmit authentication information to enable them to be authenticated by other devices of the system. Information about the presence of other "third" or more devices in the system can be shared between two devices, for example the flow generator 14 can inform the humidifier 20 about peripherals in the system 10 (including presence of a helium or Heliox supply for a Heliox mode) or devices such as incubators in the breathing circuit 40. Devices can also transmit data about their current state. This can include information about their current operation include control setpoints (e.g. temperature, power, humidity, flow rate setpoints), sensed values of control parameters (e.g. temperature, power consumption, humidity, flow rate); other state information including alarm status, information about consumables (e.g. service life so far, usage time so far, service life remaining or usage time remaining), authentication status of other device (e.g. list of authenticated devices), correct connection of gas flow tubes, mode of operation (e.g. on, off or standby mode, quiet mode, Heliox mode of a flow generator, type or composition of gas supplied to or by a flow generator 14), power source information (e.g. mains-powered or battery powered, battery charge level, mains voltage or presence of transients), or patient information such as how long a patient has been receiving treatment. Information about the consumables' service life can include how many days a consumable (e.g. a breathing tube) has been used for. Information about the service life of the consumables can include how long a patient has been receiving therapy using the consumable, what patient interface is connected, how long sensors have been in use for, how much water is in the breathing circuit (e.g. in inspiratory tube 25 and/or expiratory tube 32), how much water is left in the humidifier chamber, how much water is left in liquid source 26, how many times electrical connections of a consumable (e.g. inspiratory tube 24 or expiratory tube 32) have occurred, and how many low-temperature events or high-temperature events have occurred. Information about the mode of operation of one device of the system 10 can be used to control the operation of another device of the system 10. For example, information about the type or composition of gas supplied by the flow generator 14 can be taken into account by the humidifier 20 when performing measurements using sensor data, which may be affected by the gas type or composition. For example, the accuracy of readings provided by a flow sensor of the humidifier can depend on thermal and other physical properties of the gas in the flow. Helium, for example, has a relatively low density, high thermal conductivity and high specific heat capacity compared to some other breathing gases. Any flow sensors in the humidifier 20 may need to be calibrated to account for this when the flow of gas through the humidifier includes helium, for example when the flow generator 14 is operating in a Heliox mode. When operating in the Heliox mode, the flow generator 14 can transmit information indicating this mode setting, and optionally indicating the composition of the supplied gases (e.g. ratio of helium to oxygen), to the humidifier 20. The humidifier 20 can use this information to calibrate its flow sensor(s) to continue to provide accurate readings in the Heliox mode. Similarly, the type or composition of the gas may affect measurements of other sensors, such as temperature sensors, pressure sensors, volume sensors, moisture sensors, and humidity sensors, and the information about the gas type or composition can be used to calibrate one or more of these sensors. State information can also include information relevant to computational or control processes such as an error between a set point and a sensed value, a value proportional to the error, a derivative of a series or errors or an integral of a series of errors.

In some arrangements, the communication connections 44, 50, 52 (or other communications connections) can allow devices of the system 10 to access or receive data logged on other devices of the system 10. The devices can combine, compare and/or reconcile the logs. For example, two devices' logs might include information recording a single event but with the records indicating different times for the event. In some cases, one or both of the devices could transmit its current time to the other. This could be done upon a request from the other device or automatically upon a time discrepancy between log entries being detected. Once received, the transmitted time can be compared the time of the receiving device to assist in determining any time discrepancy between the devices. The time discrepancy could be accounted for when reading one or more of the logs, when recording data into one or more of the logs, or it could be used to adjust the clock of one or more of the devices. For example, the flow generator's log might record that it increased the gas flow rate at 11:00 am. The humidifier's log might, however, record that it detected the increase in flow rate at 11:3 am. This implies that the humidifier's clock is 3 minutes ahead of the flow generator's clock. This value itself could constitute the time discrepancy that is accounted for or used to adjust a device's clock, or the devices' current times could be compared to determine the time discrepancy. The time discrepancy could be accounted for when the logs are read by offsetting times of one of the logs by 3 minutes, for example. Alternatively, one of the logs could be modified by adjusting event times by 3 minutes to reconcile the time entries with those of the other log. Alternatively or additionally, the clock of one of the devices could be adjusted by 3 minutes to be in synchrony with that of the other device, which may avoid or reduce future time discrepancies. Synchronizing the devices' clocks, or accounting for any time discrepancies between the devices' clocks/recorded log entries, may allow events in the devices logs to be linked or correlated. This may assist in reconstructing events as discussed with reference to FIG. 15, for example.

The flow generator 14 can also be provided with a power output for providing electrical power to other devices of the system 10. In the example of FIG. 1, a power connection 42 is provided between the flow generator 14 and the humidifier 20. This enables the humidifier to be powered by the flow generator. This could be in addition to, or instead of, a mains power supply or an internal battery. In some examples, the power connection 42 could be a DC power connection supported by a DC power output of the flow generator 14. In other examples, the power connection 42 could be an AC power connection supported by an AC power output of the flow generator 14.

Figure 2:
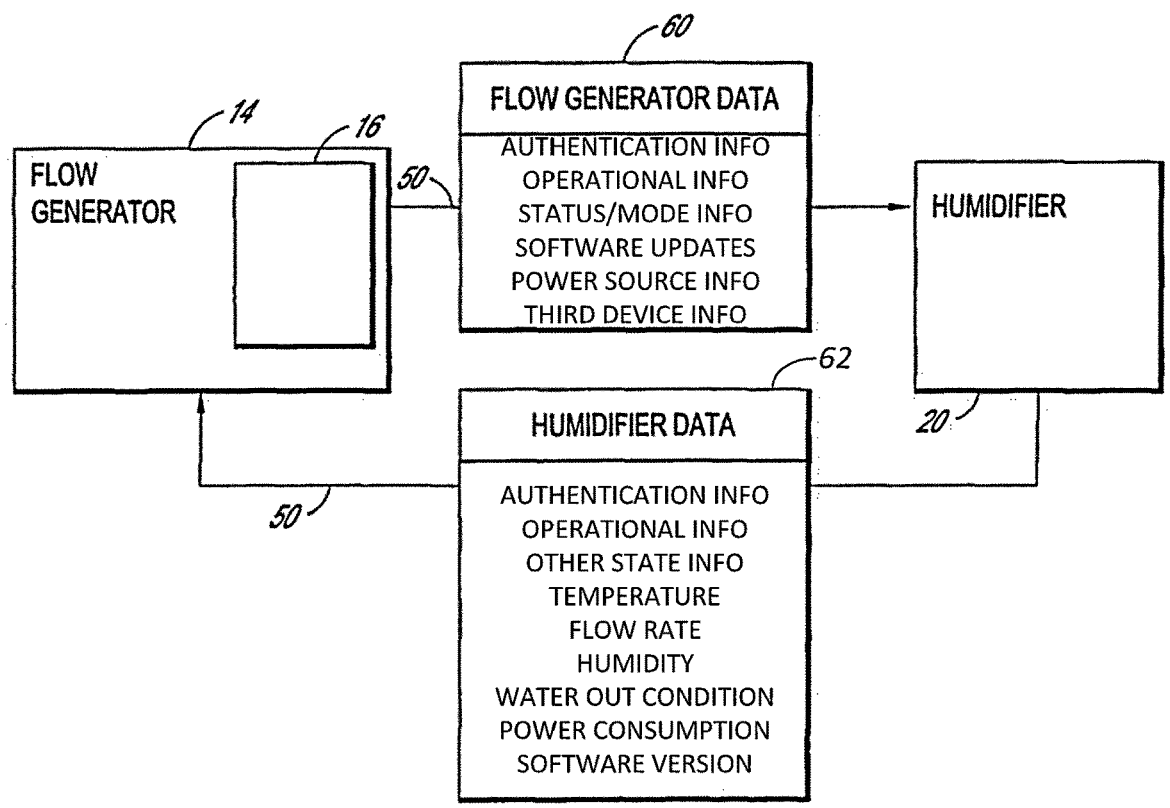
FIG. 2 illustrates example communications between a humidifier and a flow generator.

FIG. 2 illustrates an example of a flow of information between the flow generator 14 and the humidifier 20. As described above, information relating to the flow generator 14 can be transmitted to the humidifier 20 over the communication connection 50. As illustrated in block 60, the flow generator 14 can transfer to the humidifier information including authentication information (described in further detail below), operational information (such on/off/standby, alarm state, self-test results (including measured values related to the breathing circuit 40 such as compliance, leak rate and dead space), error state), status or mode information (such as patient type (adult, pediatric, neonatal/infant), therapy type (invasive, non-invasive, high flow, CPAP, BiPAP or others), target tidal volume), configuration information (e.g. software updates), power source information (such as mains, battery, backup generator) and information about third (or more) devices in the system (such as sensors (pulse oximeter, electrocardiogram, motion), other medical devices (such as an incubator, infusion pump, anesthesia machine, surgical tools), central monitoring systems, and/or other networked devices such as mobile phones and/or computers). The flow generator can also transmit other information that is relevant to the operation of the flow generator, such as: flow rate, ventilation waveform (breathing pattern) (or related information characterizing the waveform such as maximum and/or minimum flow rate across the waveform, periodicity of the waveform, average flow rate across the waveform or other similar values), error status, temperature, humidity, gas composition and/or concentration(s), and/or pressure. The humidifier 20 can utilize this information to assist in the optimization of the operating parameters of the humidifier 20 (e.g. to provide better humidity generation, breathing circuit condensation management, and improved error detectability). The humidifier can also use this information to update its configuration, set or confirm a mode of operation, control its power consumption and/or authenticate the flow generator. As illustrated in block 62, the information or data relating to the humidifier 20 can be transmitted to the flow generator 14 over the communication connection 50. The humidifier data transferred to the flow generator can include authentication information (as further described below), operational and other state information (such as patient or therapy mode, breathing circuit type, alarm state or other information), sensed values such as temperature, flow rate, humidity, water out condition (or water level) and power consumption, and/or information identifying the current software version of the humidifier. The humidifier information 62 can also include error status or alarm conditions, or the compliance, leak rate and dead space of the breathing circuit 40.

Figure 3:
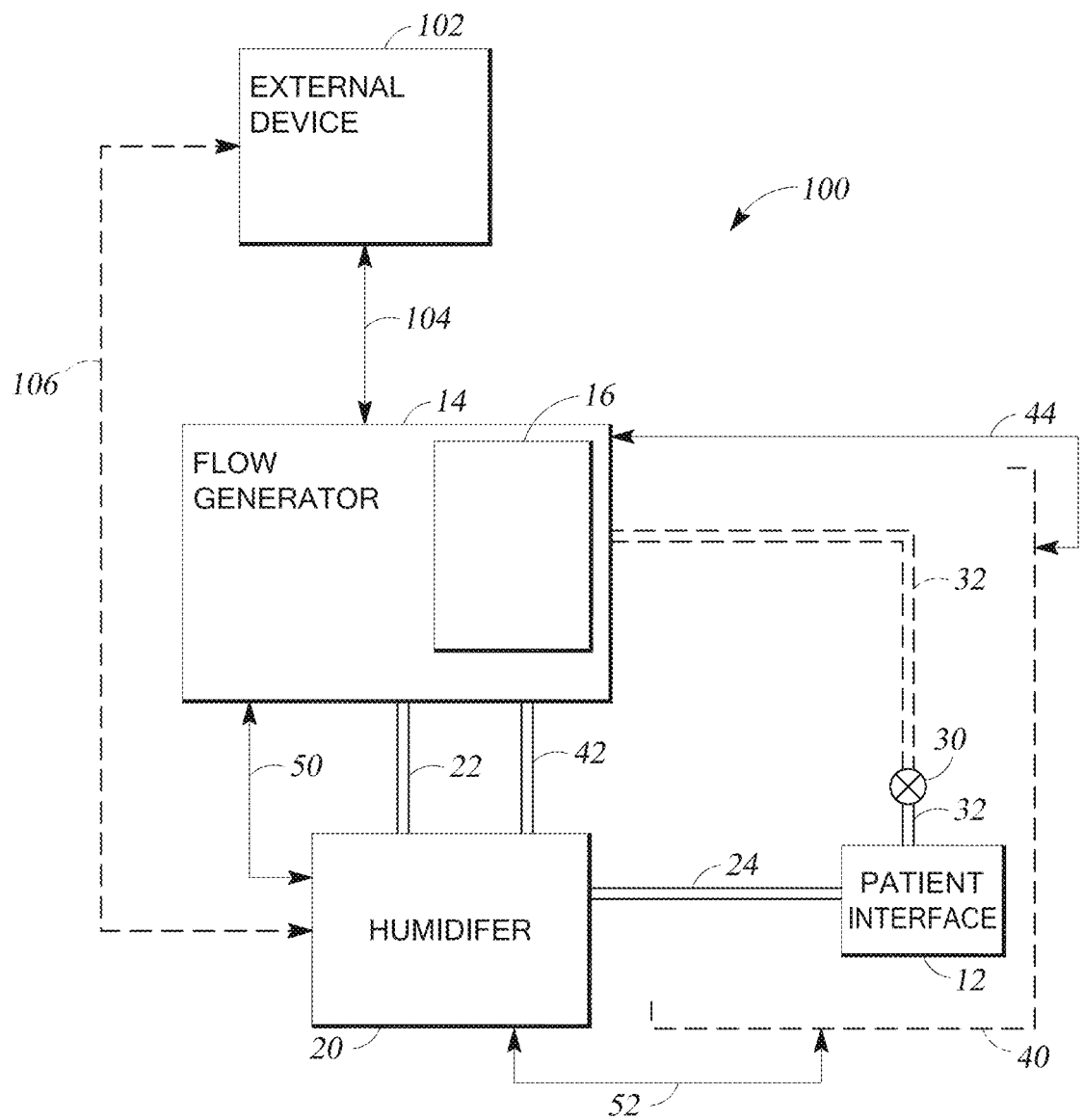
FIG. 3 illustrates another example respiratory or surgical humidification and ventilation system.

FIG. 3 illustrates a respiratory humidification system 100 that is similar to the system 10 of FIG. 1 but additionally includes an external device 102, which is external to the flow generator 14 and the humidifier 20. The external device can be a supervisory or monitoring device such as a patient monitor or a central monitoring system. The system 100 includes a flow generator 14, which has a user interface 16. The flow generator 14 supplies a flow of breathing gas to a humidifier 20 through a supply tube 22. Although not shown, a source of breathing gas can supply breathing gas to the flow generator 14. The humidifier 20 supplies a flow of humidified breathing gas to a patient interface 12 through a supply tube 24. Although not shown, the humidifier 20 can be connected to a source of water or other fluid for refill purposes. The patient interface 12 delivers expiration gases to an expiratory tube 32. An optional expiratory pressure device 30 can be connected to the patient interface 12 by the expiratory tube 32. As described above, if provided, the expiratory pressure device 30 can be located remotely from the flow generator 14 or can be located at or can be integral with the flow generator 14, in which case the expiratory tube 32 can extend to the flow generator 14 as illustrated by the dashed lines in FIG. 3. The breathing circuit 40 can include the supply tubes 22 and 24 along with the expiratory tube 32. In one example, the flow generator 14 and humidifier 20 are electronically connected for communication with one another by a communication connection 50. Similarly, the humidifier 20 and breathing circuit 40 can be electronically connected for communication with one another by a communication connection 52. These communication connections 50 and 52 can be the same as those detailed above with reference to FIG. 1.

The illustrated system 100 is connected for communication with an external device 102, such as a central monitoring system by a suitable communication connection 104, which can be wired or wireless. The communication connection 104 can be similar to one of the communication connections 50 and 52 discussed above and can use corresponding communication interfaces on the flow generator 14 and external device 102.

In the example where the external device 102 is a central monitoring system, the central monitoring system is usually located remotely from the system 100 and can collect and display information from the system 100 to allow monitoring from the remote location. Typically, the central monitoring system collects and displays data from a plurality of individual patient systems, including those similar to or different from system 100. Thus, the central monitoring system permits remote monitoring of a plurality of patient systems. Aside from a central monitoring system, the external device 102 could be one of several other types of external, remote or central systems, such as an electronic patient data recordation system. Electronic patient record keeping is becoming increasingly common and is used for patient diagnostics, fault finding and to supplement or replace paper records. Thus, the system 100 can be configured to publish data to an electronic patient data recordation system. Other external devices 102 could include, for example, a dedicated update server, one or more authentication servers to assist in an authentication process, another medical device such as an incubator, or another humidifier.

In some examples, the communication connection 104 between the system 100 and the external device 102 originates from the flow generator 14 on the system 100 end. Thus, in these examples data from the system 100 is communicated to the external device 102 through the flow generator 14. In a respiratory humidification system that includes a flow generator such as a ventilator, the humidifier is often viewed as a support device. In other examples, the humidifier 20 could communicate directly with the external device 102 via a communication connection 106. The communication connection 106 could be provided instead of the communication connection 50 with the flow generator or in addition to it.

As with the system of FIG. 1, a communication connection 44 can be provided between the flow generator 14 and the breathing circuit 40. This would allow for communications between the flow generator 14 and components of the breathing circuit 40. It can also provide for communications between components of the breathing circuit 40 and the external device 102, the humidifier 20, or another device via the flow generator 14.

In one example, in the illustrated system 100, the flow generator 14 can collect information from the other system components, such as the humidifier 20 or breathing circuit 40, and transmit the information to the external device 102 along with the flow generator data.

As noted above, in some arrangements the system 100 can provide for direct communication between the humidifier 20 and the external device 102, such as via communication connection 106. In such an arrangement, system data can be communicated between the humidifier 20 and the external device 102. System data can include information related to the humidifier 20 or, in some arrangements, the humidifier 20 can obtain information from other system components such that the system data communicated between the humidifier 20 and the external device 102 includes information from system components in addition to or other than the humidifier 20. For example, other system components (e.g., the flow generator 14 or breathing circuit 40) can provide information to the humidifier 20, which can transmit the system data to the external device 102 via the communication connection 106.

As with the system 10 of FIG. 1, a power connection 42 can be provided between the flow generator 14 and the humidifier 20. This could be supported by an AC power output or a DC power output of the flow generator 14.

Figure 4:
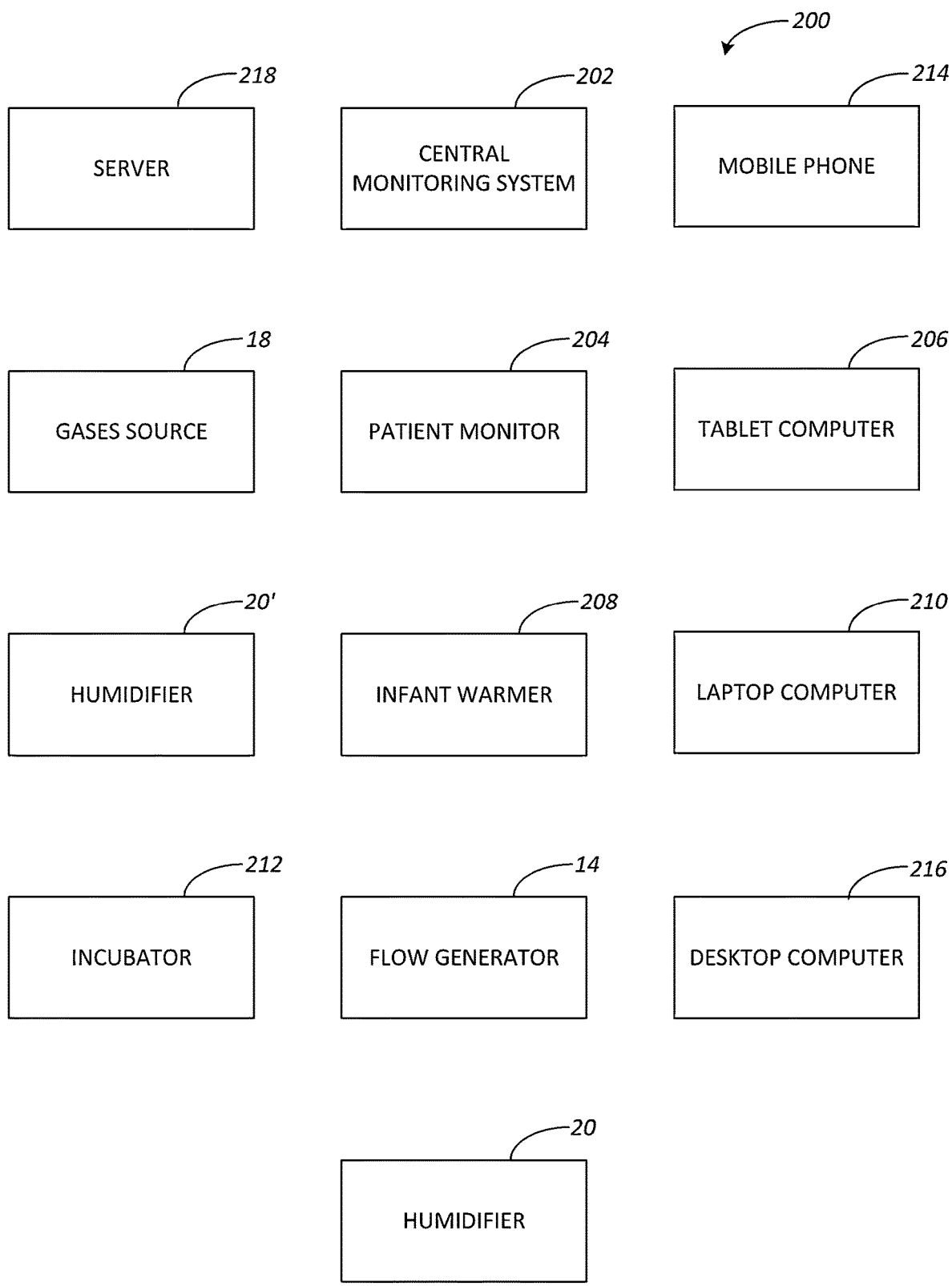
FIG. 4 illustrates an example humidifier environment.

FIG. 4 illustrates an exemplary environment 200 in which the humidifier 20 can operate. The humidifier 20 can communicate with one or more of the other devices in the environment 200 either directly or indirectly, for example via the flow generator 14. The other devices in the environment 200 could also be communicatively connected to each other and could relay communications to or from the humidifier 20.

The environment 200 in this example can include medical devices such as one or more of each of the gases source 18, a patient monitor 204, another humidifier 20', an infant warmer 208, an incubator 212 and a flow generator 14. The environment 200 can also include one or more personal computing devices such as the mobile phone 206, tablet computer 210, laptop computer 214 and desktop computer 216. The environment 200 could also include one or more servers 218. The environment can also include a central monitoring system 202, which can include one monitoring device or several devices networked together.

Devices of the environment 200 can be configured to operate with each other. This may be useful for ensuring interoperability of a humidifier and another medical device. The medical device can obtain configuration information for the humidifier and provide it to the humidifier 20. Providing the configuration information from the medical device to the humidifier can allow the medical device to ensure that the configuration information possessed by the humidifier is compatible with the configuration of the medical device. It may also be useful in the situation in which the humidifier does not have a direct communication connection to the source of the configuration information. The humidifier 20 can then be updated according to that configuration information, either under its own control or under the control of the medical device. The configuration information can be obtained from a third device, for example the central monitoring system 202, a configuration server, or one of the personal computing devices 206, 210, 214, 216. As well the configuration information for the humidifier 20, the medical device can also obtain configuration information for itself and configure itself according to that configuration information. Whether or not each of the humidifier and the other medical device is updated can be based on a comparison of the current configuration of the respective device and the obtained configuration information for that device. For example, one of the devices can already be configured according to the obtained configuration information, so it will not need to be configured again. The updating of one or both of the devices can occur as part of a single configuration process. In some examples, configuration information for a plurality of devices is contained in a single configuration file. The configuration file can be encrypted, and the configuration information for each device can be encrypted separately from the configuration information for the other device. The configuration information can be used to update the devices, for example to the latest version of software and/or firmware for the device. Hence, the configuration information for each device can be considered an update and a single update file, folder or package can include both updates. The devices can be updated with the configuration information sequentially. Alternatively, the devices can be updated in parallel (i.e. simultaneously, or at least partly overlapping in time), or asynchronously (e.g. irrespective of the timing or stage of each other's update process). In some examples, the update process can be extended to one or more further devices such that a first device receives configuration information for a second device and a third device (and optionally further devices), provides the configuration information to the second device, and the second device provides the configuration information for the third device to the third device (and so on for optional further devices). In these examples, the configuration information may be included in a single file. This configuration information may be hierarchically structured into files such that a first update file (received by the first device) includes configuration information (e.g. an update) for the first device and a second update file for provision to the second device, the second update file includes configuration information for the second device and a third update file for provision to the third device, the third update file contains configuration information for the third device and optionally so on for any number of optional further devices. In this way, configuration or updates of the devices can be "daisy-chained". Customizable scripts, for example as described with reference to FIG. 1, could be included along with the configuration information. For example, a customizable script for a given device could be included in the configuration file for that device. In one exemplary implementation, the first device could be a flow generator (e.g. the flow generator 14 of FIG. 1), the second device could be a humidifier (e.g. the humidifier 20 of FIG. 1), and the third device could be a sensor cartridge (e.g. the sensor cartridge described with reference to FIG. 1).

Figure 5:
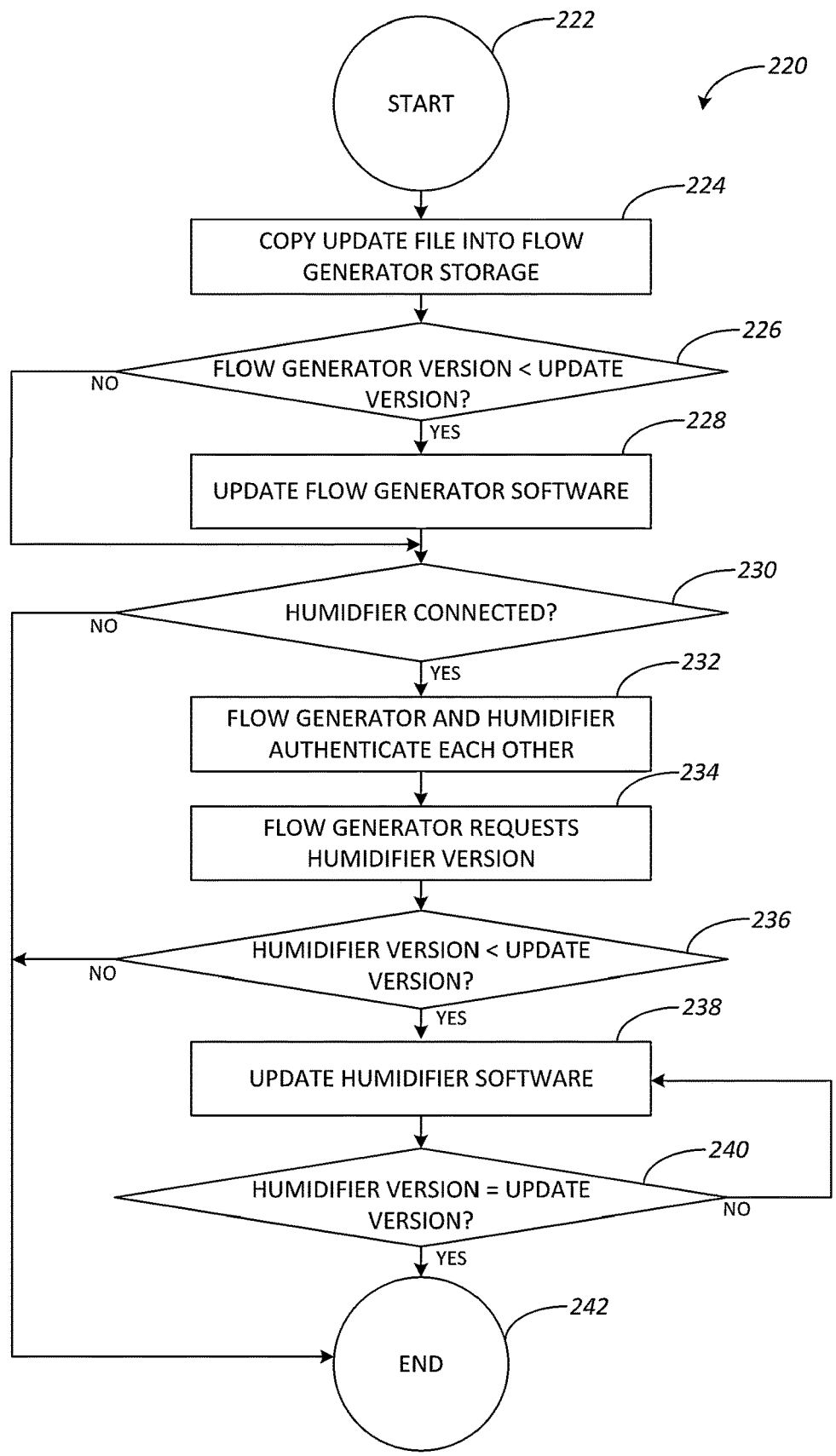
FIG. 5 illustrates an example update method.

FIG. 5 shows an exemplary update process 220. In this example, the update process 220 is coordinated by a flow generator that obtains the update file, determines whether a humidifier requires an update and provides the update to the humidifier if needed. The process 220 could also be performed using a different medical device than the flow generator, such as any one of the other medical devices 18, 204, 20', 208, 212 of FIG. 4. In these alternative examples of the process 220, the steps performed by the flow generator in the process detailed below would be performed by the other medical device. The update process could be extended or "daisy-chained" to a third device and optionally further devices in the manner set out above.

At step 222 the update process 220 is started. This could be caused by a user selecting an update option using a user interface of the flow generator or humidifier. Alternatively, the update process 220 could be started automatically upon detection that the humidifier is communicatively connected to the flow generator. In another example, the update process 220 could be started when an instruction from a third device, such as the central monitoring system 202 or one of the personal computing devices 206, 210, 214 of FIG. 4, is received by the flow generator.

The flow generator will then obtain an update file and copy it into an internal storage location at step 224. The update file includes two updates-one for the flow generator (or other medical device, in other examples) and one for the humidifier.

At step 226, the flow generator compares the version of its current software to the version of the update so determine if its current version is older than the obtained update version. Each version of the software would have an associated identifier, which would typically be a version number. In this case, comparing versions would involve comparing version numbers to see if the version number of the obtained version is greater than the number of the current version. If the current flow generator version is not earlier than the obtained update version, the flow generator does not need to be updated and the process moves to step 230. If the current flow generator version is less than the obtained update version, the process moves to step 228 in which the flow generator is updated.

At step 230, the flow generator determines if a humidifier is connected or not. If no humidifier is connected, the process 220 ends at step 242. If a humidifier is connected, the flow generator and humidifier can authenticate each other at step 232. This may help to ensure that the humidifier and flow generator (or other medical device, in other examples) are intended to operate with each other. In other examples, the authentication step 232 can be omitted.

At step 234, the flow generator requests a version identifier from the humidifier. This is to determine whether the humidifier needs to be updated. As with the flow generator version identifier, this can be a version number.

At step 236, the flow generator compares the humidifier's current version to the update version. If the humidifier version is not earlier than the update version, the process 220 can end at 242 because the humidifier does not need to be updated. If the humidifier version is less than the update version, the humidifier software is updated at step 238. This can involve the flow generator providing the update for the humidifier to the humidifier. The humidifier update could be extracted from the update file and provided alone, or the entire update file (which also includes the update for the flow generator) could be provided to the humidifier. The humidifier can then install the update.

At step 240 the flow generator confirms that the humidifier has been updated by comparing the current humidifier software version to the update version. If these are equal, the humidifier has been updated and the process ends at 242. If the versions are not equal, the process can loop back to step 238 to update the humidifier.

By this process 220, the flow generator and humidifier may both be kept up to date with software and compatibility of their software versions may be ensured. In the example shown in FIG. 5, the devices (flow generator and humidifier) are updated sequentially. As noted above, devices can be updated in parallel or asynchronously. For example, in a variation on the method shown in FIG. 5, the steps 226 and 228 for updating the flow generator can be performed in parallel with, or asynchronously with respect to, the steps 234, 236, 238 and 240 for updating the humidifier. In these examples, the detection and authentication steps 230 and 232 can be performed before the updating steps 226, 228, 234, 236, 238 and 240.

Figure 6:
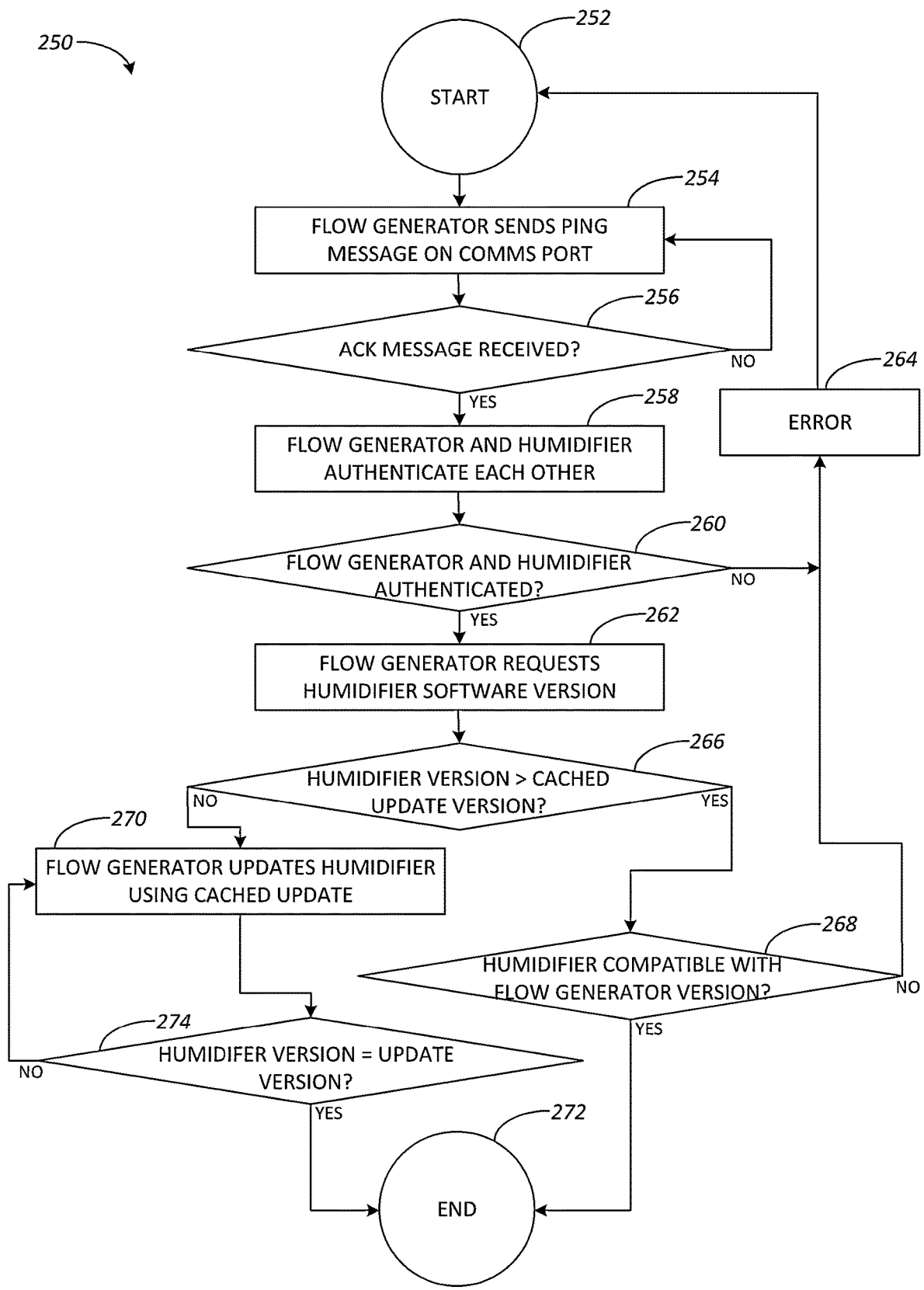
FIG. 6 illustrates another example update method.

Another update process 250 is shown in FIG. 6. As with the process 220 of FIG. 5, this is detailed in the context of a humidifier being updated by a flow generator, but it could also be performed by another medical device in place of the flow generator. This process 250 can be used to update a humidifier upon connection to a flow generator (or other medical device) that is already configured with the latest software version and has retained the update file (or at least the update for the humidifier) in storage. In one scenario, the flow generator could have been updated when no humidifier was connected—e.g. by following steps 222, 224, 226, 228, 230 and 242 of the process 220 of FIG. 5. In another scenario, the flow generator and a first humidifier could have been updated in the process 220 of FIG. 5. Subsequently, the method 250 could be used to update another humidifier. The update process could be extended or "daisy-chained" to a third device and optionally further devices in the manner set out above.

The process 250 starts at step 252.

The flow generator monitors its communication interface by sending a ping message at step 254.

At step 256, the flow generator checks for an acknowledgement message ("ACK" message) in response to the ping. If no ACK message is received, the process loops back to step 254 to continue monitoring the communication interface. If an ACK message is received, this indicates that a humidifier is connected and the process 250 can move to step 258.

At step 258 the flow generator and humidifier authenticate each other. If the authentication step 260 fails, an error can be determined at 264 and the process can return to the start 252. In some examples, step 258 and 260 can be omitted.

At step 262, the flow generator requests information about the humidifier's current software version. This is to determine if the humidifier needs to be updated.

At step 266, the flow generator compares the humidifier's current software version to the stored update version for the humidifier, which can be stored in a cache for rapid retrieval. In some cases, a humidifier may have received a later update than the one that is stored on the flow generator. If the humidifier's current software version is later than the cached update version, the process can move to step 268 to determine if the humidifier's software version is compatible with the flow generator's version.

In some cases, the humidifier may have been updated to a software version which is not compatible with the flow generator. For example, the humidifier may have a software version which includes a mode that is not compatible with a flow generator that is still operating on an earlier version of software. If it is determined that the humidifier version is compatible with the flow generator version, the process 250 can end at 272. If the humidifier version is not compatible with the flow generator version an error can be determined at 264 and the process 250 can return to the start 252.

If the outcome of the comparison in step 266 is that the humidifier version is not later than the cached version, the process moves to step 270 in which the humidifier is updated. The update step 270 can involve the flow generator providing the cached update for the humidifier (or the whole update file) to the humidifier, which can then install the update.

At step 274 the flow generator confirms that the humidifier has been updated by comparing the current humidifier software version to the update version. If these are equal, the humidifier has been updated and the process ends at 272. If the versions are not equal, the process loops back to the update step 270.

As noted above, devices such as the humidifier and flow generator can be authenticated as part of the update process. More generally, it may be useful to authenticate a device in a humidification and/or ventilation system. It may be important to ensure that a device operating in the system is authentic or is otherwise intended or approved to operate in the system. It may also be important to restrict the ability of a device to communicate with other devices of the system until it is authenticated. Respiratory or surgical ventilation and humidification systems support the breathing and oxygen intake of patients and the present application provides methods that may ensure their security and reliability of operation.

In one example, a device is authenticated to determine whether it can perform communications in a respiratory or surgical humidification and/or ventilation system. This can involve the device providing authentication information to another device of the system. The authentication information is then checked to determine whether the device can be approved for further communications. The device could be one of the medical devices of FIG. 4. In some examples, two devices of the system authenticate each other. The two devices could be a flow generator and a humidifier.

In another example, a device is authenticated to determine whether it can operate in a respiratory or surgical humidifier and/or ventilation system. This can involve the device providing authentication information to another device of the system. The authentication information is then checked to determine whether the device can be approved to operate in the system, for example as part of the breathing circuit. The device could be one of the medical devices of FIG. 4. In some examples, two devices of the system authenticate each other. The two devices could be a flow generator and a humidifier.

Figure 7:
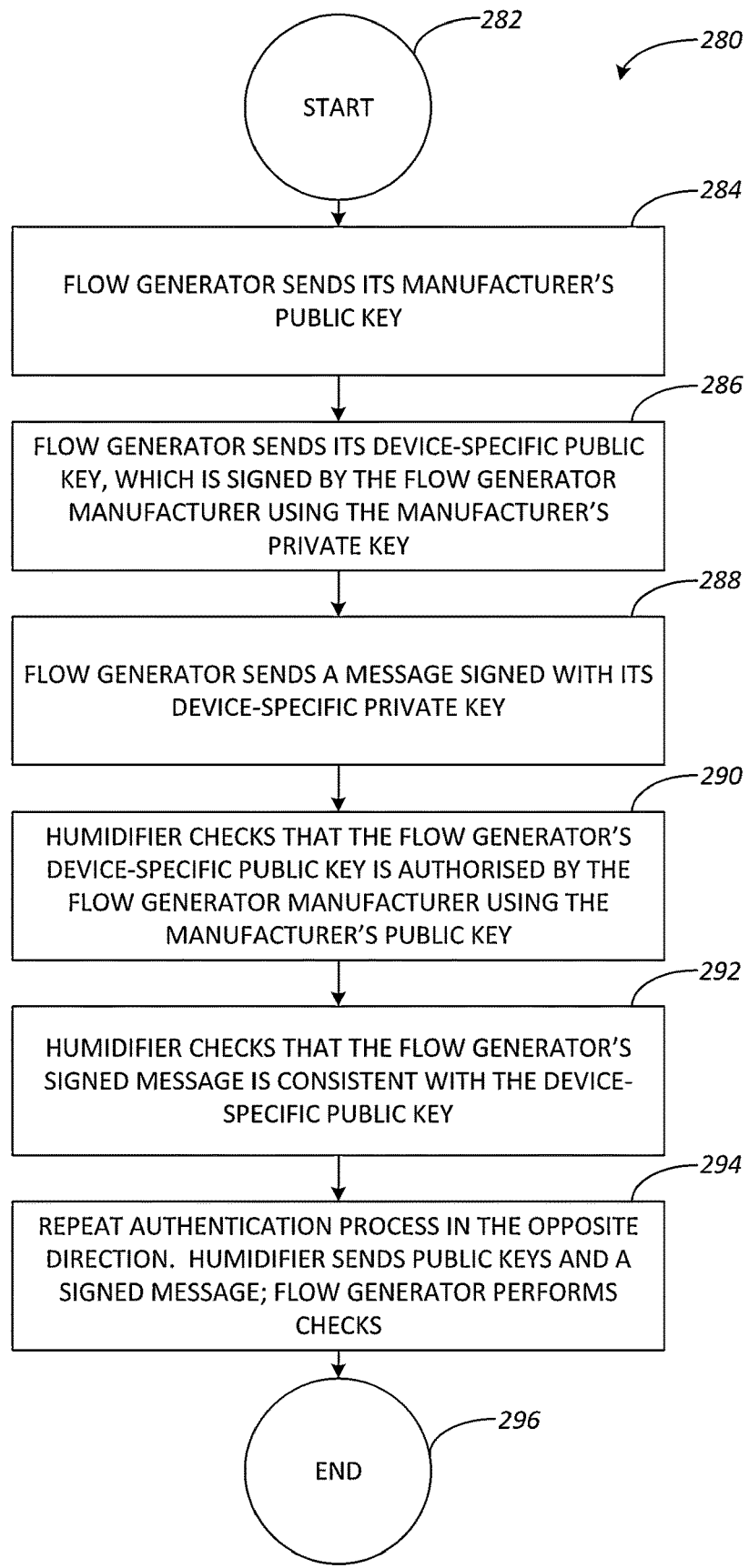
FIG. 7 illustrates an example authentication method.

FIG. 7 shows an exemplary authentication process 280. In this example, a flow generator initially authenticates a humidifier and the humidifier then authenticates the flow generator. The process begins at 282. The process 280 can be initiated automatically when two devices of the system are first connected to each other, for example at step 232 of FIG. 5 or step 260 of FIG. 6.

At step 284 the flow generator sends to the humidifier a cryptographic public key belonging to the manufacturer of the flow generator. The public key can be signed by the manufacturer of the humidifier or a trusted party to ensure that a public key from an unknown or untrusted source is not sent to the humidifier. In a variation on the authentication process 280, step 284 can be omitted. In this example, the public key of the flow generator can be loaded onto the humidifier during manufacturing or design or via a later software or firmware update.

At step 286 the flow generator sends to the humidifier a device-specific cryptographic public key belonging to the flow generator. The device-specific public key has been cryptographically signed using the flow generator manufacturer's cryptographic private key that corresponds to the manufacturer's public key sent in step 284. This can constitute a digital certificate.

At step 288 the flow generator sends a message that is signed with its device-specific private key that corresponds to the device-specific public key sent in step 286. The message can be a digital certificate.

The humidifier then checks the authentication information (e.g. digital certificates) sent in steps 286 and 288.

At step 290 the humidifier checks that flow generator's device-specific public key is authorized by the flow generator manufacturer. This is done by applying the manufacturer's public key (which was either sent to the humidifier in step 284 or, in the variation noted above, loaded onto the humidifier during manufacture or design or via a later software or firmware update) to the signed device-specific public key (which was sent to the humidifier in step 286).

At step 292 the humidifier checks that the flow generator's signed message is consistent with the device-specific public key. This may ensure that the signed message is from the flow generator. Provided that the flow generator has passed the authentication check of steps 284 to 292, the flow generator has been authenticated to the humidifier.

At step 294, the authentication process of steps 284 to 292 is repeated, but this time with the roles of the humidifier and flow generator reversed, to authenticate the humidifier to the flow generator. Once the humidifier is authenticated to the flow generator, the process ends at 296.

Various encryption algorithms can be used to sign (encrypt) and check (decrypt) messages (e.g. digital certificates). For example, the authentication process could employ an RSA algorithm (e.g. according to a PKCS #1 standard), a DSA algorithm, or an ECDSA algorithm.

Figure 8:
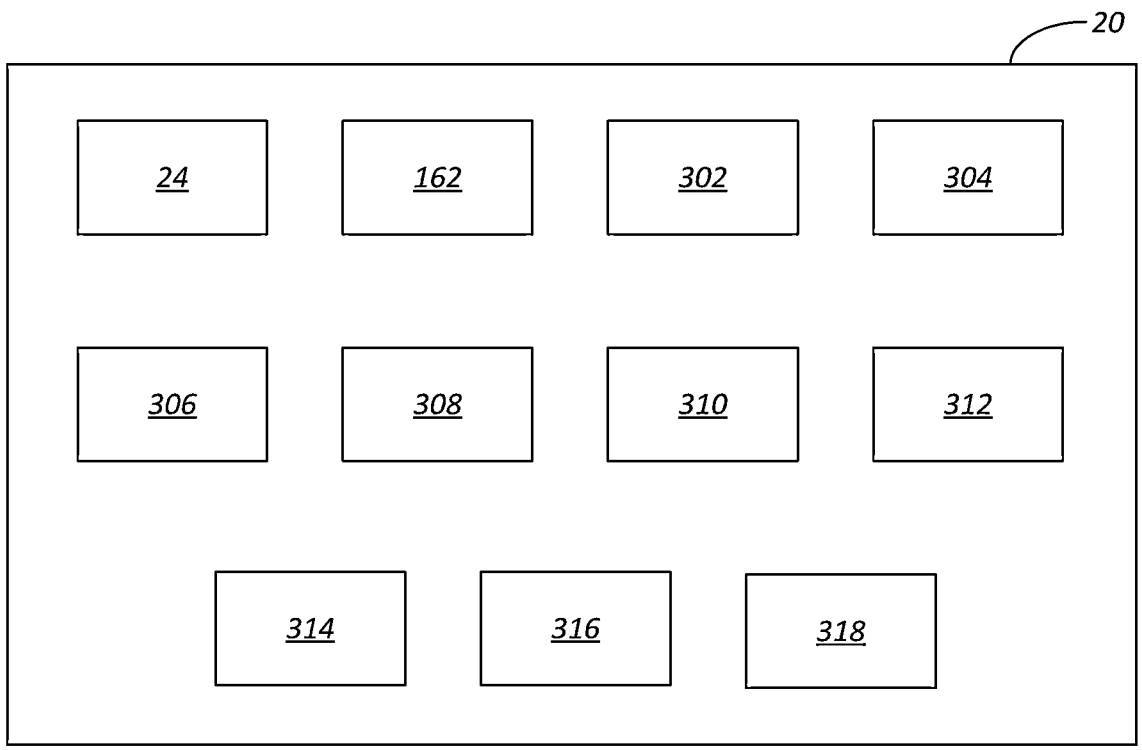
FIG. 8 schematically illustrates an example humidifier.

FIG. 8 schematically illustrates an example humidifier 20 and its components. The humidifier can include a breathing tube or breathing tubes 24, a heating wire 162 for heating gases in the breathing tube(s) 24, a processor 302, a memory/data storage device 304, a humidification chamber 306, a heating plate 308 for heating water in the humidification chamber 306, a communication interface 310, an electrical power input 312, a user interface 314, a battery 316, and sensors 318. In some examples, the communication interface 310 can include a plurality of communication ports, lines or channels for communicating with a plurality of other devices. The user interface 314 could be integral with the rest of the humidifier 20. In other examples, the user interface 314 could be removably coupled to the humidifier or provided as a remote device separate from the rest of the humidifier 20.

Figure 9:
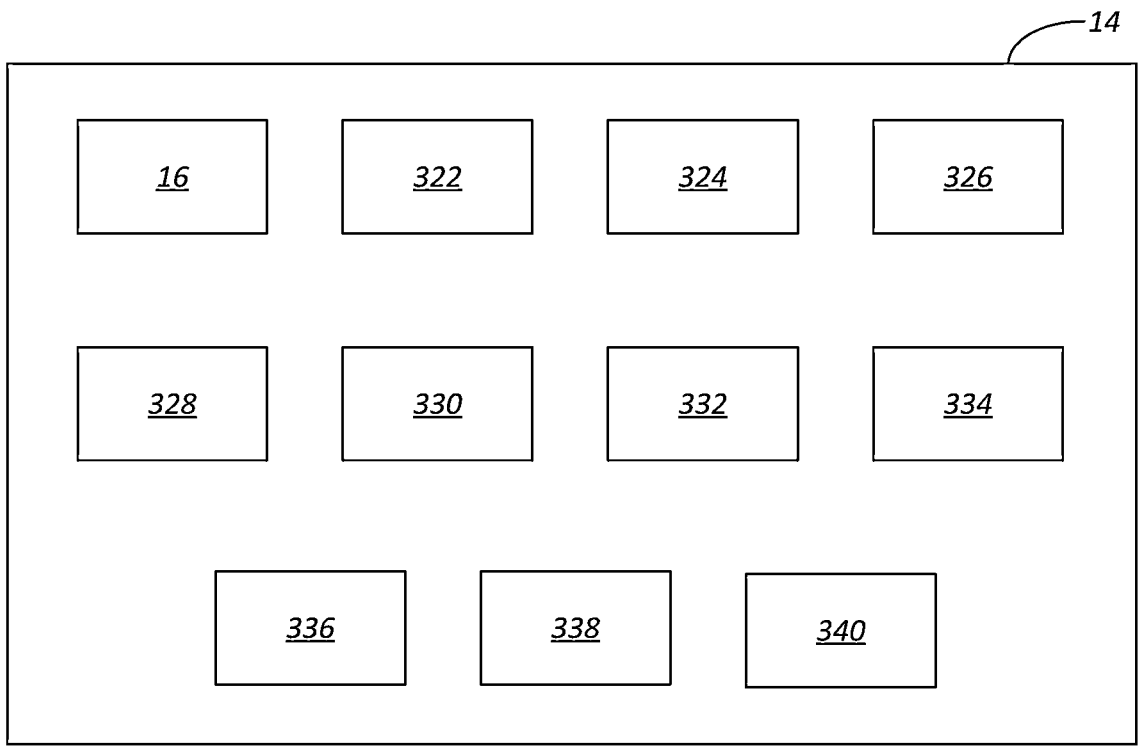
FIG. 9 schematically illustrates an example flow generator.

FIG. 9 schematically illustrates an example flow generator 14 and its components. The flow generator can include a user interface 16, a processor 322, a memory/data storage device 324, a communication interface 326, an electrical power (e.g. mains) input 328, an electrical power output 330, a battery 332, an expiratory block 334, and inspiratory block 336, sensors 338, and expiratory block heating element 340. In some examples, the communication interface 326 can include a plurality of communication ports, lines or channels for communicating with a plurality of other devices. In this example, the expiratory block 334 includes a heating element 340, although in other cases it may not. The sensors 338 can include a humidity sensor that senses humidity of gases in the expiratory block 334. The sensed humidity can be used to control power to the heating element 340 to heat gases in the block according to their humidity. Additionally or alternatively, the sensed humidity could be used to control a heating element of the humidifier. For example, a high level of humidity could cause a reduction in power supplied to the heater plate that heats water in the humidification chamber or an increase in power to a heater wire in the breathing tube.

Figure 10:
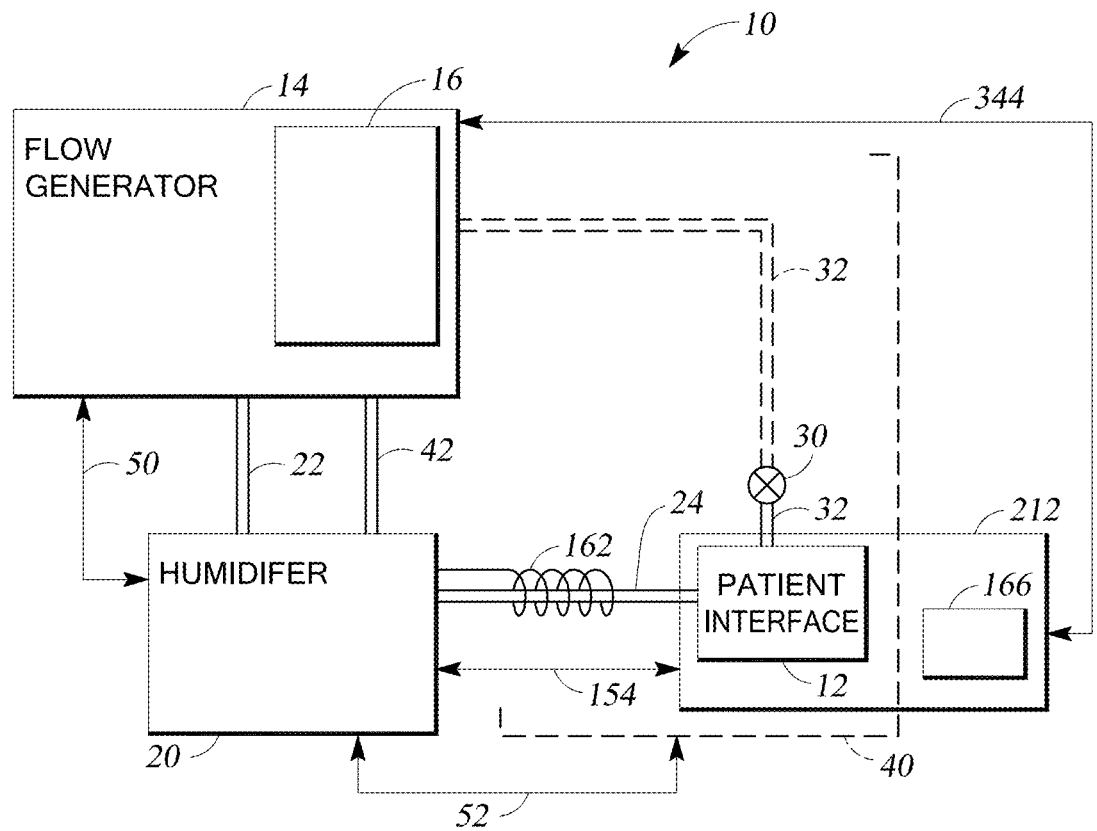
FIG. 10 illustrates an example humidification and ventilation system including an incubator.

FIG. 10 illustrates an example system including the flow generator (e.g. ventilator) 14, humidifier 20 and an incubator 212. The flow generator 14 includes a user interface 16 and communications interface for communicating over the communication connections 50 (with the humidifier) and 344 (with the incubator 212).

The humidifier 20 includes a breathing tube 24 with heating element 162 (e.g. in the form of a heating wire) and a communication interface for communicating with the flow generator 14 over communication connection 50, with the incubator 212 over communication connection 154, and with components of the breathing circuit 40 over communication connection 52. The humidifier 20 is connected to the flow generator 14 by a supply tube 22. In this example, the humidifier is also connected to the flow generator 14 by a power connection 42 to receive electrical power from the flow generator 14.

The breathing circuit 40 includes the breathing tube 24, patient interface 12, expiratory tube 32 and optional expiratory pressure device 30. As shown in this figure, the patient interface 12 is located within the incubator 212. This represents the situation when a patient such as a newborn baby receives gas from the patient interface while it is in the incubator 212. The patient interface is not necessarily located in the incubator at all times—it can be located outside of it when the patient is removed from the incubator 212.

The incubator 212 includes a skin sensor 166 for sensing the temperature of a patient's skin. The skin sensor 166 may also be useful for providing an indication of the ambient temperature around the patient. This may reflect whether the patient is in the incubator 212 or outside of the incubator 212. When the patient is within the incubator 212, the ambient temperature around the breathing tube 24 is typically higher than the ambient temperature outside of the incubator 212. This means that a heating element of the humidifier 20, such as the heating wire 162, needs to heat the gases in the breathing tube 24 less when the patient is in the incubator 212 than when they are outside of it. More heating may be required when the patient is outside of the incubator 212 to prevent condensation in the tube 24.

Data from the skin sensor 166 can be communicated from the incubator 212 to the humidifier 20 directly using communication connection 154 or it could be communicated to the humidifier indirectly via another device such as the flow generator 14 or a patient monitor. For example, the data from the skin sensor 166 could be transmitted from the incubator 212 to the flow generator 14 over communication connection 344. The flow generator 14 can then transmit the data to the humidifier 20 over the communication connection 50. In another example (not illustrated), the skin sensor could be a skin sensor of an infant warmer. This example would be similar to the one depicted in FIG. 10 and described above, but with an infant warmer in place of the incubator 212.

Figure 11:
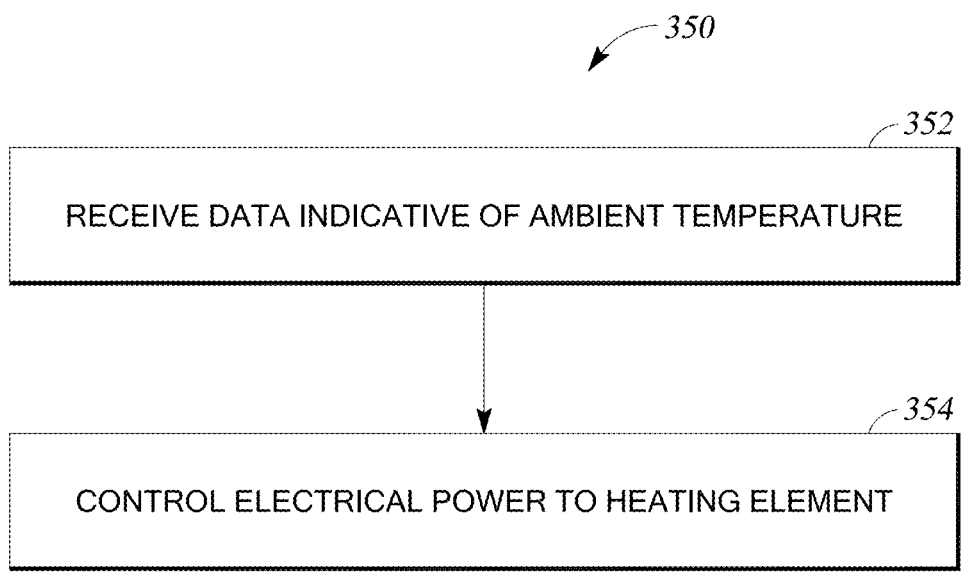
FIG. 11 illustrates an example humidifier operation method.

FIG. 11 illustrates an example method 350 for controlling the humidifier based on data from a skin sensor of an incubator. At step 352, the humidifier receives data indicative of ambient temperature around the skin sensor. This can be a reading from the sensing element that is designed to sense skin temperature of the patient. This reading can be a temperature value as determined by a processor of the incubator. The output of a skin sensor can be dependent on the ambient temperature. This can be because the skin temperature of the patient varies based on the ambient temperature and/or because the skin sensing element is not completely thermally isolated from the ambient environment. The data indicative of ambient temperature can be used to infer whether the patient is in the incubator or outside of it because temperatures outside of the incubator are typically lower than those inside the incubator. This inference need not be explicitly made, although in some cases it could be. For example, the method 350 could include another step of determining whether the patient is within the incubator or not.

In step 354, the humidifier controls power to a heating element based on the data indicative of ambient temperature. As noted above, when the ambient temperature around the breathing tube is lower, more power may need to be provided to a heating wire in the breathing tube to prevent condensation of humidifier gases in the tube. The heating wire power could be relatively high when the ambient temperature is relatively low and vice-versa. This could be controlled by adjusting a set point used in a control algorithm that controls heater wire power or adjusting a setpoint used in a patient end temperature control algorithm that controls the temperature of gases at or near the patient interface 12. It may also be advantageous to control the power supplied to a heating element that heats water in the humidification chamber of the humidifier. For example, the power to the heating element of the humidifier heater plate could be decreased when the ambient temperature is lower to reduce an amount of condensation in the breathing tube. Alternatively, it could be increased when the ambient temperature is lower to keep humidity of the breathable gas delivered to the patient sufficiently high despite water condensing out of the gas due to the lower temperature environment of the breathing tube.

Figure 12:
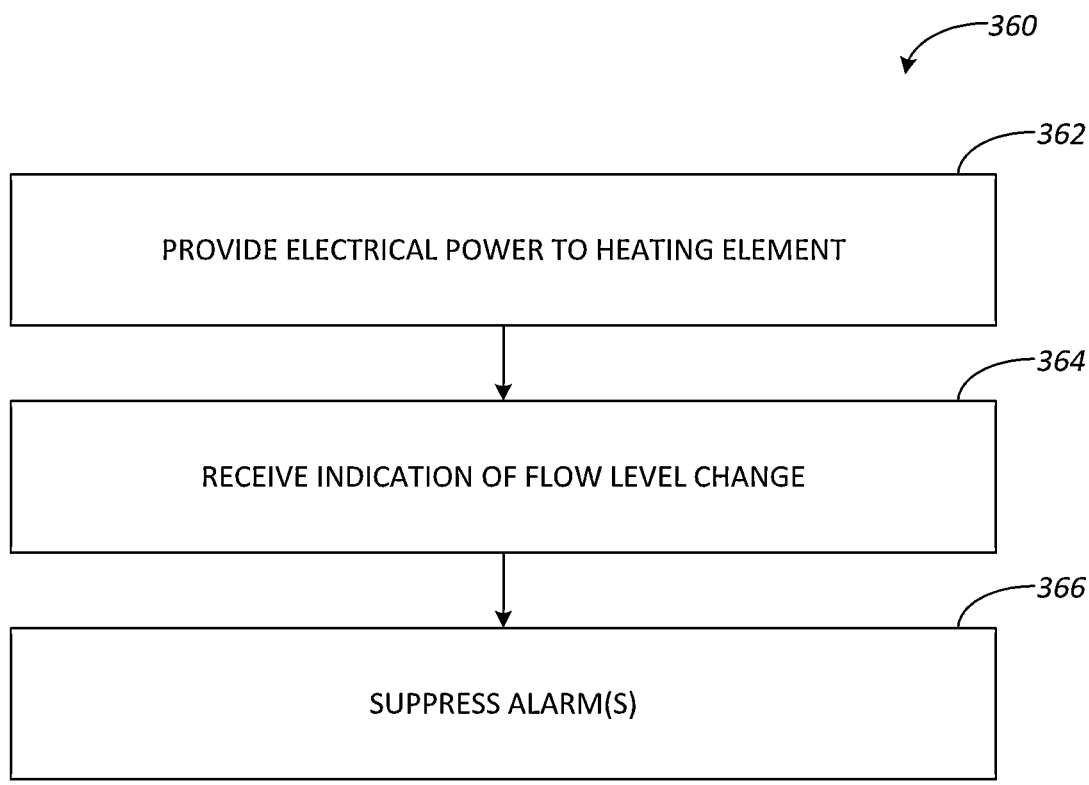
FIG. 12 illustrates another example humidifier operation method.

FIG. 12 illustrates an example method 360 of controlling a respiratory or surgical humidifier to suppress alarms when a flow level changes. Humidifiers can raise alarms depending on things like the temperature of breathing gas delivered to a patient (patient-end temperature) or the temperature at the outlet of a humidification chamber. For example, a low temperature alarm can be raised if a temperature at any point downstream of the humidification chamber is not met. This could be in the region of the outlet of the humidification chamber or in the region of the patient interface, for example. A temperature alarm could be raised if an average gas temperature downstream of the humidification chamber differs from a target value by more than a predetermined amount. For example, the alarm could be raised if the temperature averaged over a 5-minute period is greater or less than the target value by 2° C. or more. However, during flow changes it may not be necessary or appropriate to raise these alarms. Suppressing the alarms during flow changes may improve user experience and reduce instances of false alarms.

The method 360 begins with a humidifier providing electrical power to a heating element at step 362. This heating element can het the breathing gases and can be a heating wire of a breathing tube.

At step 364, an indication of a flow level change is received. This can be received by a processor of the humidifier. The indication of flow level change can be communicated to the humidifier by a flow generator such as a ventilator. Alternatively or additionally, the humidifier could determine the flow level change. For example, the humidifier could include one or more flow sensors to determine a level of flow and detect when the flow level changes. Alternatively or additionally, the flow level could be controlled by user inputs to a user interface of the humidifier. In response to a user input that would change the flow level (e.g. by the humidifier sending a command to the flow generator to change the gas flow provided to the humidifier), the humidifier can determine that a flow level is being changed.

In step 366, one or more alarms can be suppressed when it is determined that the flow level has changed or will change. These could be the low temperature or patient-end temperature alarms discussed above, for example. Suppressing the alarms could involve not generating the alarms at all, generating and logging the alarm conditions without presenting them to a user, generating warnings or notifications rather than alarms, or raising the threshold for an alarm to be raised. Raising the threshold could include only generating alarms if a temperature discrepancy between a setpoint temperature and a sensed temperature is greater than a discrepancy that would normally trigger the alarm, or only generating an alarm if a temperature at the humidification chamber outlet fails to meet the required temperature for a greater threshold time than 5 minutes.

Figure 13:
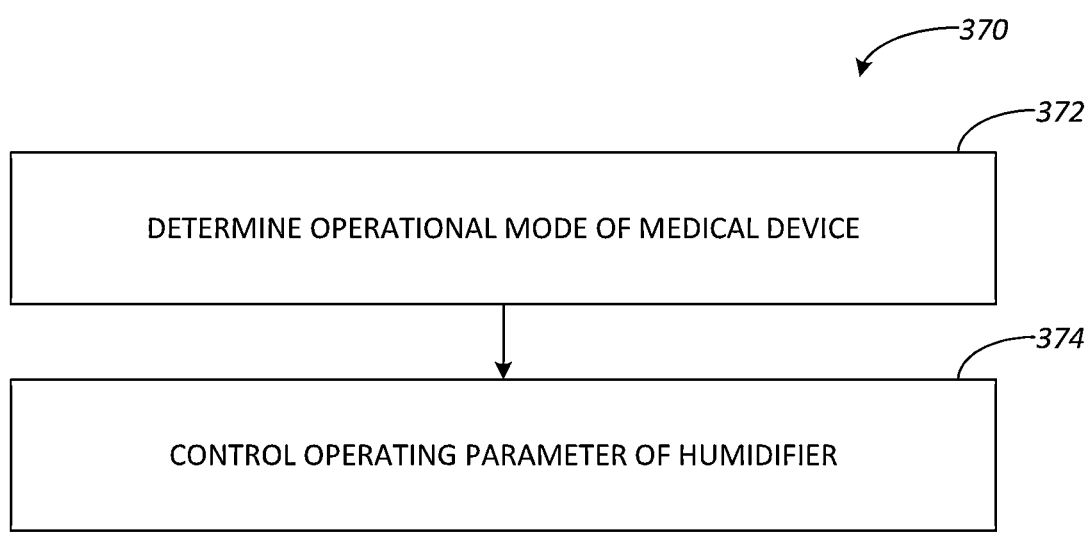
FIG. 13 illustrates another example humidifier operation method.

FIG. 13 illustrates an example method 370 of operating a respiratory or surgical humidifier to control a parameter of its operation based on the operational mode of another device. It may be advantageous for a humidifier to adapt its operation to the operational mode of a flow generator without requiring a user to manually change the humidifier's operation to a state that they judge to be consistent with the mode of the other device. This may improve the operation of the humidifier during transient operational states of the medical device and/or may help to ensure that the operation of the humidifier is appropriate for the mode of treatment provided by the medical device. In some examples, the medical device is a flow generator.

In step 372, the humidifier determines the operational mode of the medical device. This could involve the medical device transmitting an indication of its operational mode to the humidifier directly or via one or more other devices. Determining the operational mode could involve the humidifier inferring the operational mode of the medical device from the detected operation of the medical device. For example, when the medical device is a flow generator the humidifier can detect whether the flow generator is actively providing gas flow or not. In other examples, the humidifier could monitor gas flow provided by the flow generator to detect the tidal volume, frequency, or pressure at one or more parts of the breathing cycle. From these, the humidifier can infer the operating mode of the flow generator.

In step 374, the humidifier controls one or more of its operating parameters based on the operational mode of the medical device. The operating parameters generally relate to parameters related to the humidifier's humidification functions and include things like the level of power supplied to the water heater plate or to the breathing tube heating element; set point temperatures as measured at various places in the humidifier system; allowable temperature ranges of these measured temperatures; and allowable temperature gradients between regions of the humidifier such as between the humidification chamber outlet and a component of the breathing circuit such as the patient interface of a y-piece near the interface.

In one example, the other medical device is placed into a standby mode. This can indicate that a patient is not actively being provided with breathing gas. In this case, the humidifier can change the power provided to a heating element such as a breathing tube heating wire or a humidification chamber heating plate. This may help to regulate the temperature and/or humidity of supplied gases during transient conditions and may be particularly relevant when the medical device is a flow generator.

In another example, the medical device could have different operating modes for different types of therapy or different types of patients. Different therapy modes could include high flow mode and a low flow mode, and an invasive mode and a non-invasive mode, for example. Different patient modes could include an adult mode, a pediatric mode and a neonatal mode, for example. For the different modes, different operating parameters of the humidifier can be used. For example, the humidifier can use different chamber outlet temperatures and temperature ranges for the different therapy modes. The humidifier can use different temperature gradients or ranges for the different patient modes. The humidifier could determine which of these modes the medical device is operating in and set its operating parameters (such as temperatures, temperature ranges and gradients) accordingly to ensure that its operation is appropriate for the current therapy and/or patient type.

Figure 14:
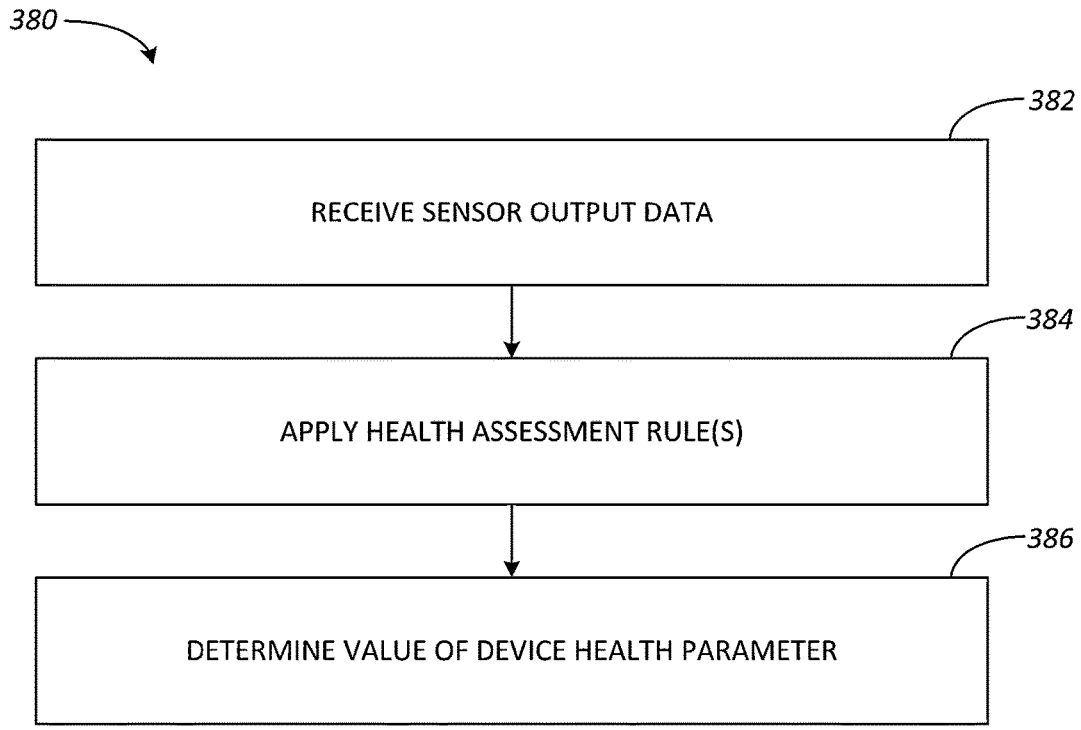
FIG. 14 illustrates an example device health assessment method.

FIG. 14 illustrates an example method 380 of assessing the health of a respiratory or surgical humidifier using a device external to the humidifier. The health of the device can include whether it is functioning correctly, whether it is meeting its minimum or essential performance requirements as a humidifier, and whether it is at risk of failing to function correctly or perform as required (even if it is currently). It may be useful to use a device other than the humidifier to assess humidifier health for various reasons. The device external to the humidifier can have different or more accurate sensors than the humidifier. Some faults of the humidifier may be hard to detect using the humidifier alone—for example a malfunctioning sensor may negatively affect the performance of the humidifier, but may also make it difficult to detect any problems with the humidifier's performance because the sensor's output may not accurately reflect the performance. The external device can also act as a master device when connected to the humidifier (with the humidifier acting as a slave device), and responsibilities for actions such as monitoring device health could lie with the external device in this situation. In some cases, one or more of the humidifier health parameters can be assessed by the humidifier itself and the humidifier can determine an alarm state and transmit this to the external device. This could be done in addition to the method 380 or as an alternative to the method 380.

At step 382, the external device receives output from a sensor. The sensor output is indicative of the performance of or resources available to the humidifier. Resources available to the humidifier can include water for the humidification chamber, a connection of gas flow conduits, and a source of electrical power (such as a battery or an external power supply such as a mains power supply, generator or distributed generation source), for example. Performance of the humidifier can relate to production of water vapor, presence of liquid water in a breathing tube, or direction of gas flow, for example. Corresponding health parameters include humidification chamber water level, incorrect/correct connection of gas flow conduits (or presence/absence of reverse flow condition), quality of a power supply such as battery charge level or mains voltage, and breathing tube moisture level. Any of the parameters could take binary values such as presence or absence of a negative condition (e.g. presence or absence of a water out condition, presence or absence of a brownout condition etc.). Some of the parameters could take a non-binary value indicating graduated conditions (e.g. water level, mains voltage level).

One or more sensors can be used to produce the sensor data and these can be located in the humidifier, in the external device, or a combination thereof. Which sensor(s) to be used can be determined based on attributes of the sensors, such as accuracy. The more accurate sensor(s) for a given measurement or set of measurements can be selected for use in the health assessment method 380. For example, some flow sensors may be less accurate at low flow rates than others. The external device can compare one or more of its sensors to one or more corresponding sensors of the humidifier. This could be done at start up or upon detection of a connection being formed between the external device and the humidifier. For example, each sensor can have an associated accuracy rating, which could be stored on a data storage device of the respective device. The accuracy ratings of sensors of the external device and the humidifier can be compared and the sensor with the highest accuracy rating selected. Alternatively, outputs of the sensors can be compared. If the sensors agree, the sensors of the external device can be used in the assessment method 380. Alternatively, when the sensors agree the sensors of the humidifier could be used. If the sensors disagree, an alert can be provided on a user interface of the external device to inform the user that the humidifier sensor(s) are not suitable for the assessment method 380 and requesting confirmation from the user to use sensor(s) of the external device in the assessment method 380. In some cases, sensor(s) of the external device can be used whenever it is determined that the humidifier is communicatively connected to the external device.

At step 384, one or more device health assessment rules are applied to the sensor data. These rules are applied by a device external to the humidifier to assess the health of the humidifier. Various rules or combinations of rules could be applied to the data depending on the type of data and the health parameter(s) to be assessed. Exemplary rules are given in more detail below with reference to assessment of specific health parameters.

At step 386, a value of a device health parameter is determined as a result of the application of the health assessment rule(s). For example, the health parameter can relate to a water level in the humidification chamber of the humidifier. The results of the health assessment rule can be a determination that the chamber is out of water. The value of the device health parameter can be output to a user or to another device. The value of the device health parameter can be used to determine an alarm condition. The alarm condition could trigger an alarm on the humidifier and/or the external device or could be transmitted to another device such as a central monitoring system. The alarm could include an audio and/or visual alarm on the humidifier prompting the user to refill the chamber with water.

In the example in which the device health parameter relates to the chamber water level, this can be determined on the basis of the temperature of a water heating element of the chamber, the power draw of the water heating element, or a combination of the temperature and power draw. One or more temperature sensors near the heating element (in the humidifier) can provide sensor output data for use in the method 380. Additionally or alternatively, one or more sensors indicative of electric power drawn by the heating element (such as a combination of a voltage sensor and a current sensor) can provide sensor output data for use in the method.

In order to improve the water level assessment, the flow rate of gas supplied to the humidifier can be adjusted. In the case where the external device performing method 280 is a flow generator (for example a ventilator), the flow generator can control the flow as part of the method 280. In the case where the external device is not a flow generator, the external device can instruct a flow generator to adjust a flow of gas provided to the humidifier. For example, as part of the water level assessment the flow of gas can be increased to improve the resolution of the water out detection (by increasing the signal to noise ratio, where the signal is indicative of water level). For example, the flow rate can be increased to 3 liters per minute or greater. The flow rate can be increased when a preliminary indication of a water out condition or low water level is determined.

In another example, the flow of gas can be pulsed during the water level assessment. This can be used to test the response time of components of the humidifier system to changes in flow, which can be used to infer a water level. For example, a humidifier chamber with a large amount of water will have a higher heat capacity than one that has less or no water. This means that it will change temperature more slowly in response to changes in the gas flow rate, thereby providing an indication of water level.

Water level can also be determined from flow rate of fluids through the humidifier. The term "fluid" is used in this context because the contribution of liquids to the volume flow rate may be important in some situations. References to gases and humidified gases elsewhere in this specification also cover fluids that include some liquid, e.g. in the form of aerosolized droplets, except if it is apparent from the context that only gas (without any liquid) is being referred to.

If the humidifier chamber is out of water, it will not add a significant amount of water vapor to the flow of gas as it passes by the humidification chamber, in other words it will not significantly humidify the flow. On the other hand, if there is sufficient water in the chamber it will add water in the form of vapor (and possibly also liquid water) to the flow. Some flow rate sensors such as thermal mass flow meters determine flow rate using thermal effects. These can be affected by the amount of humidity in the measured fluid. Generally, higher humidity fluid flows will cause the flow rate sensors to register a higher flow rate. This means that such a flow rate sensor downstream of the chamber will output a higher measured flow rate downstream from the chamber than one upstream from the chamber if the fluid flow is being humidified at the chamber. The difference between outputs of flow rate sensors upstream and downstream of the chamber can be compared to a threshold value. If the measured downstream flow rate is greater than the measured upstream flow rate by less than the threshold value (or not greater than it at all), a water out condition can be determined.

In either of the above two examples, the actual flow rate difference values (rather than just whether they are above or below a threshold) can be used to indicate intermediate water levels rather than just water out or water not out conditions.

The upstream and downstream flow sensors could be located near the inlet and outlet of the humidification chamber of the humidifier, respectively, or they can be at other upstream and downstream locations in the flow path.

In another example, a humidity sensor downstream from the chamber can detect humidity of the fluid flow. If the level of humidity is less than a threshold this can indicate that the chamber is low on water or out of water. The humidity sensor could be at the outlet of the humidifier, in the breathing circuit, or in an expiratory block of a flow generator (for example a ventilator). If a sensor in the expiratory block of the flow generator detects low humidity it can instruct the humidifier to perform a confirmatory assessment of water level in the chamber.

As well as the sensors mentioned above, other sensors that can be used to determine water level include pressure sensors, weight sensors, conductivity sensors and float sensors. For example, a pressure sensor can be placed in the water holding volume of the chamber and can determine the depth of water in the chamber from the pressure applied to it. In another example, a weight sensor can be placed below the humidification chamber and can determine the level of water in the chamber from the weight of the chamber. In another example, a conductivity sensor within the chamber can determine whether it is submerged in water or not from the sensed level of electrical conductivity and can thereby determine the level of water in the chamber. In another example, a float sensor can be placed in the chamber to float on the surface of the water and can indicate the water level from the height at which it floats.

In another example the health parameter relates to a direction of fluid flow through the humidifier. In some cases, gas conduits can be connected incorrectly. For example, with reference to FIG. 1 the connections of supply tube 22 (i.e. dry line) and expiratory tube 32 to the flow generator 14 could be swapped, causing humidified gas to flow from the humidifier 20 to the flow generator 14. This is known as a reverse flow condition.

The health assessment rules can determine incorrect or correct connection of the gas flow tubes, i.e. presence or absence of a reverse flow condition, from the detected flow. In one example, a wye-piece is provided between a breathing tube, expiratory tube and patient interface (e.g. the tubes 24 and 32 and patient interface 12 of FIG. 1). In this example, the patient-interface branch of the wye-piece is not blocked. The humidifier is connected to a flow generator and the flow generator blocks its expiratory block (which is located downstream of the humidifier and patient interface in the normal flow direction) and provides gas flow from its inspiratory block (upstream from the humidifier in the normal flow direction) for a period of time. The connection of the humidifier to the flow generator, blocking of the expiratory block and provision of gas flow from the inspiratory block can be initiated in various orders or simultaneously. The gas flow can be provided at a high flow rate such as around 20 liters per minute. If the gas flow tubes are connected correctly, gas will flow from the inspiratory block of the flow generator, through the humidifier, and out of the wye piece. A flow sensor in the humidifier can be used to detect resultant flow. If flow above a threshold level is detected in the humidifier, this indicates a correct connection of the gas flow tubes; i.e. the reverse flow condition is not present. If the gas flow tubes are not correctly connected, i.e. if the supply tube 22 of FIG. 1 is connected to the expiratory block of the flow generator 14 and the expiratory tube 32 is connected to the inspiratory block, gas will flow from the inspiratory block and out of the wye piece via the expiratory tube-bypassing the humidifier. Little or no gas flow will be detected in the humidifier. This indicates that a reverse flow condition is present.

In some cases, the wye piece could be physically blocked by a user or connected to a test lung when testing for a reverse flow condition. The user can be instructed to block the user interface branch of the wye piece or connect it to the test lung when performing this test, for example by a prompt on the user interface of the flow generator. The flow generator also blocks its expiratory block before, after, or at the same time that the user is instructed to block the wye piece or connect it to a test lung. The flow generator then provides a flow of gas from its inspiratory block. The supply of gas can be stopped once a specified pressure is reached. The inspiratory block can then be blocked and the expiratory block opened. If the gas flow tubes are correctly connected, gas in the system will flow out through the expiratory block via the expiratory tube, and there will be little or not gas flow detected in the humidifier. If the gas flow tubes are incorrectly connected, i.e. if the supply tube 22 (also known as dry line) of FIG. 1 is connected to the expiratory block of the flow generator 14 and the expiratory tube 32 is connected to the inspiratory block, the gas will flow out through the expiratory block via the humidifier 20 and the supply tube 22, meaning that gas flow will be detected in the humidifier. This indicates a reverse flow condition.

In these examples, flow can be determined using flow sensors or based on the power provided to a heating element of the humidifier. For example, power provided to a heater plate can be monitored for a period of time (e.g. 10 minutes). Less power will be required by the heater plate to maintain a setpoint operating temperature when there is no or low flow. If the consumed power (e.g. peak, average, modal, or accumulated power) is less than a threshold this indicates a reverse flow condition.

The health parameter can be a quality of a source of electrical power for the humidifier. The source can be internal to the humidifier, can be in the external device, or can be separate from both, such as a mains power supply. In one example, the health parameter is a level of charge of one or more batteries. These can be in the external device. A level of charge below a threshold can indicate a low power source condition. When it is determined that the batteries are below a threshold, the humidifier can enter a low power mode. In the low power mode of the humidifier, it can reduce or disable power to one or more heating elements such as the heater plate of the humidification chamber or the heater wire of the breathing tube. A user interface of the humidifier could be unchanged in this mode. The user interface can be configured to display parameters such as battery charge level, time, dew point temperature or a value indicative thereof, one or more alarms, and/or other values. If the level of charge is below a second, lower threshold the user interface of the humidifier can change to indicate that the battery is low, for example displaying a "low power" message or low battery icon. The external device and/or the humidifier can also output an audible alarm when the level of charge is below the threshold. The external device and/or the humidifier can include one or more charge storage devices such as a supercapacitors to power the user interface and/or audible alarm when the level of charge is below the second threshold. The second threshold can represent a minimum level of charge required to properly power the external device and/or the humidifier.

When the humidifier receives power from a mains power supply, the health parameter can relate to the quality of this power supply. In some examples the humidifier can be powered by a dedicated power supply (e.g. a switch-mode power supply) for the humidifier, which is connected to mains. In some examples, the humidifier receives power from the external device, for example a flow generator, that is powered by a mains supply. If the voltage of the mains supply drops this can affect operation of the humidifier. A temporary drop in mains voltage may be known as a brownout. A brownout can be detected from a measurements of the mains voltage or from its effect on operation of the humidifier and/or external device. If these measurements indicate a brownout, for example if the mains voltage drops below a threshold, this can indicate presence of a brownout condition.

In another example, the device health parameter relates to liquid water in the breathing circuit, for example in the breathing tube or supply line. This can be detected from, for example, the resistance to the flow of gas provided by the flow generator. Resistance to flow may be higher when there is liquid water in the breathing circuit because the presence of liquid water will narrow the gas flow path. If a water level above a threshold is detected in the breathing tube, the humidifier can be instructed by the external device to enter a dry-out mode.

Figure 15:
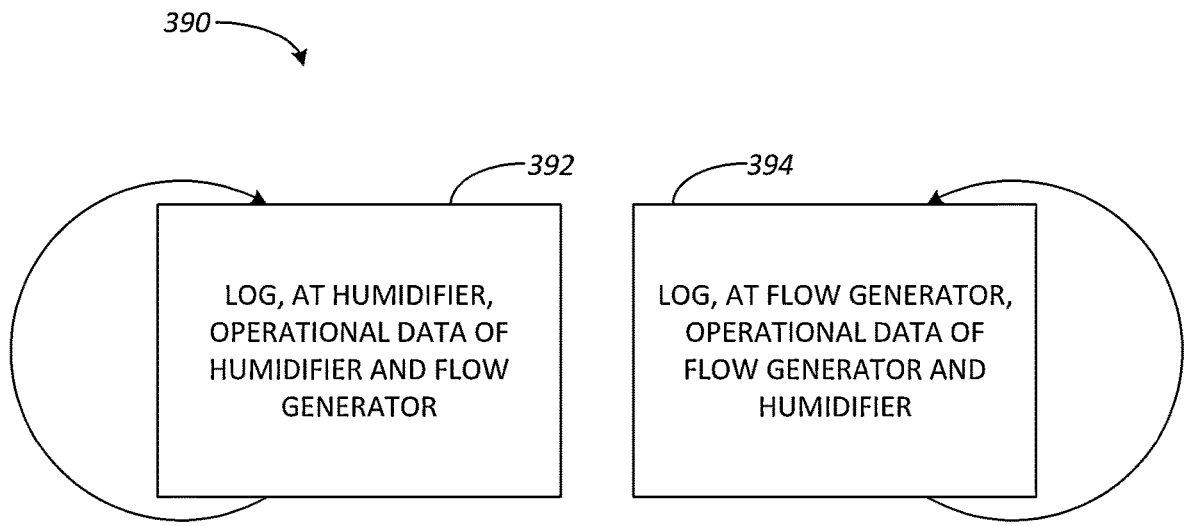
FIG. 15 illustrates an example method of operating a humidification and ventilation system.

FIG. 15 illustrates an example method 390 of operating a respiratory or surgical ventilation and humidification system that involves each of a humidifier and a flow generator logging the other's operational data as well as its own. This may help to reconstruct the behavior of a device in a particular scenario from the log stored on that device, because the behavior of each device can be dependent on the behavior of the other. In some cases, the behavior of a humidifier or flow generator may be different from what a user expects or desires, leading them to report a fault. In some cases, the behavior may trigger an alarm. In these cases, information about how both devices were operating may be useful in diagnosing or explaining the reported fault or alarm condition, and this can be obtained from the log stored on a single device.

The method 390 involves the humidifier logging its own operational data and operational data of the flow generator at step 392. The flow generator's operational data can be reported to the humidifier over a communication connection that directly or indirectly connects the two devices. The logged data can be time stamped so that operation of each device at a given time can be correlated to operation of the other device at that time, and so that operation of the devices can be correlated to a period of interest. The period of interest could be the time leading up to or during a reported fault, alarm condition, or other behavior of interest. Step 392 can be iterated continually throughout operation of the humidifier or only during certain periods such as when a value of a health parameter indicates a current or potential failure to function correctly or perform as required.

The method involves the flow generator logging its own operational data and operational data of the humidifier at step 394. This is performed in a similar manner to step 392 but with the roles of the humidifier and flow generator reversed.

The log stored on one or both of the devices can be exported to another device, for example a personal computer or a central monitoring system, for analysis and reconstruction of the behavior of the system during a period or interest. This could involve applying one or more diagnostic rules or algorithms to the logged data and producing a report of the system behavior.

Figure 16:
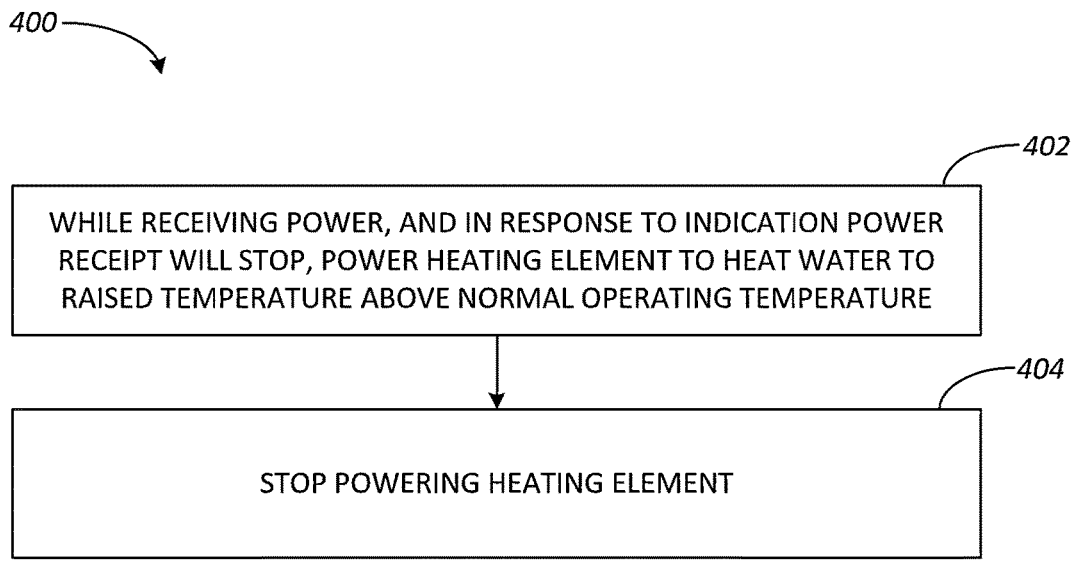
FIG. 16 illustrates another example humidifier operating method.

FIG. 16 illustrates an example method 400 of operating a humidifier that is powered by an external power source. The method involves heating water in the humidifier above a normal temperature before power is removed. This may be useful to keep the humidifier water at a high enough temperature to humidify the breathing gases when the humidifier is operating in a low power mode, which it can switch into when power from the external source is removed. The external source can be a power output of a medical device, for example a flow generator. The power output can be a DC power output or an AC power output.

Initially, the humidifier receives an indication that it will stop receiving power from the external power source. The indication can be received over a communication connection. For example, when the external power source is a power output of a medical device, the indication can be transmitted over a communication connection from the medical device to the humidifier. The indication can be based on a user input to a user interface on the medical device or on the humidifier. This can involve selection of a "pre-heating" icon or option on the interface.

In response to the indication, at step 402 the humidifier powers the heating element for a period of time to heat water to a raised temperature above the normal operating temperature. The heating can continue until a particular raised temperature is reached, until a particular period of time has elapsed, or until both of these have happened. Then the method 400 moves to step 404.

At step 404, the humidifier stops powering the heating element. The heating to the raised temperature can be controlled so that it is complete, and power to the heating element can be stopped, before the power from the external source is stopped. This means that the "preheating" of the method 400 can be done using power sourced from the external source without draining an internal battery of the humidifier. With the power to the heating element stopped, the humidifier consumes less power.

In this low power mode, power can also be removed from the heater wire in the breathing tube. The humidifier can include a battery to power other components such as the processor and user interface during this mode.

Figure 17:
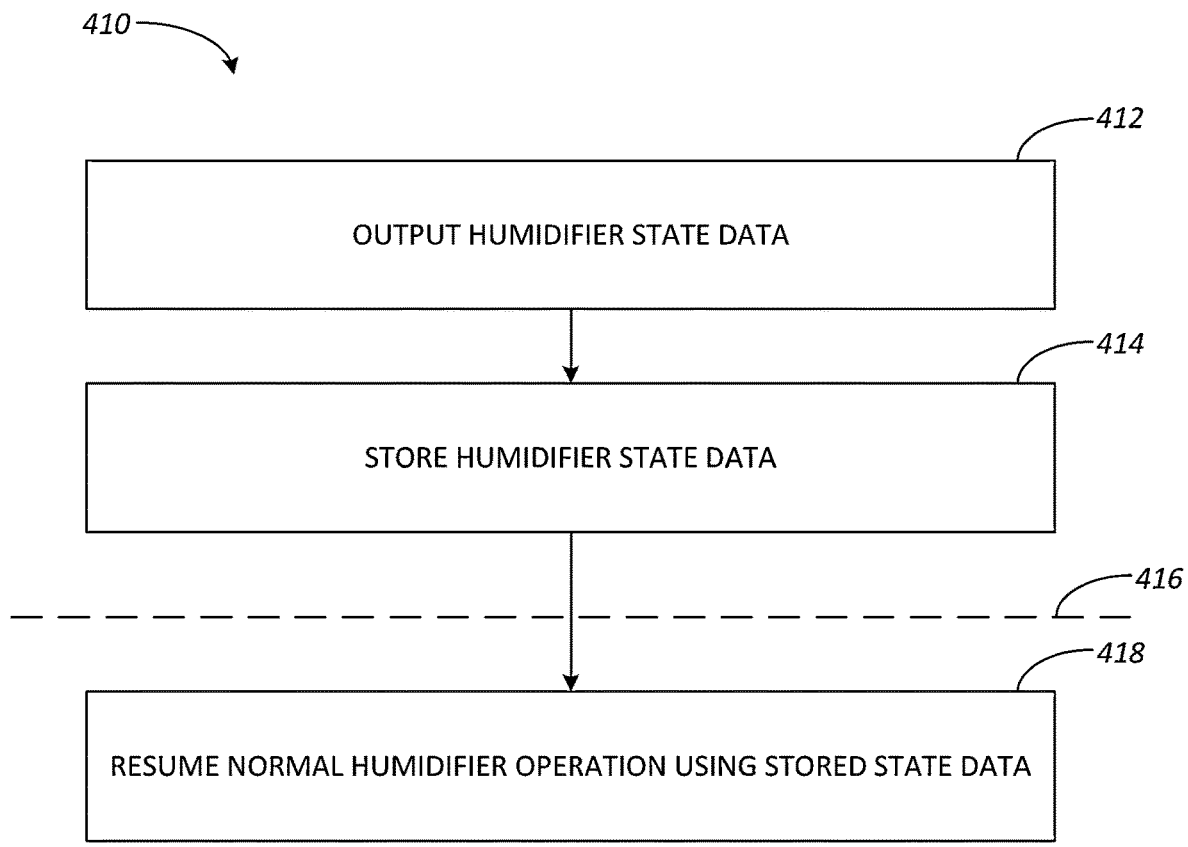
FIG. 17 illustrates an example method of operating a system that includes a humidifier.

FIG. 17 illustrates an example method 410 for operating a system that includes a humidifier when there is a temporary interruption to normal operation.

At step 412, the humidifier outputs state data that indicates its current state during normal operation. The state data can include operational data such as temperature set points (e.g. for the heater plate, heater wire, patient end temperature sensor), sensed temperatures, setpoints and sensed values for other parameters such as humidity, flow rate and heating element power, water level, as well as data derived from these like a difference between a setpoint for a parameter and a sensed value of that parameter and proportional, integral and derivative terms of the control error. Other state data can include alarm status, information about consumables connected in the system, other connections such as gas flow conduit connections, authentication status of devices connected in the system, and a mode such as therapy type and whether or not the humidifier is operating in a quiet mode.

At step 414, the state data is stored in a device external to the humidifier.

At 416, a temporary interruption to normal operation of the humidifier occurs as indicated by the broken line. This could be due to a transient condition of a mains power supply that ultimately sources power for the humidifier. For example, the transient condition could be a decrease in voltage, i.e. a brownout.

After the temporary interruption, the humidifier can resume normal operation in a state that is based on the stored state data at step 418. In this way, the state of the humidifier as it was just before the temporary interruption can be recreated using the stored state data. This may minimize the effect of the interruption on the operation of the humidifier and avoid the need for it to go through start-up procedures every time a temporary interruption occurs. In some cases, the humidifier operation is only resumed using the state data if the interruption is shorter than a threshold time. For interruptions longer than the threshold time, the humidifier can go through the normal start up procedures.

Figure 18:
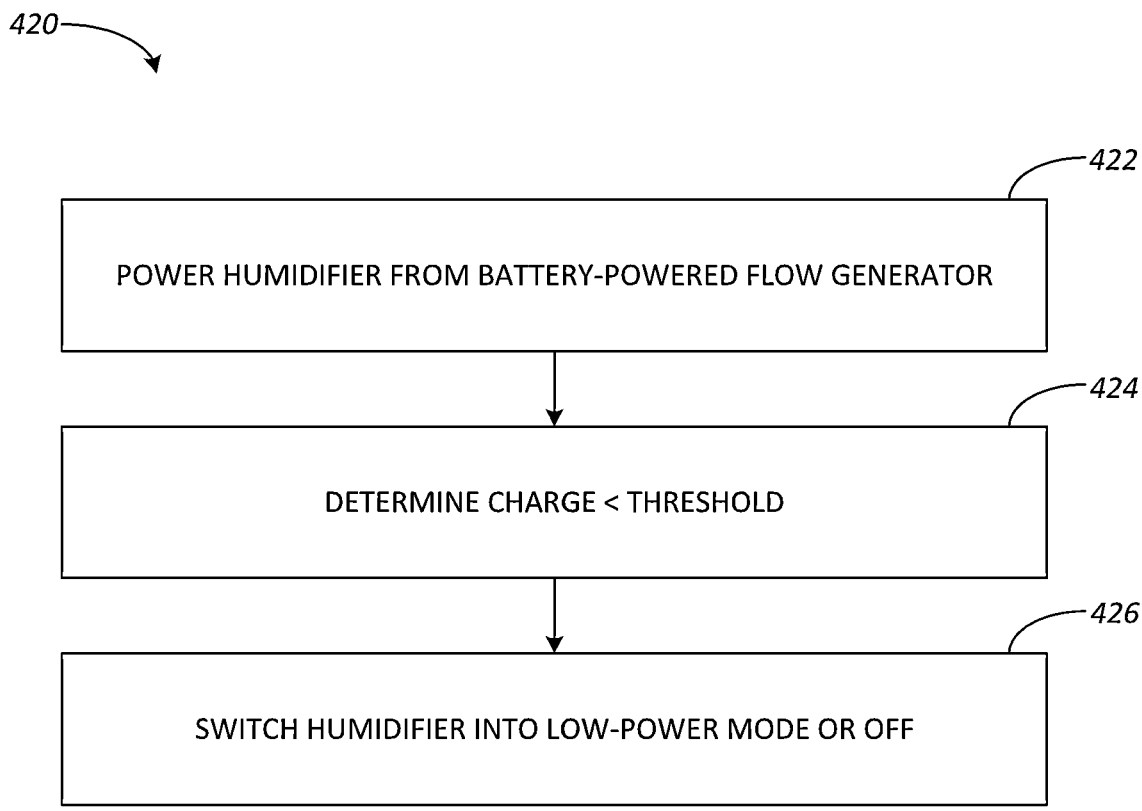
FIG. 18 illustrates another example method of operating a humidification and ventilation system.

FIG. 18 illustrates an example method 420 of operating a humidifier that is powered by a battery-powered flow generator. The method may help to conserve the charge of the battery or batteries in the flow generator.

At step 422, the humidifier is powered using power received from the flow generator. The power can be received over a DC power connection or an AC power connection. The flow generator includes one or more batteries that can power the flow generator itself. The one or more batteries provide power for the humidifier, although the humidifier can also receive power from another source such as an internal battery in the humidifier.

At step 424 it is determined that the charge of one or more of the flow generator batteries is less that a threshold charge level. This can be determined by the flow generator and communicated to the humidifier over a communication connection. Additionally or alternatively, the humidifier can infer the state of charge of the flow generator battery, for example from the voltage supplied to the humidifier.

At step 426, the humidifier switches into a low-power mode or it switches off. This may help to conserve the charge of the flow generator battery so that the flow generator can continue to provide breathing support to a patient. The low-power mode of the humidifier can include stopping the supply of power to one or more heating elements such as the heating plate of the humidification chamber. The user interface can operate as normal during the low power mode. If the flow generator battery drops below a second, lower threshold the user interface of the humidifier can display a "low power" message or icon.

Figure 19:
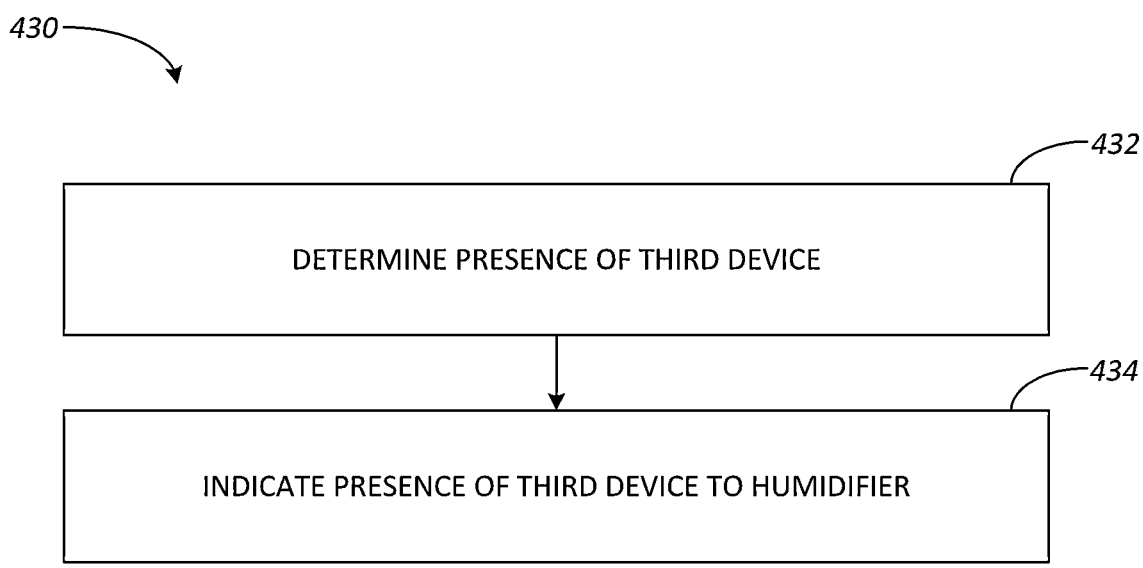
FIG. 19 illustrates another example method of operating a humidification and ventilation system.

FIG. 19 illustrates an example method 430 of operating a respiratory ventilation and humidification system that includes a humidifier, a flow generator and a third device. The third device could be a peripheral device such as an incubator, infant warmer, nebulizer, source of medicinal gases or vapors etc. The third device could be a consumable device such as a patient interface or breathing tube. The third device could be another medical device. The third device could be a patient monitoring device or a central monitoring device (i.e. a device that forms at least part of a central monitoring system).

At step 432, the presence of the third device is determined. The determination may be performed by the flow generator. In some cases, the third device can be pneumatically or communicatively connected to the flow generator and the flow generator detects this connection. The flow generator can then transmit the indication of the device to the humidifier over a communication connection at step 434. The indication can include information about the third device such as the type of device, the manufacturer of the device, whether or not the device has been authenticated, a unique device ID or serial number of the device, a configuration of the device or software version installed on the device, a medication type delivered by the device, an operating mode of the device, etc.

The operation of the flow generator could be controlled based on the third device. For example, the third device could be a medication delivery device. This can periodically introduce a medication into the breathing gases. It may be advantageous to synchronize the introduction of the medication with the timing of the ventilation. The flow generator can control the timing of its breathing cycle based on the timing of the medication delivery device.

The operation of the flow generator and/or the humidifier can be controlled based on the configuration or identification information of the third device. For example, the third device may only be compatible with certain modes of operation. This can be inferred by the humidifier and/or the flow generator from the identification or configuration information. The humidifier and/or flow generator can then confirm that their operation is compatible with the third device.

When the third device is a patient monitoring device or central monitoring device, the humidifier and/or flow generator can enter a quiet mode. This may be useful in a "silent ward" setting, for example. In the quiet mode, the device can avoid issuing audio alerts, can reduce their number, and/or can reduce their volume. The alerts can be signaled to the third device, instead of or in addition to being issued by the humidifier. Corresponding visual alerts can still be displayed on a user interface of the device. Alternatively or additionally to the quiet mode, the humidifier and/or flow generator can enter a dim mode. In the dim mode, light-emitting devices such as those of the user interface and/or other lights can operate at a lower light level—i.e. they can be dimmed or turned off-which may also be useful in a silent ward setting. The humidifier can enter the quiet and/or dim mode(s) in response to information received from the flow generator. Alternatively or additionally, the humidifier can be configured to operate in the quiet and/or dim mode(s) without receiving this information from the flow generator, for example by a user selecting a quiet and/or dim mode(s) via a user interface of the humidifier.

In some examples, the humidifier can enter the quiet and/or dim mode(s) upon detecting that a medical device that it is connected to is operating in a quiet and/or dim mode(s) or another mode indicative of the medical device being operated on a silent ward—i.e. a "silent ward mode". For example, a flow generator could have a silent ward mode designed to be suitable for use on a silent ward, and one or more other modes that are not designed to be suitable for use on a silent ward. The humidifier can detect that the flow generator is operating in the silent ward mode and adjust its operation to suit operation on the silent ward. For example, the humidifier could enter the quiet and/or dim mode(s) as discussed above. The humidifier can additionally or alternatively be configured to detect that another device, e.g. a patient monitor, is operating in a silent ward mode and control one or more parameter(s) of its operation based on that detection.

Figure 20:
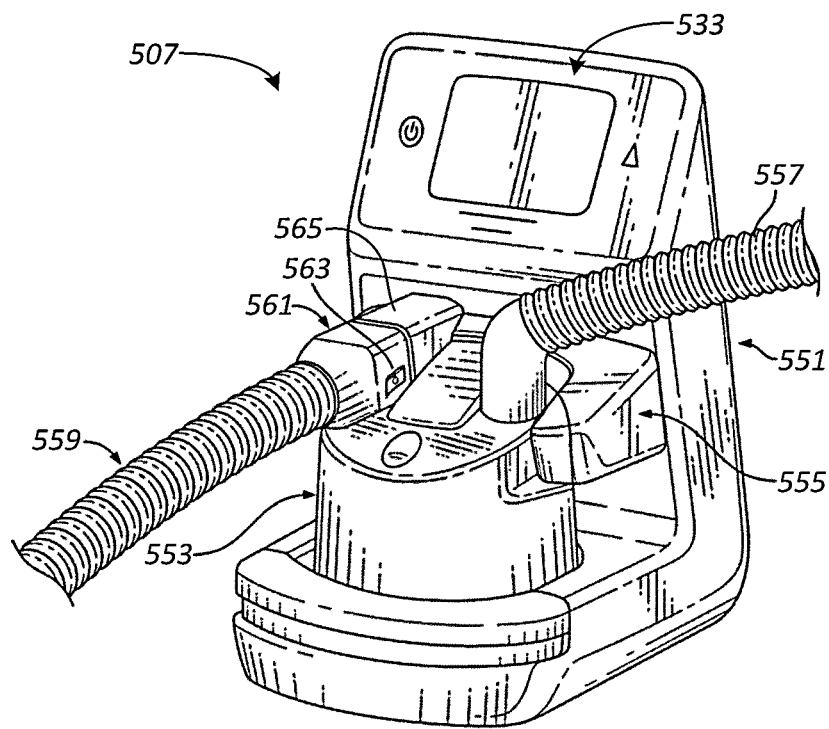
FIG. 20 illustrates another example humidifier.

FIG. 20 illustrates in more detail an example respiratory humidifier 507, which can be one exemplary configuration of the humidifier 20 discussed previously. References in the disclosure to a humidifier and the operations thereof should be understood to describe the humidifier 507 and its operation, as well as other exemplary humidifiers.

Figure 21:
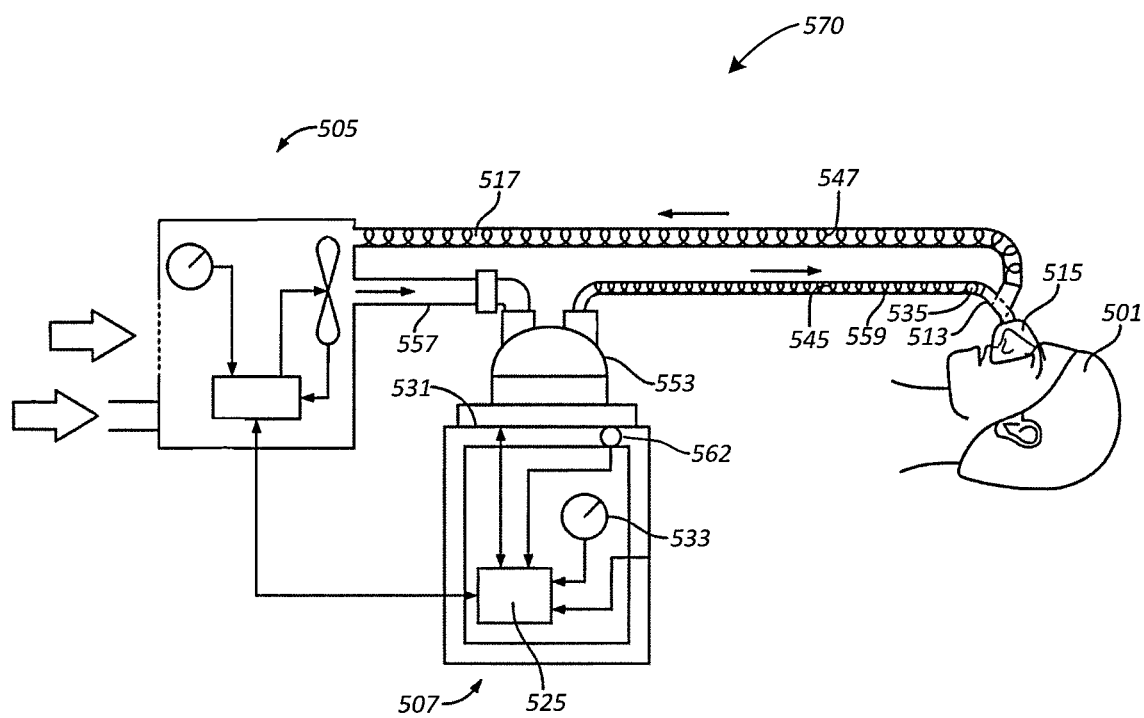
FIG. 21 illustrates another example humidification and ventilation system.

FIG. 21 schematically illustrates an example respiratory or surgical humidification and ventilation system 570 that includes the humidifier 507. References in the disclosure to a respiratory or surgical humidification and ventilation system and the operations thereof should be understood to describe the system 570 and its operation, as well as other exemplary systems.

The illustrated humidifier 507 comprises a heater base 551 with a heater plate 531, a user interface 533 and a controller 525; a humidification chamber 553; and a cartridge 555. The humidification chamber 553 is received by the heater base 551 in thermal contact with the heater plate 531.

The cartridge 555 houses electronics and one or more sensors 562 which sense one or more properties of gases flowing through the humidification chamber 553 in use. The sensors can be provided on probes protruding from the cartridge 555 and through an aperture in the inlet or outlet of the humidification chamber, in use. The cartridge 555 also comprises an electrical connector 565 which makes an electrical connection with the heater base for communication (for example, serial communication) with the controller. The cartridge can comprise a microcontroller communicatively coupled with the sensor(s) and the controller.

In use, the outlet of a dry line tube 557 receiving a flow of gases from a gases source (not shown) is pneumatically coupled with the inlet of the humidification chamber 553, and an inspiratory tube 559 comprising an electropneumatic connector 561 is electrically coupled with the cartridge 555 and pneumatically coupled with the outlet of the humidification chamber 553 to transport the humidified flow of gases towards the patient 501. The electropneumatic connector 561 makes a releasable and lockable connection with the humidification chamber 553 and/or cartridge 555, and comprises one or more release buttons 563.

The inspiratory tube 559 and expiratory tube 517 include heater wires 545 and 547, respectively. The inspiratory tube 559 also includes one or more sensors 535, which can communicate sensed conditions (e.g. temperature, humidity, moisture, flow) to the controller 525. In some configurations, a temperature sensor can be placed at the distal end of the inspiratory tube 515 to sense the temperature of the breathing gases near the patient interface 515. Other sensors, like moisture sensors, can be placed anywhere along inspiratory tube 559, as can further temperature sensors. Breathing gases can be provided to the patient 501 via the patient interface 515, which in this example is shown as an adult face mask but could be any suitable patient interface. The patient interface 515 is pneumatically connected to the inspiratory tube 559 and expiratory tube 517 by a wye connector 513. Gases can be provided to the humidifier 507 by a flow generator 505 via the dry line 557. Exhaled gases can also be returned to the flow generator 505 via the expiratory line 517.

The humidifier controller 525 can be an electronic, analog, or digital controller 525. The controller 525 can be a microprocessor-based controller executing computer software commands stored in associated memory. In response to humidity, temperature or other feedback values provided via a user interface 533 and/or integrated sensors, the controller 525 determines heat, flow, pressure and/or other variables used to provide humidified gases to a patient 501. User interface 533 can be one or more hardware buttons and/or a display or touch screen display. The display can provide audio and/or visual feedback to the user.

Any suitable patient interface 515 may be used. Patient interface is a broad term and is to be given its ordinary and customary meaning to a person of ordinary skill in the art (that is, it is not to be limited to a special or customized meaning) and includes, without limitation, masks (such as tracheal mask, face masks, and nasal masks), endotracheal tubes, tracheostomy tubes, cannulas, nasal pillows, and surgical interfaces such as a surgical cannula typically used in closed surgeries or a surgical diffuser typically used in open surgeries.

Methods and processes described herein can be performed on or using the devices and/or systems noted in the methods, with the devices and/or systems being configured to perform or facilitate performance of the methods.

While the control circuit has been discussed in terms of a processor in certain examples, it could take other forms. For example, the control circuit could include one or more microcontrollers, field-programmable gate arrays (FPGA), complex programmable logic devices (CPLD), programmable array logic devices (PAL) or combinations thereof. The control circuit could be implemented in a single device or a combination of devices.

Methods and processes described herein may be embodied in, and partially or fully automated via, software code modules executed by one or more general and/or special purpose computers. The word "module" refers to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in non-volatile memory, such as an erasable programmable read-only memory (EPROM). It will be further appreciated that hardware modules may comprise connected logic units, such as gates, flip-flops and/or application specific integrated circuits, and/or may comprise programmable units, such as programmable gate arrays and/or processors. The modules described herein can be implemented as software modules, but also may be represented in hardware and/or firmware. Moreover, although in some embodiments a module may be separately compiled, in other embodiments a module may represent a subset of instructions of a separately compiled program and may not have an interface available to other logical program units.

In certain embodiments, code modules may be implemented and/or stored in any type of computer-readable medium or other computer storage device. In some systems, data (and/or metadata) input to the system, data generated by the system, and/or data used by the system can be stored in any type of computer data repository, such as a relational database and/or flat file system. Any of the systems, methods, and processes described herein may include an interface configured to permit interaction with users, operators, other systems, components, programs, and so forth.

It should be emphasized that many variations and modifications may be made to the embodiments described herein, the elements of which are to be understood as being among other acceptable examples. All such modifications and variations are intended to be included herein within the scope of this disclosure and protected by the following claims. Further, nothing in the foregoing disclosure is intended to imply that any particular component, characteristic or process step is necessary or essential.

Clauses Defining Exemplary Embodiments:

1. A method for facilitating configuration of a device, the method comprising:
   a. obtaining, by a medical device, configuration information for a respiratory or surgical humidifier external to the medical device; and
   b. providing, by the medical device, the obtained configuration information to the respiratory or surgical humidifier.
2. The method of clause 1 wherein obtaining the configuration information for the respiratory or surgical humidifier comprises obtaining a configuration file that includes the configuration information for the respiratory or surgical humidifier and configuration information for the medical device.
3. The method of clause 1 or clause 2 wherein the configuration information is encrypted.
4. The method of clause 2 wherein the configuration information for the respiratory or surgical humidifier is encrypted separately from the configuration information for the medical device.
5. The method of any one of clauses 1 to 4 wherein the medical device is a flow generator.
6. The method of any one of clauses 1 to 4 wherein the medical device is a gases source.
7. The method of any one of clauses 1 to 4 wherein the medical device is another respiratory or surgical humidifier.
8. The method of any one of clauses 1 to 4 wherein the medical device is an incubator.
9. The method of any one of clauses 1 to 4 wherein the medical device is a patient monitoring device.
10. The method of any one of clauses 1 to 9 wherein obtaining the configuration information comprises obtaining the configuration information from a third device using a communication interface.
11. The method of any one of clauses 1 to 10 comprising, before providing the obtained configuration information to the respiratory or surgical humidifier, authenticating the medical device.
12. The method of any one of clauses 1 to 11 comprising comparing a version identifier of the obtained configuration information for the respiratory or surgical humidifier to a version identifier of a current configuration of the respiratory or surgical humidifier, wherein the obtained configuration information is provided to the respiratory or surgical humidifier at least partly based on the comparison showing that the version identifiers are different.
13. The method of any one of clauses 1 to 12 comprising, before providing the obtained configuration information to the respiratory or surgical humidifier, determining that the respiratory or surgical humidifier is communicatively connected to the medical device, and wherein the obtained configuration information is provided to the respiratory or surgical humidifier at least in part based on the determination.

14. The method of clause 13 wherein the obtained configuration information is provided to the medical device also based on receipt of a user input.

15. The method of any one of clauses 1 to 14 further comprising configuring the respiratory or surgical humidifier using the obtained configuration information.

16. The method of any one of clauses 1 to 15 further comprising:
   c. providing, by the medical device, further device configuration information to the respiratory or surgical humidifier; and
   d. providing, by the respiratory or surgical humidifier, the further device configuration information to a further device.

17. The method of clause 16 wherein:
   providing the obtained configuration information to the respiratory or surgical humidifier; and
   providing the further device configuration information to the respiratory or surgical humidifier;
   is performed by providing a configuration file that includes the obtained configuration information and the further device configuration information.

18. The method of clause 16 or 17 further comprising configuring the further device using the further device configuration information.

19. A medical device including:
   a. one or more communication interfaces;
   b. one or more processors; and
   c. one or more memory devices, one or more of the memory device(s) having stored thereon instructions for causing one or more of the processor(s) to:
      i. obtain, using one or more of the communication interface(s), configuration information for a respiratory or surgical humidifier; and
      ii. provide, using one or more of the communication interface(s), the configuration information to the respiratory or surgical humidifier.

20. The medical device of clause 19 wherein the configuration information for the respiratory or surgical humidifier is comprised in a configuration file that also comprises configuration information for the medical device.

21. The medical device of clause 19 or clause 20 wherein the configuration information is encrypted.

22. The medical device of clause 20 wherein the configuration information for the respiratory or surgical humidifier is encrypted separately from the configuration information for the medical device.

23. The medical device of any one of clauses 19 to 22 wherein the medical device is a flow generator.

24. The medical device of any one of clauses 19 to 22 wherein the medical device is a gases source.

25. The medical device of any one of clauses 19 to 22 wherein the medical device is another respiratory or surgical humidifier.

26. The medical device of any one of clauses 19 to 22 wherein the medical device is an incubator.

27. The medical device of any one of clauses 19 to 22 wherein the medical device is a patient monitoring device.

28. The medical device of any one of clauses 19 to 27 wherein the communication interface is a serial communication interface.

29. The medical device of clause 28 wherein the communication interface is an RS-232 interface.

30. The medical device of clause 28 wherein the communication interface is a USB interface.

31. The medical device of any one of clauses 19 to 27 wherein the communication interface is an Ethernet interface.

32. The medical device of any one of clauses 19 to 27 wherein the communication interface is a wireless communication interface.

33. A method of configuring a device, the method comprising:
   a. obtaining, by a medical device external to a respiratory or surgical humidifier, configuration information for the medical device and configuration information for the respiratory or surgical humidifier; and
      i. configuring the medical device according to the obtained configuration information for the medical device; and/or
      ii. configuring the respiratory or surgical humidifier according to the obtained configuration information for the respiratory or surgical humidifier.

34. The method of clause 33 wherein obtaining the configuration information includes obtaining a configuration file that includes the configuration information for the respiratory or surgical humidifier and configuration information for the medical device.

35. The method of clause 33 or clause 34 wherein the configuration information is encrypted.

36. The method of clause 34 wherein the configuration information for the respiratory or surgical humidifier is encrypted separately from the configuration information for the medical device.

37. The method of any one of clauses 33 to 36 wherein the medical device is a flow generator.

38. The method of any one of clauses 33 to 36 wherein the medical device is a gases source.

39. The method of any one of clauses 33 to 36 wherein the medical device is another respiratory or surgical humidifier.

40. The method of any one of clauses 33 to 36 wherein the medical device is an incubator.

41. The method of any one of clauses 33 to 36 wherein the medical device is a patient monitoring device.

42. The method of any one of clauses 33 to 41 wherein obtaining the configuration information comprises obtaining the configuration information from a third device using a communication interface.

43. The method of clause 42 wherein the third device is a patient monitoring device.

44. The method of clause 42 wherein the third device is a central monitoring device.

45. The method of clause 42 wherein the third device is a personal computing device.

46. The method of any one of clauses 33 to 45 comprising, before configuring the respiratory or surgical humidifier and/or the medical device, authenticating the respiratory or surgical humidifier and/or the medical device.

47. The method of any one of clauses 33 to 46 further comprising:
   a. initiating a configuration process, the configuration process including:

i. determining whether to configure the respiratory or surgical humidifier according to the obtained configuration information for the respiratory or surgical humidifier; and
ii. determining whether to configure the medical device according to the obtained configuration information for the medical device.

48. The method of clause 47 wherein:
   a. determining whether to configure the respiratory or surgical humidifier includes comparing a version identifier of the obtained configuration information for the respiratory or surgical humidifier to a version identifier of a current configuration of the respiratory or surgical humidifier; and
   b. determining whether to configure the medical device includes comparing a version identifier of the obtained configuration information for the medical device to a version identifier of a current configuration of the medical device.

49. The method of clause 47 or 48 further comprising:
   a. determining that the respiratory or surgical humidifier is communicatively connected to the medical device, and wherein the configuration process is initiated at least in part based on the determination.

50. The method of any one of clauses 33 to 46 comprising:
   a. determining whether to configure the medical device according to the obtained configuration information for the medical device;
   b. determining that the respiratory or surgical humidifier is communicatively connected to the medical device; and
   c. based at least in part on the determination that the respiratory or surgical humidifier is communicatively connected to the medical device, determining whether to configure the respiratory or surgical humidifier according to the configuration information for the respiratory or surgical humidifier.

51. The method of any one of clauses 33 to 50 comprising determining whether current configuration of the respiratory or surgical humidifier is compatible with a current configuration of the medical device.

52. The method of clause 51 comprising, if the current configuration of the respiratory or surgical humidifier is not compatible with the current configuration of the medical device, entering an error state.

53. The method of clause 51 comprising, if the current configuration of the respiratory or surgical humidifier is not compatible with the current configuration of the medical device, providing, to the respiratory or surgical humidifier, configuration information that is compatible with the current configuration of the medical device.

54. The method of any one of clauses 42 to 46 comprising determining that the third device is communicatively connected to the medical device, wherein the third device provides the configuration information to the medical device at least partly based on the determination.

55. The method of any one of clauses 33 to 54 comprising configuring the medical device according to the obtained configuration information for the medical device.

56. The method of any one of clauses 33 to 55 comprising configuring the respiratory or surgical humidifier according to the obtained configuration information for the respiratory or surgical humidifier.

57. A respiratory or surgical humidification system comprising:
   a. a respiratory or surgical humidifier comprising one or more communication interfaces; and
   b. a medical device external to the respiratory or surgical humidifier, the medical device including:
      i. one or more communication interfaces;
      ii. one or more processors; and
      iii. one or more memory devices, the memory device(s) having stored thereon instructions for causing one or more of the processor(s) to:
         obtain, using one or more of the communication interface(s) of the medical device, configuration information for the respiratory or surgical humidifier and configuration information for the medical device; and
            a. configure the medical device according to the obtained configuration information for the medical device; and/or
            b. provide, using one or more of the communication interface(s) of the medical device, the configuration information for the respiratory or surgical humidifier to the respiratory or surgical humidifier.

58. The system of clause 57 wherein the configuration information for the respiratory or surgical humidifier and the configuration information for the medical device is comprised in the same configuration file.

59. The system of clause 57 or clause 58 wherein the configuration information is encrypted.

60. The system of clause 59 wherein the configuration information for the respiratory or surgical humidifier is encrypted separately from the configuration information for the medical device.

61. The system of any one of clauses 57 to 60 wherein the medical device is a flow generator.

62. The system of any one of clauses 57 to 60 wherein the medical device is a gases source.

63. The system of any one of clauses 57 to 60 wherein the medical device is another respiratory or surgical humidifier.

64. The system of any one of clauses 57 to 60 wherein the medical device is an incubator.

65. The system of any one of clauses 57 to 60 wherein the medical device is a patient monitoring device.

66. The system of any one of clauses 57 to 65 further comprising a third device including a communication interface.

67. The system of clause 66 wherein the third device is configured to provide the configuration information to the medical device.

68. The system of clause 66 or clause 67 wherein the third device is a patient monitoring device.

69. The system of clause 66 or 67 wherein the third device is a central monitoring device.

70. The system of clause 66 or 67 wherein the third device is a personal computing device.

71. The system of clause 66 or 67 wherein the third device is another respiratory or surgical humidifier.

72. The system of any one of clauses 57 to 71 wherein one or more of the communication interfaces of each of the respiratory or surgical humidifier and the medical device is a serial communication interface.

73. The system of clause 72 wherein the serial communication interface of each of the respiratory or surgical humidifier and the medical device is an RS-232, RS-422, or RS-485 interface.

74. The system of clause 72 wherein the serial communication interface of each of the respiratory or surgical humidifier and the medical device is a USB interface.
75. The system of any one of clauses 57 to 71 wherein one or more of the communication interfaces of each of the respiratory or surgical humidifier and the medical device is an Ethernet interface.
76. The system of any one of clauses 57 to 71 wherein one or more of the communication interfaces of each of the respiratory or surgical humidifier and the medical device is a wireless communication interface.
77. The system of any one of clauses 57 to 76 further comprising a further device, the further device comprising one or more communication interfaces, and wherein the respiratory or surgical humidifier further comprises:
   a. one or more processors; and
   b. one or more memory devices, the memory device(s) having stored thereon instructions for causing one or more of the processor(s) to:
      i. obtain, using one or more of the communication interface(s) of the respiratory or surgical humidifier, configuration information for the respiratory or surgical humidifier and configuration information for the further device; and
         a. configure the respiratory or surgical humidifier according to the obtained configuration information for the respiratory or surgical humidifier; and/or
         b. provide, using one or more of the communication interface(s) of the respiratory or surgical humidifier, the configuration information for the further device to the further device.
78. A method of updating a device, the method comprising:
   a. obtaining an update file comprising an update for a respiratory or surgical humidifier and an update for a device external to the respiratory or surgical humidifier; and
   b. using the external device:
      i. providing the update for the respiratory or surgical humidifier to the respiratory or surgical humidifier; and
      ii. confirming an update of the respiratory or surgical humidifier.
79. The method of clause 78 wherein the update file is encrypted.
80. The method of clause 79 wherein the update for the respiratory or surgical humidifier is encrypted separately from the update for the external device.
81. The method of any one of clauses 78 to 80 wherein the external device is a medical device.
82. The method of clause 81 wherein the external device is a flow generator.
83. The method of clause 81 wherein the external device is a gases source.
84. The method of clause 81 wherein the external device is another humidifier.
85. The method of clause 81 wherein the external device is an incubator.
86. The method of clause 81 wherein the external device is a patient monitoring device.
87. The method of any one of clauses 78 to 86 comprising:
   a. providing the update for the respiratory or surgical humidifier to a second respiratory or surgical humidifier; and
   b. confirming an update of the second respiratory or surgical humidifier.
88. A method of updating a respiratory or surgical humidifier and a device external to the respiratory or surgical humidifier, the method comprising:
   a. transferring, to the external device, an update file comprising an update for the respiratory or surgical humidifier and an update for the external device; and
   b. initiating an update process for updating the external device and the respiratory or surgical humidifier.
89. The method of clause 88 wherein the update file is transferred to the external device from a third device at least partly based on a determination that the external device is communicatively connected to the third device.
90. The method of clause 89 wherein the update file is transferred to the external device from the third device also based on a user input.
91. The method of any one of clauses 88 to 90 wherein the update process is initiated at least partly based on a determination that the respiratory or surgical humidifier is communicatively connected to the external device.
92. The method of clause 91 wherein the update process is initiated also based on a user input.
93. A method of updating a device, the method comprising:
   a. obtaining an update file comprising an update for a respiratory or surgical humidifier and an update for a device external to the respiratory or surgical humidifier; and
      i. updating the external device using at least part of the update for the external device; and/or
      ii. updating the respiratory or surgical humidifier using at least part of the update for the respiratory or surgical humidifier.
94. The method of clause 93 comprising comparing a version identifier of the update for the respiratory or surgical humidifier to a version identifier of a most recently applied update of the respiratory or surgical humidifier and updating the respiratory or surgical humidifier using at least part of the update for the respiratory or surgical humidifier if the versions are different.
95. The method of clause 94 wherein the respiratory or surgical humidifier is updated if the obtained update is a later version than the most recently applied update.
96. The method of any one of clauses 93 to 95 comprising comparing a version identifier of the update for the external device to a version identifier of a most recently applied update of the external device and updating the external device using at least part of the update for external device if the versions are different.
97. The method of clause 96 wherein the external device is updated if the obtained update is a later version than the most recently applied update.
98. The method of any one of clauses 93 to 97 wherein the respiratory or surgical humidifier and the external device are both updated and wherein the updating of the respiratory or surgical humidifier is at least partly overlapping in time with the updating of the external device.
99. The method of any one of clauses 93 to 97 wherein the respiratory or surgical humidifier and the external device are both updated and wherein the updating of the respiratory or surgical humidifier occurs later in time than the updating of the external device.

100. A system comprising:
   a. a respiratory or surgical humidifier;
   b. a device external to the respiratory or surgical humidifier; and
   c. an update file, the update file comprising an update for the respiratory or surgical humidifier and an update for the external device.
101. The system of clause 100 wherein the update file is encrypted.
102. The system of clause 101 wherein the update for the respiratory or surgical humidifier is encrypted separately from the update for the external device.
103. The system of any one of clauses 100 to 102 wherein the external device is a medical device.
104. The system of clause 103 wherein the external device is a flow generator.
105. The system of clause 103 wherein the external device is a gases source.
106. The system of clause 103 wherein the external device is another humidifier.
107. The system of clause 103 wherein the external device is an incubator.
108. The system of clause 103 wherein the external device is a patient monitoring device.
109. The system of any one of clauses 100 to 108 further comprising a third device communicatively connected to the respiratory or surgical humidifier.
110. The system of clause 109 wherein the third device is communicatively connected to the respiratory or surgical humidifier via the external device.
111. The system of clause 109 or 110 wherein the third device is a patient monitoring device.
112. The system of clause 109 or 110 wherein the third device is a central monitoring device.
113. The system of clause 109 or 110 wherein the third device is a personal computing device.
114. The system of clause 109 or 110 wherein the third device is another humidifier.
115. The system of any one of clauses 100 to 114 wherein the respiratory or surgical humidifier and the external device are communicatively connected via serial communication interfaces.
116. The system of clause 115 wherein the serial communication interfaces are RS-232, RS-422, and/or RS-485 interfaces.
117. The system of clause 115 wherein the serial communication interfaces are USB interfaces.
118. The system of any one of clauses 100 to 114 wherein the respiratory or surgical humidifier and the external device are communicatively connected via Ethernet interfaces.
119. The system of any one of clauses 100 to 114 wherein the respiratory or surgical humidifier and the external device are communicatively connected via wireless interfaces.
120. The system of any one of clauses 110 to 114 wherein the third device and the external device are communicatively connected via serial communication interfaces.
121. The system of clause 120 wherein the serial communication interfaces are RS-232, RS-422, RS-485 and/or USB interfaces.
122. The system of any one of clauses 110 to 114 wherein the third device and the external device are communicatively connected via Ethernet interfaces.
123. The system of any one of clauses 110 to 114 wherein the third device and the external device are communicatively connected via wireless interfaces.
124. The system of any one of clauses 110 to 114 further comprising a further device, wherein the update file further comprises an update for the further device.
125. A method for authenticating devices of a respiratory or surgical humidification and/or ventilation system, the method comprising:
   a. providing, from a first device of the respiratory or surgical humidification and/or ventilation system, first authentication information;
   b. performing, by a second device of the respiratory or surgical humidification and/or ventilation system, a first authenticity check of the first authentication information; and
   c. depending on the result of the first authenticity check, either:
      i. approving the first device for further communications with the second device; or
      ii. not approving the first device for further communications with the second device.
126. The method of clause 125 further comprising:
   a providing, from the second device, second authentication information;
   b. performing, by the first device, a second authenticity check of the second authentication information; and
   c. depending on the result of the second authenticity check, either:
      i. approving the second device for further communications with the first device; or
      ii. not approving the second device for further communications with the first device.
127. The method of clause 125 or clause 126 wherein the first authentication information comprises a first digital certificate signed by a private key of the first device and wherein the first authenticity check includes verifying the first digital certificate using a public key of the first device.
128. The method of clause 126 or clause 127 when dependent on clause 126 wherein the second authentication information comprises a second digital certificate signed by a private key of the second device and wherein the second authenticity check includes verifying the second digital certificate using a public key of the second device.
129. The method of any one of clauses 125 to 128 wherein the first device is a respiratory or surgical humidifier.
130. The method of any one of clauses 125 to 129 wherein the second device is a flow generator.
131. The method of any one of clauses 125 to 130 further comprising performing the further communications between the first and second devices if the first device is approved for further communications with the second device.
132. A method for authenticating devices of a respiratory or surgical humidification and/or ventilation system, the method comprising:
   a. providing, from a first device of the respiratory or surgical humidification and/or ventilation system, first authentication information;
   b. performing, by a second device of the respiratory or surgical humidification and/or ventilation system, an authenticity check of the authentication information; and
   c. depending on the result of the authenticity check, either:
      i. approving the first device for operation in the respiratory or surgical humidification and/or ventilation system; or ii. not approving the first device for operation in the respiratory or surgical humidification and/or ventilation system.
133. The method of clause 132 further comprising:
a. providing, from the second device, second authentication information;
b. performing, by the first device, a second authenticity check of the second authentication information; and
c. depending on the result of the second authenticity check, either:
i. approving the second device for operation in the respiratory or surgical humidification and/or ventilation system; or
ii. not approving the second device for operation in the respiratory or surgical humidification and/or ventilation system.
134. The method of clause 132 or clause 133 wherein the first authentication information comprises a first digital certificate signed by a private key of the first device and wherein the first authenticity check includes verifying the first digital certificate using a public key of the first device.
135. The method of clause 133 or clause 134 when dependent on clause 133 wherein the second authentication information comprises a second digital certificate signed by a private key of the second device and wherein the second authenticity check includes verifying the second digital certificate using a public key of the second device.
136. The method of any one of clauses 132 to 135 wherein the first device is a respiratory or surgical humidifier.
137. The method of any one of clauses 132 to 136 wherein the second device is a flow generator.
138. The method of any one of clauses 132 to 137 further comprising performing respiratory or surgical humidification and/or ventilation using the first device if the first device is approved for operation in the respiratory or surgical humidification and/or ventilation system.
139. A method of assessing the health of a respiratory or surgical humidifier, the method comprising:
a. receiving, at a device external to the respiratory or surgical humidifier, sensor output data indicative of the performance of or resources available to the respiratory or surgical humidifier;
b. applying one or more device health assessment rules to the sensor output data; and
c. determining, based on the application of the device health assessment rule(s) to the sensor output data, a value of a device health parameter associated with the respiratory or surgical humidifier.
140. The method of clause 139 wherein the sensor output data includes data output by one or more sensors of the respiratory or surgical humidifier.
141. The method of clause 139 wherein the sensor output data includes data output by one or more sensors of the external device.
142. The method of clause 139 further comprising selecting which sensor to use for providing the sensor output data by selecting between a sensor of the respiratory or surgical humidifier and a sensor of the external device.
143. The method of clause 142 wherein the selection is based on an attribute of each sensor.
144. The method of clause 143 wherein the attribute is accuracy.
145. The method of clause 142 wherein the selection includes selecting the sensor of the external device if the respiratory or surgical humidifier and the external device are communicatively connected.
146. The method of any one of clauses 139 to 145 wherein the health parameter is humidifier chamber water level.
147. The method of clause 146 wherein the humidifier chamber water level is determined from a temperature and/or power draw of a water-heating element of the humidifier.
148. The method of clause 146 wherein the humidifier chamber water level is determined from fluid flow rate measurements.
149. The method of clause 148 wherein the humidifier chamber water level is determined from the difference between a flow rate measurement of fluid upstream of the humidifier chamber and a flow rate measurement of fluid downstream of the humidifier chamber.
150. The method of clause 149 wherein applying the one or more device health assessment rules includes comparing the difference between flow rate measurements to a threshold and wherein determining the value of the health parameter includes determining a water out condition if the difference is less than a threshold.
151. The method of clause 146 wherein the humidifier chamber water level is determined from a measured humidity of fluid downstream of the humidifier.
152. The method of clause 151 wherein applying the one or more device health assessment rules includes comparing the measured humidity to a threshold and wherein determining the value of the health parameter includes determining a water out condition if the measured humidity is less than a threshold.
153. The method of any one of clauses 146 to 152 wherein the sensor output data includes data output by one or more sensors selected from the group consisting of: pressure sensors; voltage sensors; electrical current sensors; temperature sensors; weight sensors; conductivity sensors; and float sensors.
154. The method of any one of clauses 146 to 153 comprising altering a flow of gases supplied to the respiratory or surgical humidifier.
155. The method of clause 154 wherein altering the flow of gases includes increasing the volume flow rate.
156. The method of clause 155 wherein increasing the volume flow rate includes increasing the volume flow rate from about 3 liters per minute or less to more than 3 liters per minute.
157. The method of any one of clauses 154 to 156 wherein altering the flow of gases include pulsing the flow of gases.
158. The method of any one of clauses 139 to 155 wherein the health parameter is a direction of fluid flow through the humidifier.
159. The method of any one of clauses 139 to 158 wherein the external device is a flow generator.
160. The method of clause 159 when dependent on clause 151 or 152 wherein the measured humidity is determined from sensor output data of a humidity sensor in an expiratory block of the flow generator.
161. The method of clause 160 wherein the measured humidity is used to control the power supplied to a heating element in the expiratory block.
162. The method of clause 159 when dependent on clause 158 comprising:
a. blocking an expiratory block of the flow generator;
b. providing a flow of gas from an inspiratory block of the flow generator; and c. determining a resulting fluid flow rate through the humidifier.
163. The method of clause 162 wherein applying the one or more device health assessment rules comprises comparing the resulting fluid flow rate to a threshold and wherein determining the value of the device health parameter includes determining a reverse flow condition if the resulting flow rate is less than the threshold.
164. The method of clause 159 when dependent on clause 158 comprising:
   a. blocking an outlet that is configured to provide gas from a breathing circuit associated with the humidifier towards a patient interface and blocking an expiratory block of the flow generator;
   b. providing a flow of gas from an inspiratory block of the flow generator;
   c. blocking the inspiratory block and opening the expiratory block; and
   d. determining a resulting fluid flow rate through the humidifier.
165. The method of clause 164 wherein applying the one or more device health assessment rules comprises comparing the resulting fluid flow rate to a threshold and wherein determining the value of the device health parameter includes determining a reverse flow condition if the resulting fluid flow rate is greater than the threshold.
166. The method of any one of clauses 162 to 165 wherein determining the flow rate through the humidifier comprises determining an amount of electrical power delivered to a water-heating element to maintain the temperature of water in a chamber of the humidifier at or near a setpoint.
167. The method of any one of clauses 162 to 166 comprising increasing a flow of gas from the inspiratory block of the flow generator.
168. The method of clause 139 wherein the device health parameter is a quality of a source of electrical power for the respiratory or surgical humidifier.
169. The method of clause 168 wherein the health parameter is a level of charge of one or more batteries that provide electrical power for the respiratory or surgical humidifier.
170. The method of clause 169 wherein the one or more batteries are located in the external device.
171. The method of clause 168 wherein the health parameter is a voltage of a mains power supply.
172. The method of clause 171 wherein the mains power supply is connected to the external device, which uses electrical power received from the mains power supply to provide electrical power to the respiratory or surgical humidifier.
173. The method of clause 139 wherein the device health parameter is an amount of liquid in a breathing circuit associated with the respiratory or surgical humidifier.
174. The method of clause 173 further comprising the external device instructing the respiratory or surgical humidifier to enter a dry-out mode if the amount of liquid is above a threshold.
175. The method of any one of clauses 168 to 174 wherein the external device is a flow generator.
176. A method of operating a respiratory or surgical humidifier, the method comprising:
   a. providing electrical power to a heating element of the respiratory or surgical humidifier;
   b. receiving an indication that a flow generator is providing to the respiratory or surgical humidifier a flow of breathable gas at a first flow level after a period of providing substantially no flow to the respiratory or surgical humidifier; and
   c. in response to the indication, suppressing the triggering of one or more alarms.
177. The method of clause 176 wherein the heating element is in a breathing tube of the respiratory or surgical humidifier.
178. The method of clause 176 or 177 wherein the alarms include a delivered flow temperature alarm.
179. The method of any one of clauses 176 to 178 wherein the first flow level is about 3 liters per minute or more.
180. A method of controlling operation of a respiratory or surgical humidifier, the method comprising:
   a. determining an operational mode of a medical device that is connected to the respiratory or surgical humidifier; and
   b. based on the determined operational mode, controlling one or more operating parameters of the respiratory or surgical humidifier.
181. The method of clause 180 wherein the operational mode is a standby mode.
182. The method of clause 180 or 181 wherein controlling the one or more operating parameters includes reducing power provided to a heating element of the respiratory or surgical humidifier.
183. The method of any one of clauses 180 to 182 wherein the medical device is a flow generator.
184. The method of clause 180 wherein the operational mode is a silent ward mode.
185. The method of clause 184 wherein controlling the one or more operating parameters includes operating the respiratory or surgical humidifier in a dim mode, wherein in the dim mode one or more light-emitting devices of the respiratory or surgical humidifier is dimmed or turned off.
186. The method of clause 184 or 185 wherein controlling the one or more operating parameters includes operating the respiratory or surgical humidifier in a quiet mode, wherein in the quiet mode the volume and/or number of audio alerts issued from the respiratory or surgical humidifier is partly or completely reduced.
187. The method of any one of clauses 184 to 186 wherein the medical device is a flow generator, a patient monitor or a central monitoring device.
188. A method of operating a respiratory or surgical humidifier, the method comprising:
   a. receiving, from a patient skin sensor, data indicative of ambient temperature; and
   b. controlling electrical power to a heating element of the respiratory or surgical humidifier based on the data indicative of ambient temperature.
189. The method of clause 188 wherein receiving the data from the patient skin sensor includes receiving the data via a third device.
190. The method of clause 189 wherein the third device is an incubator.
191. The method of clause 189 wherein the third device is an infant warmer.
192. The method of any one of clauses 188 to 191 wherein the heating element is in a breathing tube of the respiratory or surgical humidifier.
193. A system comprising:
   a. a respiratory or surgical humidifier including a heating element;

b. a patient skin sensor configured to sense a temperature of a patient's skin, the patient skin sensor being communicatively connected to the respiratory or surgical humidifier.

194. The system of clause 193 further comprising a third device, wherein the respiratory or surgical humidifier is communicatively connected to the patient skin sensor via the third device.

195. The system of clause 194 wherein the third device is an incubator.

196. The system of clause 194 wherein the third device is an infant warmer.

197. The system of any one of clauses 193 to 196 wherein the heating element is in a breathing tube of the respiratory or surgical humidifier.

198. A method of operating a respiratory or surgical ventilation and humidification system, the method comprising:
   a. logging, at a respiratory or surgical humidifier, operational data of the respiratory or surgical humidifier and operational data of a flow generator connected to the respiratory or surgical humidifier; and/or
   b. logging, at a flow generator, operational data of the flow generator and operational data of a respiratory or surgical humidifier.

199. The method of clause 198 further comprising reconstructing, from the data logged by the respiratory or surgical humidifier or the data logged by the flow generator, behavior of the system during a period of interest.

200. The method of clause 199 wherein the period of interest includes a period leading up to an alarm or reported fault.

201. A system comprising:
   a. a respiratory or surgical humidifier; and
   b. a flow generator configured to be operatively connected to the respiratory or surgical humidifier;
   wherein:
   i. the respiratory or surgical humidifier is configured to log operational data of the respiratory or surgical humidifier and operational data of the flow generator; and/or
   ii. the flow generator is configured to log operational data of the flow generator and operational data of the respiratory or surgical humidifier.

202. The system of clause 201 further comprising a third device configured to receive the data logged by the respiratory or surgical humidifier and/or the data logged by the flow generator.

203. A method of operating a respiratory or surgical humidifier, the method comprising:
   a. while the respiratory or surgical humidifier is receiving electrical power from an external power source and in response to an indication that the respiratory or surgical humidifier is going to stop receiving electrical power from the external source, powering a heating element of the respiratory or surgical humidifier for a period of time to heat water in the humidifier to a raised temperature above a normal operating temperature; and
   b. stopping the powering of the heating element after the period of time.

204. The method of clause 203 wherein the external power source is a power output of a medical device.

205. The method of clause 204 wherein the medical device is a flow generator.

206. The method of any one of clauses 203 to 205 wherein the indication that the respiratory or surgical humidifier is going to stop receiving electrical power is based on a user input.

207. The method of clause 206 when dependent on clause 204 or 205 wherein the user input is input to a user interface of the medical device.

208. The method of any one of clauses 203 to 207 wherein the water is heated to the raised temperature before the receiving of electrical power form the external source is stopped.

209. The method of any one of clauses 203 to 208 further comprising providing, from an internal power source, electrical power to components of the respiratory or surgical humidifier other than the heating element after stopping the powering of the heating element.

210. A respiratory or surgical humidification system comprising:
   a. a respiratory or surgical humidifier including a water-heating chamber and heating element; and
   b. an electrical power source external to the respiratory or surgical humidifier, the electrical power source being configured to provide electrical power to the respiratory or surgical humidifier;
   wherein the respiratory or surgical humidifier is configured to:
   i. receive an indication that the respiratory or surgical humidifier is going to stop receiving electrical power from the external electrical power source;
   ii. in response to the indication, power the heating element for a period of time to heat water in the water-heating chamber to a raised temperature above a normal operating temperature; and
   iii. stop powering of the heating element after the period of time.

211. The system of clause 210 wherein the external power source is a power output of a medical device.

212. The system of clause 211 wherein the medical device is a flow generator.

213. The system of 211 or 212 wherein the medical device includes a user interface for receiving a user input and wherein the indication that the respiratory or surgical humidifier is going to stop receiving electrical power is based on the user input.

214. The system of any one of clauses 210 to 213 wherein the external electrical power source is an AC power source.

215. The system of any one of clauses 210 to 213 wherein the external electrical power source is a DC power source.

216. The system of any one of clauses 210 to 215 wherein the respiratory or surgical humidifier further includes a battery to provide electrical power to components of the respiratory or surgical humidifier when electrical power is not received from the external electrical power source.

217. A method of operating a system including a respiratory or surgical humidifier, the method comprising:
   a. outputting, from the respiratory or surgical humidifier, state data indicative of the current state of the respiratory or surgical humidifier during normal operation;
   b. storing, at a device external to the respiratory or surgical humidifier, the state data; and
   c. after a temporary interruption to normal operation of the respiratory or surgical humidifier, resuming normal operation of the respiratory or surgical humidifier in a state that is based on the stored state data.
218. The method of clause 217 wherein the temporary interruption is due to a transient condition of a mains power supply.
219. The method of clause 218 wherein the transient condition is a decrease in voltage.
220. The method of any one of clauses 217 to 219 wherein the state data includes a setpoint value associated with a heating element of the respiratory or surgical humidifier.
221. The method of clause 220 wherein the setpoint is a temperature setpoint.
222. The method of clause 221 wherein the state data includes a sensed operating temperature associated with the heating element.
223. The method of clause 222 wherein the state data includes a difference between the sensed operating temperature and the temperature setpoint.
224. The method of clause 223 wherein the state data includes a value that is proportional to the difference.
225. The method of clauses 223 or 224 wherein the state data includes a value that is an integral of a series of differences.
226. The method of any one of clauses 223 to 225 wherein the state data includes a value that is a derivative of a series of differences.
227. The method of any one of clauses 217 to 226 wherein the state data includes a sensed indication of a water level in the respiratory or surgical humidifier.
228. The method of clause 227 wherein the state data includes one or more values selected from the set consisting of: a value that is proportional to the sensed indication of water level; an integral of a series of sensed indications of water level; a derivative of a series of sensed indications of water level.
229. The method of any one of clauses 217 to 228 wherein normal operation is resumed in a state based on the stored state data only if the temporary interruption is shorter than a threshold time.
230. A method of operating a respiratory or surgical humidification and ventilation system, the method comprising:
  a. providing electrical power from a battery-powered flow generator to a respiratory or surgical humidifier that is external to the battery-powered flow generator;
  b. determining that the state of charge of one or more batteries of the battery-powered flow generator is below a first threshold; and
  c. based on the determination:
    i. switch the respiratory or surgical humidifier into a low-power mode; or
    ii. switch the respiratory or surgical humidifier off.
231. The method of clause 230 wherein switching the respiratory or surgical humidifier into a low-power mode comprises stopping powering of one or more heating elements of the respiratory or surgical humidifier.
232. The method of clause 231 wherein the one or more heating elements includes a water-heating element.
233. The method of clause 231 or 232 wherein the one or more heating elements includes a heating element in a breathing tube.
234. The method of any one of clauses 230 to 233 comprising operating a user interface as normal during the low-power mode.
235. The method of any one of clauses 230 to 234 comprising displaying a low battery indication on the respiratory or surgical humidifier if the state of charge is below a second threshold, the second threshold being lower than the first threshold.
236. A system comprising:
  a. a battery-powered flow generator having an electrical power output; and
  b. a respiratory or surgical humidifier external to the battery-powered flow generator and configured to receive electrical power from the electrical power output;
  wherein the respiratory or surgical humidifier is configured to, in response to a determination that the state of charge of one or more batteries of the battery-powered flow generator is below a first threshold:
    i. switch the respiratory or surgical humidifier into a low-power mode; or
    ii. switch the respiratory or surgical humidifier off.
237. The system of clause 236 wherein the electrical power output is an AC power output.
238. The system of clause 236 wherein the electrical power output is a DC power output.
239. A method of operating a respiratory ventilation and humidification system including a respiratory or surgical humidifier and a flow generator, the method comprising:
  a. determining the presence of a third device in the system; and
  b. providing an indication of the presence of the third device from the flow generator to the respiratory or surgical humidifier.
240. The method of clause 239 wherein the third device is a peripheral device.
241. The method of clause 240 further comprising confirming or controlling flow generator operating parameters based on the peripheral device.
242. The method of clause 241 wherein the peripheral device is a medication delivery device and the flow generator controls the timing of gas supply from the flow generator based on the timing of medication delivery by the medication delivery device.
243. The method of clause 240 wherein the peripheral device is a source of helium, the method further comprising calibrating one or more sensors of the respiratory or surgical humidifier for sensing parameters of gases comprising helium.
244. The method of any one of clauses 239 to 242 wherein the peripheral device has stored thereon configuration and/or identification information and wherein the operation of the respiratory or surgical humidifier and/or the flow generator is controlled based on the configuration and/or identification information of the peripheral device.
245. The method of clause 239 wherein the third device is a patient monitoring device or a central monitoring device.
246. The method of clause 245 wherein the respiratory or surgical humidifier and/or the flow generator enter(s) a quiet alert mode based on the presence of the patient monitoring device or central monitoring device, wherein in the quiet mode the volume and/or number of audio alerts issued from the respective device is partly or completely reduced.

247. A method of controlling a respiratory or surgical humidifier, the method comprising:
   a. receiving, via one or more communication interfaces of the respiratory or surgical humidifier, information regarding the composition of a supply of one or more gases for the respiratory or surgical humidifier; and
   b. in response to the information, calibrating one or more sensors of the respiratory or surgical humidifier for use with the one or more gases.
248. The method of clause 247 wherein the information comprises information indicating that the one or more gases include helium.
249. The method of clause 248 wherein the information comprises information indicating that the one or more gases include helium and oxygen.
250. The method of any one of clauses 247 to 249 wherein the information comprises information indicating that a flow generator is currently, or will be, operating in a Heliox mode.
251. The method of any one of clauses 247 to 250 wherein the sensor(s) comprise one or more sensors selected from the group consisting of temperature sensors, pressure sensors, flow sensors, volume sensors, moisture sensors, gas composition sensors, gas concentration sensors, and humidity sensors.
252. A respiratory or surgical humidifier comprising:
   a gas inlet;
   a communication interface;
   one or more sensors;
   one or more processors; and
   one or more memory devices;
   one or more of the memory device(s) having stored thereon instructions for causing one or more of the processor(s) to:
   i. receive, via the communication interface, information regarding the composition of a supply of one or more gases for the respiratory or surgical humidifier; and
   ii. in response to the information, calibrate one or more of the sensor(s) for use with the gas(es).
253. The respiratory or surgical humidifier of clause 252 wherein the information comprises information indicating that the gas(es) include helium.
254. The respiratory or surgical humidifier of clause 253 wherein the information comprises information indicating that the gases include helium and oxygen.
255. The respiratory or surgical humidifier of any one of clauses 252 to 254 wherein the information comprising information indicating that a flow generator is currently, or will be, operating in a Heliox mode.
256. The respiratory or surgical humidifier of any one of clauses 252 to 255 wherein the sensor(s) comprise one or more temperature sensors.
257. A method of operating a respiratory or surgical ventilation and humidification system, the method comprising:
   a. determining one or more characteristics of one or more gases to be supplied to a respiratory or surgical humidifier;
   b. transmitting, from a flow generator and to the respiratory or surgical humidifier, information indicative of the determined characteristics.
258. The method of clause 257 wherein the flow generator is a ventilator.
259. The method of clause 257 or 258 wherein the one or more characteristics comprise temperature, humidity gas flow rate, gas pressure, or flow characteristics of gas flow supplied by the flow generator.
260. The method of any one of clauses 257 to 259 further comprising:
   c. controlling an operational parameter of the respiratory or surgical humidifier using the information.
261. A respiratory or surgical flow generator comprising:
   a gas outlet;
   a communication interface;
   one or more processors; and
   one or more memory devices;
   one or more of the memory device(s) having stored thereon instructions for causing one or more of the processor(s) to:
   i. determine one or more characteristics of one or more gases to be supplied from the gas outlet; and
   ii. transmit information indicative of the determined characteristics from the communication interface.
262. The respiratory or surgical flow generator of clause 261 wherein the flow generator is a ventilator.
263. The respiratory or surgical flow generator of clause 261 or 262 further comprising one or more sensors configured to determine the characteristic(s).
264. The respiratory or surgical flow generator of any one of clauses 261 to 263 wherein the characteristic(s) comprise temperature.
265. A respiratory or surgical ventilation and humidification system comprising:
   the respiratory or surgical flow generator of any one of clauses 261 to 264; and
   a respiratory or surgical humidifier;
   the respiratory or surgical humidifier comprising:
   i. a communication interface configured to receive the information indicative of the characteristic(s).
266. The respiratory or surgical ventilation and humidification system of clause 265 wherein the respiratory or surgical humidifier further comprises:
   a gas inlet for receiving gases from the respiratory or surgical flow generator;
   a gas outlet for providing a flow of humidified breathing gases;
   a humidification chamber including a heating element;
   one or more processors; and
   one or more memory devices;
   one or more of the memory devices having stored thereon instructions for causing one or more of the processors to:
   i. control operation of the heating element using the information indicative of the characteristic(s).
267. A device configured to perform any one of the methods of clauses 78, 139 and 176.
268. A system configured to perform any one of the methods of clauses 88,125,132, 180 and 217.
269. A respiratory or surgical humidifier comprising:
   a communication interface configured to communicate with another device using one of a plurality of communication protocols;
   one or more processors; and
   one or more memory devices, one or more or the memory devices having stored thereon instructions for causing one or more of the processor(s) to:
   i. select, from the plurality of communication protocols, a communication protocol suitable for communication with the other device; and
   ii. communicate with the other device using the selected communication protocol.
270. A system comprising the respiratory or surgical humidifier of clause 269 and a cable, wherein the cable includes:

a first electrical connector at a first end of the cable, the first electrical connector being configured to electrically connect to an electrical connector of the communication interface of the humidifier; and a second electrical connector at a second end of the cable, the second electrical connector being configured to connect to an electrical connector of a communication interface of the other device.

271. The system of clause 270 further comprising one or more other cables, wherein:
the first electrical connector of each cable is the same type of electrical connector as the first electrical connector of each other cable; and
the second electrical connectors of the cables are not all the same type of electrical connector.

What is claimed is:

1. A method of assessing a health of a respiratory or surgical humidifier, the method comprising:
receiving, at a device external to the respiratory or surgical humidifier, sensor output data indicative of either or both of (i) a performance of or (ii) resources available to the respiratory or surgical humidifier;
applying one or more device health assessment rules to the sensor output data; and
determining, based on an application of device health assessment rule(s) to the sensor output data, a value of a device health parameter associated with the respiratory or surgical humidifier.

2. The method of claim 1, wherein the sensor output data comprises data output by one or more sensors of the respiratory or surgical humidifier, one or more sensors of the external device, or a combination thereof.

3. The method of claim 2 further comprising comparing the sensor output of one or more sensors of the respiratory or surgical humidifier to the sensor output of one or more sensors of the external device and, if the comparison disagrees, using the outputs of the one or more sensors of the external device as the sensor output data.

4. The method of claim 3 further comprising, if the sensors output of the one or more sensors of the respiratory or surgical humidifier disagrees with the sensor output of the one or more sensors of the external device, providing an alert on a user interface of the external device.

5. The method of claim 1 further comprising selecting which sensor to use for providing the sensor output data by selecting between a sensor of the respiratory or surgical humidifier and a sensor of the external device.

6. The method of claim 5, wherein the selection is based on an attribute of each sensor.

7. The method of claim 6, wherein the attribute is accuracy.

8. The method of claim 6, wherein the attribute is accuracy at low flow rates.

9. The method of claim 6, wherein the selection comprises selecting the sensor of the external device if the respiratory or surgical humidifier and the external device are communicatively connected.

10. The method of claim 1, wherein the health parameter is humidifier chamber water level.

11. The method of claim 10, wherein the humidifier chamber water level is determined from a temperature and/or power draw of a water-heating element of the humidifier.

12. The method of claim 10, wherein the humidifier chamber water level is determined from fluid flow rate measurements.

13. The method of claim 12, wherein the humidifier chamber water level is determined from a difference between a flow rate measurement of fluid upstream of the humidifier chamber and a flow rate measurement of fluid downstream of the humidifier chamber.

14. The method of claim 12, wherein applying the one or more device health assessment rules comprises comparing a difference between flow rate measurements to a threshold and wherein determining the value of the health parameter includes determining a water out condition if the difference is less than a threshold.

15. The method of 10 further comprising altering a flow of gases supplied to the respiratory or surgical humidifier.

16. The method of claim 15, wherein altering the flow of gases comprises increasing a volume flow rate.

17. The method of claim 15, wherein increasing the volume flow rate comprises increasing the volume flow rate from about 3 litres per minute or less to more than 3 litres per minute.

18. The method of claim 15, wherein altering the flow of gases comprises pulsing the flow of gases.

19. A respiratory or surgical humidification system comprising:
a respiratory or surgical humidifier comprising one or more communication interfaces; and
a medical device external to the respiratory or surgical humidifier, the medical device comprising:
one or more communication interfaces;
one or more processors; and
one or more memory devices, the memory device(s) having stored thereon instructions for causing one or more of the processor(s) to:
obtain, using one or more of the communication interface(s) of the medical device, configuration information for the respiratory or surgical humidifier and configuration information for the medical device; and
a. configure the medical device according to the obtained configuration information for the medical device; and/or
b. provide, using one or more of the communication interface(s) of the medical device, the configuration information for the respiratory or surgical humidifier to the respiratory or surgical humidifier.

20. A system comprising:
a respiratory or surgical humidifier; and
a flow generator configured to be operatively connected to the respiratory or surgical humidifier;
wherein:
the respiratory or surgical humidifier is configured to log operational data of the respiratory or surgical humidifier and operational data of the flow generator; and/or
the flow generator is configured to log operational data of the flow generator and operational data of the respiratory or surgical humidifier.

* * * * *